US008665282B2

(12) United States Patent
Tanaka et al.

(10) Patent No.: US 8,665,282 B2
(45) Date of Patent: Mar. 4, 2014

(54) IMAGE GENERATING APPARATUS AND IMAGE GENERATING METHOD AND READING OF IMAGE BY USING PLURAL BUFFERS TO GENERATE COMPUTER READABLE MEDIUM

(75) Inventors: Shingo Tanaka, Yokohama (JP); Shinya Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 953 days.

(21) Appl. No.: 12/169,169

(22) Filed: Jul. 8, 2008

(65) Prior Publication Data

US 2009/0015591 A1 Jan. 15, 2009

(30) Foreign Application Priority Data

Jul. 9, 2007 (JP) ................................ 2007-180085

(51) Int. Cl.
*G06F 13/00* (2006.01)

(52) U.S. Cl.
USPC ........................................................ 345/536

(58) Field of Classification Search
None
See application file for complete search history.

(56) References Cited

U.S. PATENT DOCUMENTS 5,001,469 A * 3/1991 Pappas et al. ................. 715/790
5,850,232 A * 12/1998 Engstrom et al. ............. 345/539
6,005,572 A * 12/1999 Kurihara ....................... 345/531
6,157,751 A * 12/2000 Olson et al. ................... 382/304
6,885,377 B2 * 4/2005 Lim et al. ...................... 345/539
7,038,689 B2 * 5/2006 Willis ........................... 345/531
2002/0101428 A1 * 8/2002 Hsiao et al. ................... 345/539
2005/0156938 A1 * 7/2005 Vollschwitz ................. 345/539
2007/0046679 A1 3/2007 Tanaka

FOREIGN PATENT DOCUMENTS

JP 2005-338498 12/2005

* cited by examiner

*Primary Examiner* — Daniel Hajnik
*Assistant Examiner* — Anh-Tuan V Nguyen
(74) *Attorney, Agent, or Firm* — Finnegan, Henderson, Farabow, Garrett & Dunner, L.L.P.

(57) ABSTRACT

There is provided with an image generating apparatus, including a storage having first and second buffers, a write buffer selecting unit selecting a buffer for each of areas to be written, a writing unit, a read buffer selecting unit selecting a buffer for each area of one frame to be readout, a reading unit read outing at regular intervals an image from each area. The write buffer selecting unit selects an other buffer than a buffer read out in a frame reading period for each area to be written in the period. The read buffer selecting unit selects in the period a buffer to which the writing was performed in an immediately preceding reading period for an area for which writing was performed in the preceding period, and a same buffer as a buffer readout in the preceding period for an area for which the writing was not performed.

19 Claims, 52 Drawing Sheets

| | | | | | | | |
|---|---|---|---|---|---|---|---|
| X0,Y0,B0 | X0,Y0,B1 | X1,Y0,B0 | X1,Y0,B1 | X2,Y0,B0 | X2,Y0,B1 | X3,Y0,B0 | X0,Y0,B1 |
| X0,Y1,B0 | X0,Y1,B1 | X1,Y1,B0 | X1,Y1,B1 | X2,Y1,B0 | X2,Y1,B1 | X3,Y1,B0 | X0,Y1,B1 |
| X0,Y2,B0 | X0,Y2,B1 | X1,Y2,B0 | X1,Y2,B1 | X2,Y2,B0 | X2,Y2,B1 | X3,Y2,B0 | X0,Y2,B1 |
| X0,Y3,B0 | X0,Y3,B1 | X1,Y3,B0 | X1,Y3,B1 | X2,Y3,B0 | X2,Y3,B1 | X3,Y3,B0 | X0,Y3,B1 |

IMAGE GENERATING APPARATUS AND IMAGE GENERATING METHOD AND READING OF IMAGE BY USING PLURAL BUFFERS TO GENERATE COMPUTER READABLE MEDIUM

CROSS REFERENCE TO RELATED APPLICATIONS

This application is based upon and claims the benefit of priority from the prior Japanese Patent Applications No. 2007-180085, flied on Jul. 9, 2007; the entire contents of which are incorporated herein by reference.

BACKGROUND OF THE INVENTION

1. Field of the invention

The present invention relates to an image generating apparatus and an image generating method for temporarily storing image data on a storage medium and reading the stored image data with predetermined timing to generate an image frame, and a computer readable medium.

2. Related Art

Apparatuses that output video signals for displaying a screen on a display, such as a personal computer or a television, generally have a buffer called a frame buffer which is memory for saving information on an output image (a set of pixel data making up a screen) because timing of generating an image through internal processing does not always correspond with that of image signals requested by the display. In a frame buffer, a picture to be rendered is typically sequentially written from top to bottom and sequentially read out from top to bottom at regular intervals for outputting video signals as illustrated in FIG. 1. As a display typically shows a moving image, these operations are repeated and the screen is updated in accordance with the frame buffer which is continually updated. For example, as a typical display has a refreshing rate of 60 Hz and the like, reading takes place at a cycle of 60 times per second. Timing of writing depends on implementation.

However, a problem with simply making such a way of accesses to a single frame buffer is that reading takes place during writing. More specifically, since the speed of reading scan is not always the same as that of writing scan, there can be a phenomenon in which reading scan overtakes writing scan, or conversely, writing scan overtakes reading scan, for example. FIG. 2 illustrates the former case, where an image frame that immediately precedes a point at which an overtaking occurred is read in and displayed on an output screen, resulting in a screen that contains frames of different times together. This causes a phenomenon called tearing, which means incoherence of the screen. For instance, when an object moving rightward is being displayed on the screen, the object looks like sectioned.

To solve this problem, in conventional practices, frame buffers are provided in a double buffer configuration as shown in FIG. 3, wherein writing is alternately done to two buffers and reading is always performed from one of the buffers that is not being written (JP-A 2005-338498 (Kokai)). This can eliminate occurrence of overtaking and prevent the screen incoherence.

A television screen is updated in its entirety at every frame, whereas a screen of a personal computer, for example, is often updated partially because most part of the screen does not move. For example, when characters are entered as shown in FIG. 4, only an area in which the characters are displayed is updated, and when a document is scrolled as depicted in FIG. 5, only an area in which the document is displayed is updated. When a moving image is being displayed, only an area in which the moving image is displayed is updated in a similar way. When a moving image is being displayed on the entire screen, the entire screen will be updated. Thus, on a screen of a personal computer and the like, only a portion of the screen that requires screen updating is updated in many cases. Describing this with respect to the operation of the frame buffer mentioned above, reading is performed at regular intervals, e.g., 60 Hz, in accordance with the refresh rate of the display to read out the entire screen, whereas writing is conducted with random timing so as to write only a partial area of a screen that requires updating to the frame buffer as illustrated in FIG. 6.

Since the timing of writing nevertheless does not correspond with the reading cycle even when writing is partial, the problem of overtaking mentioned above similarly occurs. It is therefore desirable to apply the double buffer method to this, but it would present such a problem as follows. First, suppose that such updating as illustrated in FIG. 7 is performed in a single buffer: a star (1) is first drawn on the left and then a star (2) on its right to finally produce a screen on which the two stars (1) and (2) are drawn. Performing this simply with two buffers, the star (1) is first written in the left buffer which is being a write buffer, as shown in FIG. 8. Assuming that a switching of buffers takes place after it, the star (2) is written to the right buffer which has become the next write buffer. At this point, reading is performed from the left buffer, so that the star (1) previously drawn is properly read out. However, when a buffer switching takes place thereafter, the right buffer will be read next. But since only the star (2) is written and not the star (1) in the right buffer, only the star (2) will be displayed on the screen. This is a problem resulting from written images being partial.

A simple way of avoiding this would be such operations as shown in FIG. 9. First, the star (1) is written to the left buffer as the write buffer. When a buffer switching subsequently takes place, an updated area of the left buffer which has been the write buffer, namely the star (1), is copied to the right buffer which is going to be the next write buffer. Thereafter, the star (2) is written to the right buffer. Consequently, when the right buffer becomes the read buffer next time, an image frame in which the stars (1) and (2) are drawn can be read from the right buffer.

Thus, application of the double buffer method to a case where an image frame is updated with partial writing would involve operations of, when an updated area is written to one of the buffers, writing the same contents to the other buffer after a buffer switching and then writing a new updated area to the other buffer in order to maintain consistency between the two buffers. However, when compared to the single buffer method, this method has increased memory accesses due to the additional necessity of copy between the buffers at the time of buffer switching. This leads to a problem of increased power consumption and the like.

As outlined above, conventional methods have a problem of increase of memory access when applying the double buffer method to a system which updates image frames with partial writing.

The present invention provides an image generating apparatus, an image generating method, and an image generating program that reduce power consumption by eliminating the necessity to copy a written image between buffers and reducing memory accesses to frame buffers.

SUMMARY OF THE INVENTION

According to an aspect of the present invention, there is provided with an image generating apparatus, comprising:

a storage configured to have first and second buffers each capable of storing an image of one frame;

a write buffer selecting unit configured to select a buffer to which an image of each area forming an entirety or a part of one frame is to be written from among the first and second buffers, for each area of the entirety or the part of the one frame respectively;

a writing unit configured to write an image of each area of the entirety or the part of the one frame to a buffer selected by the write buffer selecting unit, respectively;

a read buffer selecting unit configured to select a buffer from which an image of each area forming an entirety of one frame is to be read out from among the first and second buffers, for each area of the entirety of the one frame respectively; and a reading unit configured to read out at regular intervals an image in each area of the entirety of the one frame from a buffer selected by the read buffer selecting unit to generate an image frame, wherein the write buffer selecting unit selects an other buffer than a buffer to be read out by the reading unit in a certain frame reading period for each area to be written by the writing unit in the certain frame reading period, and the read buffer selecting unit selects in the certain frame reading period a buffer to which writing was performed in an immediately preceding reading period for an area for which in the immediately preceding frame reading period, the writing was performed, and a same buffer as a buffer which was read in the immediately preceding reading period for an area for which in the immediately preceding frame reading period, the writing was not performed.

According to an aspect of the present invention, there is provided with an image generating method, comprising:

selecting a buffer to which an image of each area forming an entirety or a part of one frame is to be written from among first and second buffers each capable of storing an image of one frame, for each area of the entirety or the part of the one frame, respectively;

writing an image of each area of the entirety or the part of the one frame to a selected buffer, respectively;

selecting a buffer from which an image of each area forming an entirety of one frame is to be read out from among the first and second buffers, for each area of the entirety of the one frame respectively; and reading out at regular intervals an image in each area of the entirety of the one frame from the selected buffer to generate an image frame, wherein a first of the selecting selects an other buffer than a buffer to be read out in a certain frame reading period for each area to be written in the certain frame reading period, respectively and a second of selecting selects in the certain frame reading period a buffer to which writing was performed in an immediately preceding reading period for an area for which in the immediately preceding frame reading period, the writing was performed, and a same buffer as a buffer which was read in the immediately preceding reading period for an area for which in the immediately preceding frame reading period, the writing was not performed.

According to an aspect of the present invention, there is provided with a computer readable medium storing a computer program for causing a computer to execute instructions to perform the steps of:

selecting a buffer to which an image of each area forming an entirety or a part of one frame is to be written from among first and second buffers each capable of storing an image of one frame, for each area of the entirety or the part of the one frame, respectively;

writing an image of each area of the entirety or the part of the one frame to a selected buffer, respectively;

selecting a buffer from which an image of each area forming an entirety of one frame is to be read out from among the first and second buffers, for each area of the entirety of the one frame respectively; and reading out at regular intervals an image in each area of the entirety of the one frame from the selected buffer to generate an image frame, wherein a first of the selecting selects an other buffer than a buffer to be read out in a certain frame reading period for each area to be written in the certain frame reading period, respectively and a second of selecting selects in the certain frame reading period a buffer to which writing was performed in an immediately preceding reading period for an area for which in the immediately preceding frame reading period, the writing was performed, and a same buffer as a buffer which was read in the immediately preceding reading period for an area for which in the immediately preceding frame reading period, the writing was not performed.

DETAILED DESCRIPTION OF THE INVENTION

First Embodiment

Figure 10:
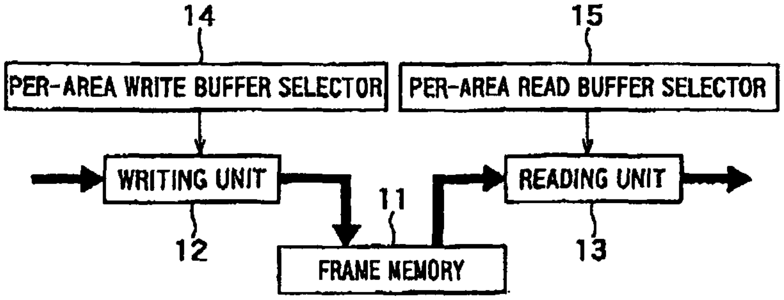
FIG. 10 shows a configuration of an image generating apparatus as a first embodiment of the present invention.

A first embodiment of the present invention is shown in FIG. 10. FIG. 10 shows a portion of a device (e.g., a personal computer or PC) which outputs an image to a display, including frame memory 11 for storing image frames in a two-tier buffer (i.e., a double buffer), a writing unit 12 for writing an image of an updated screen area in an arbitrary area of the frame memory 11 with random timing, and a reading unit 13 for reading out the entire image from the frame memory 11 with regular timing for outputting a screen on the display. Hereinafter, a time period during which the reading unit 13 scans a frame from its upper to bottom end to read out an image frame once will be called a "read-out frame period". A present read-out frame period refers to a period from the start of scan currently being conducted by the reading unit 13 to the end thereof. A next read-out frame period refers to a period from when, upon completion of the previous scan, scanning is started again at the upper end of a frame to when the scanning reaches the bottom end to read out the next frame.

An image frame is of an XGA resolution (1024 pixels wide and 768 pixels high), for example, and pixel information is assumed to be represented in 16 bits (5 bits for red, 6 bits for green, and 5 bits for blue). Thus, the frame memory 11 has 1024 pixels horizontally and 768 pixels vertically, where 1 pixel equals to 16 bit, and it has two sets of it. Accordingly, the frame memory 11 has at least a storage area of $16\times1024\times768\times2=25165824$ bits. The frame memory 11 is realized by SDRAM or SRAM, for example. The number of pixels and/or the storage media are merely examples and the present invention is not limited thereto.

The present invention further includes a per-area write buffer selector 14 for selecting either one of the buffers to which the writing unit 12 should write an image for each image area (e.g., for each pixel), and a per-area read buffer selector 15 for selecting either one of the buffers which should be read by the reading unit 13 for each image area (e.g., for each pixel). As details of processing performed by the per-area write buffer selector 14 and the per-area read buffer selector 15 will be described in later embodiments, the present embodiment generally shows the operation of the present invention with these components with basic examples.

Figure 11:
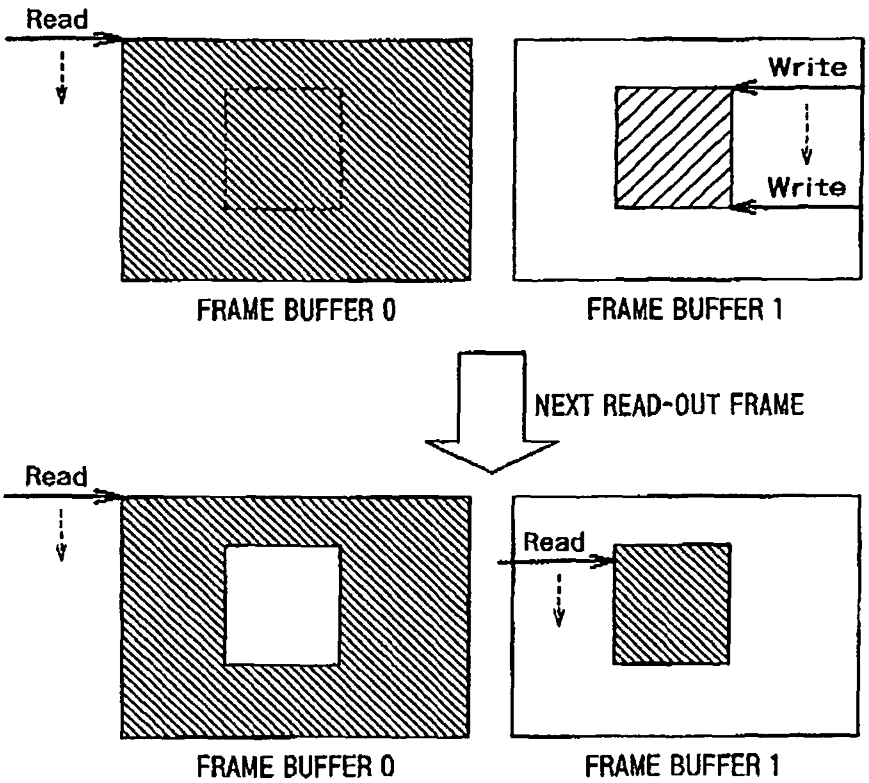
FIG. 11 shows the simplest example for illustrating the operation of the apparatus of FIG. 10 according to the first embodiment.
Figure 12:
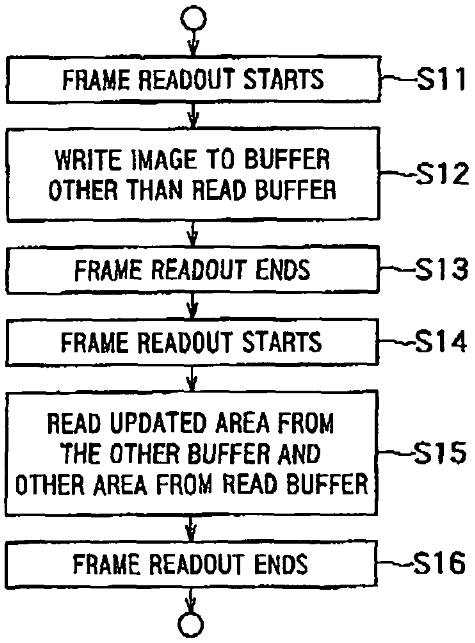
FIG. 12 is a flowchart illustrating an operational procedure of the apparatus of FIG. 10 according to the first embodiment.

First, the simplest case shown in FIG. 11 is described. The procedure of operation is shown in FIG. 12. In FIG. 11, two upper frame buffers 0 and 1 represent each buffer of the two buffers, and the frame buffer 0 shaded with diagonal lines from upper left toward lower right means the buffer is the present read buffer. Reading of a frame starts (S11), and when a new updated image should be written to an area of the frame buffer 0 that is denoted by a dotted line (a dotted-line area) within the shaded area, the per-area write buffer selector 14 selects a buffer so that the partial image will be written to the frame buffer 1 which is the other buffer than the present read buffer, and the writing unit 12 writes the updated image in an area shaded with diagonal lines from upper right toward lower left of the frame buffer 1 as illustrated in the figure (S12). When the writing is completed and then frame reading from the frame buffer 0 is finished (S13), the flow proceeds to the next read-out frame period (S14). Now, as shown in the lower portion of the figure, the per-area read buffer selector 15 selects the read buffer for each area so that only the area in which the updated image was written earlier is read out from the frame buffer 1 and the other area is read from the frame buffer 0, and the reading unit 13 accordingly performs reading (S15). When reading of the frame is completed (S16), the procedure moves to reading of the next frame. If an image to be written occurs during the frame reading period from S14 to S16, selection of a buffer and writing of the updated image to the buffer are performed according to the present invention as at S12 in parallel with the frame reading from S14 to S16.

Such operations prevent overtaking because writing and reading accesses are made to different buffers. In addition, since only a written area is read out from a buffer in which the area is written when a new frame is read out after writing, it is possible to read out an image frame which is updated only in the area of the written image.

Figure 13:
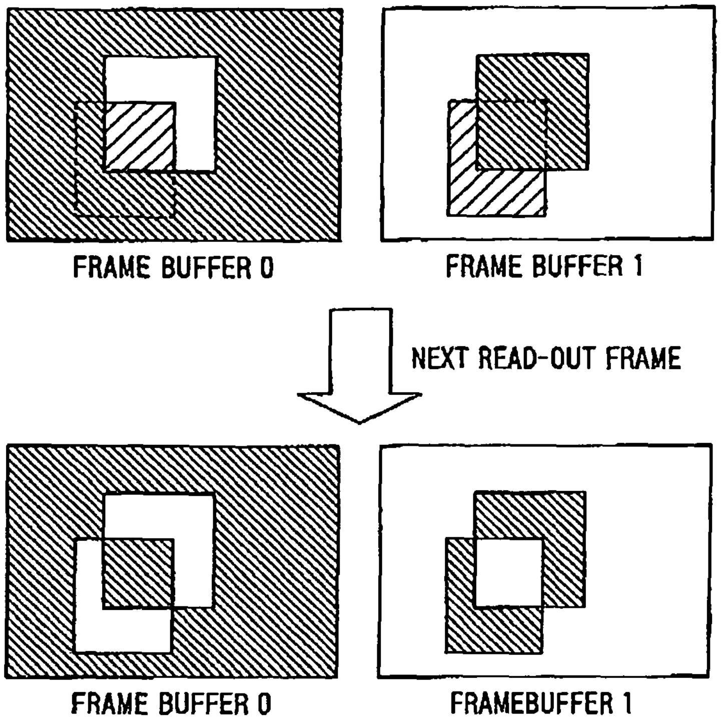
FIG. 13 shows another example for illustrating the operation of the apparatus of FIG. 10 according to the first embodiment.

Next, FIG. 13 illustrates a case where an updated image further is written after the completion of FIG. 11. FIG. 13 shows an example in which a new updated image is written to overlap the earlier updated area at a position somewhat lower left of that area. The basic principle is similar to the previous example: the other buffer than the read buffer is written, but it is performed on a per-area basis. To be specific, the updated area of this example (the dotted-line area in the figure) includes an area for which the frame buffer 0 is the read buffer (i.e., an L-shaped area in the lower left portion of the dotted area) and an area for which the frame buffer 1 is the read buffer (i.e., a rectangular area in the upper right portion of the dotted area), and each of the areas should be written to the other buffer than the read buffer. Thus, the areas will be written to the frame buffer 1 and 0, respectively. After writing is completed and reading presently performed reaches the bottom end of a frame and when the next frame is to be read out, the read buffer is toggled for each of the areas so as to read out the image which has been written this time for the area in which the updated image in question has been written. That is, the read buffers are consequently as illustrated in the lower portion of FIG. 13.

As described above, even when the read buffer is scattered over two buffers, the read buffer for each area is checked and each area is written to a different buffer, thus overtaking also cannot occur. In addition, since the read buffer is toggled for each area of the written area when a new frame is read out after writing, an image frame that reflects the written updated image can be read out.

Figure 14:
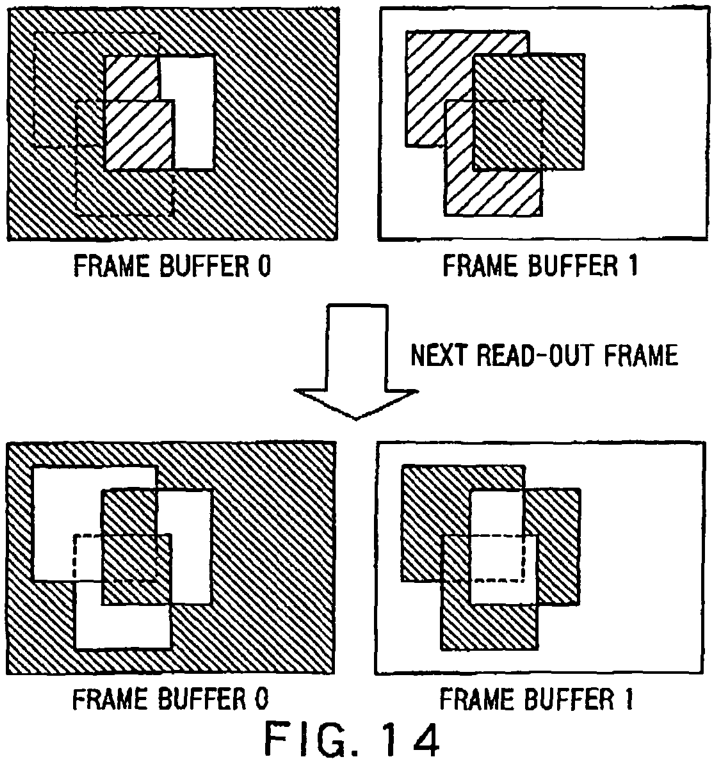
FIG. 14 shows another example for illustrating the operation of the apparatus of FIG. 10 according to the first embodiment.

FIG. 14 shows a case where updated images are successively written. Basically, the above-mentioned operations are performed in succession. In this example, there are two updated areas and they are written in the order of the upper left one, then the lower left one. For each of the updated areas, the read buffer is checked for each read-out area in the updated area, and a different buffer is selected and written for each area. The second updated area is written in a similar manner so that it simply overwrites the first updated area. And when a new frame is to be read out by reading after writing is finished, the read buffer is toggled for each area of the written area so as to read out a written image in an area in which the image is written.

Figure 1:
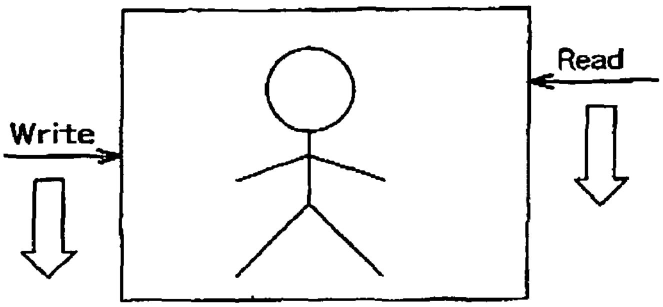
FIG. 1 illustrates a rendered picture being written and read out from top to bottom in sequence.
Figure 2:
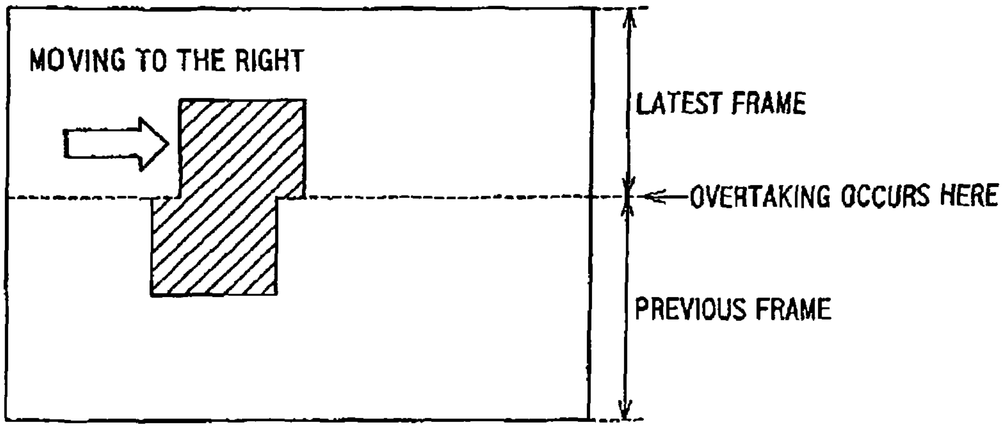
FIG. 2 illustrates overtaking of writing scan by reading scan.
Figure 3:
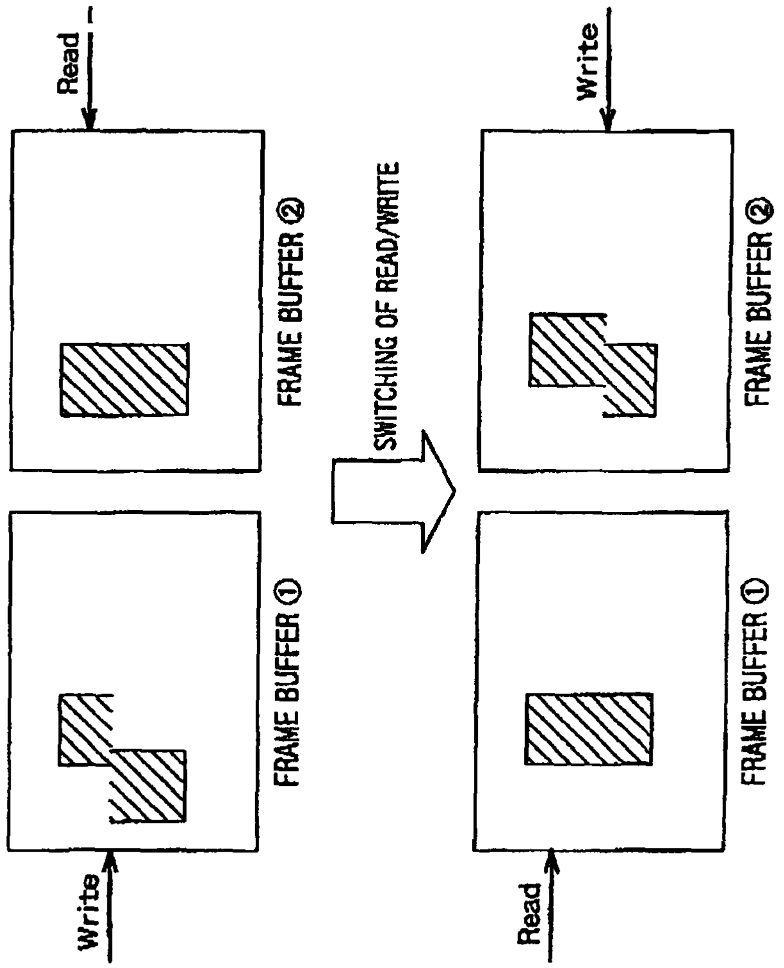
FIG. 3 (PRIOR ART)
FIG. 3 illustrates a double buffer structure.
Figure 4:
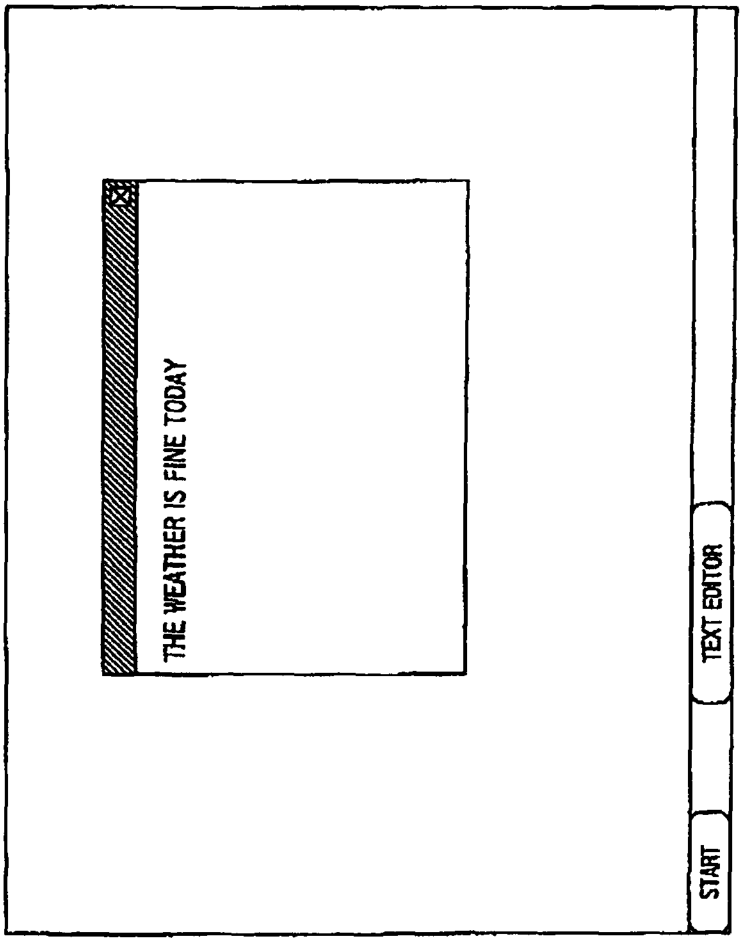
FIG. 4 (PRIOR ART)
FIG. 4 illustrates an example of partial update of a screen.
Figure 5:
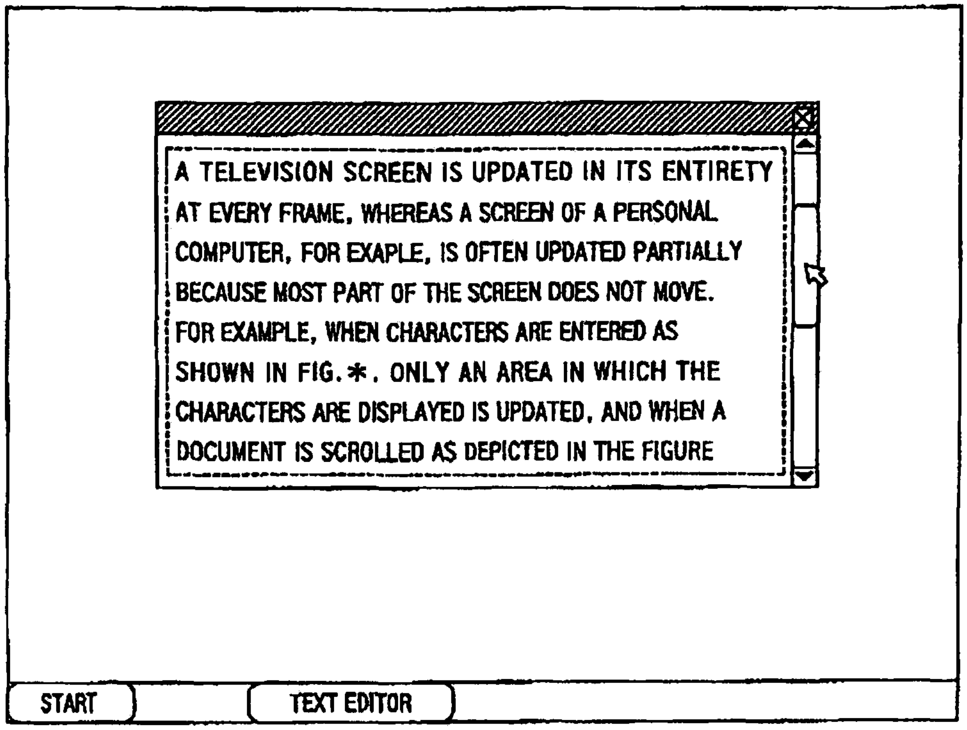
FIG. 5 (PRIOR ART)
FIG. 5 illustrates an example of partial update of a screen.
Figure 6:
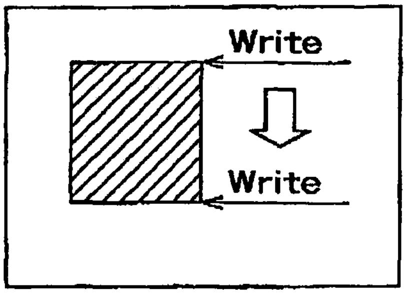
FIG. 6 (PRIOR ART)
FIG. 6 illustrates an example of updating only a screen portion that requires screen updating.
Figure 7:
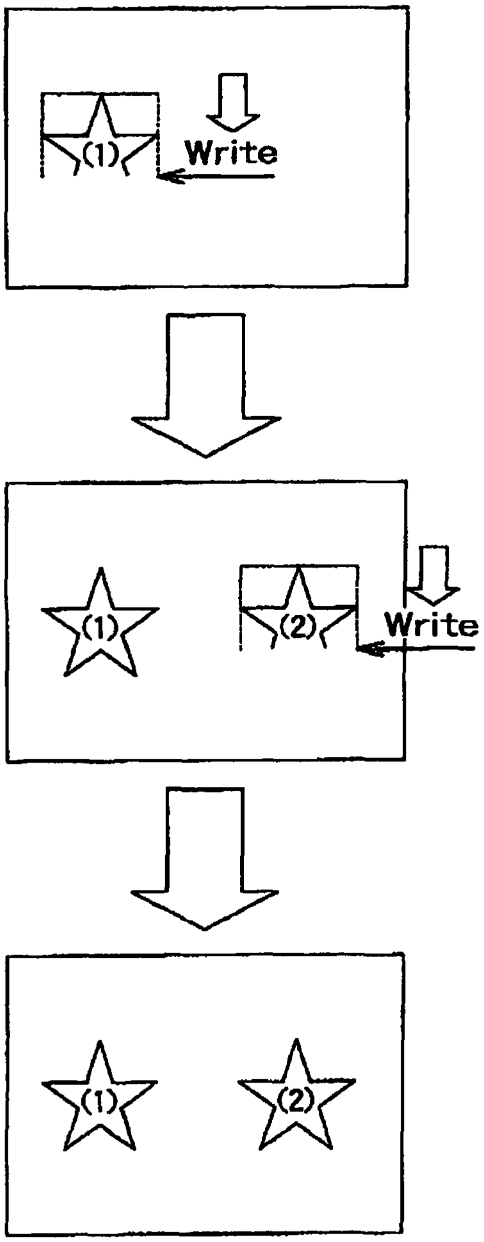
FIG. 7 (PRIOR ART)
FIG. 7 illustrates an example of updating only a screen portion that requires screen updating.
Figure 8:
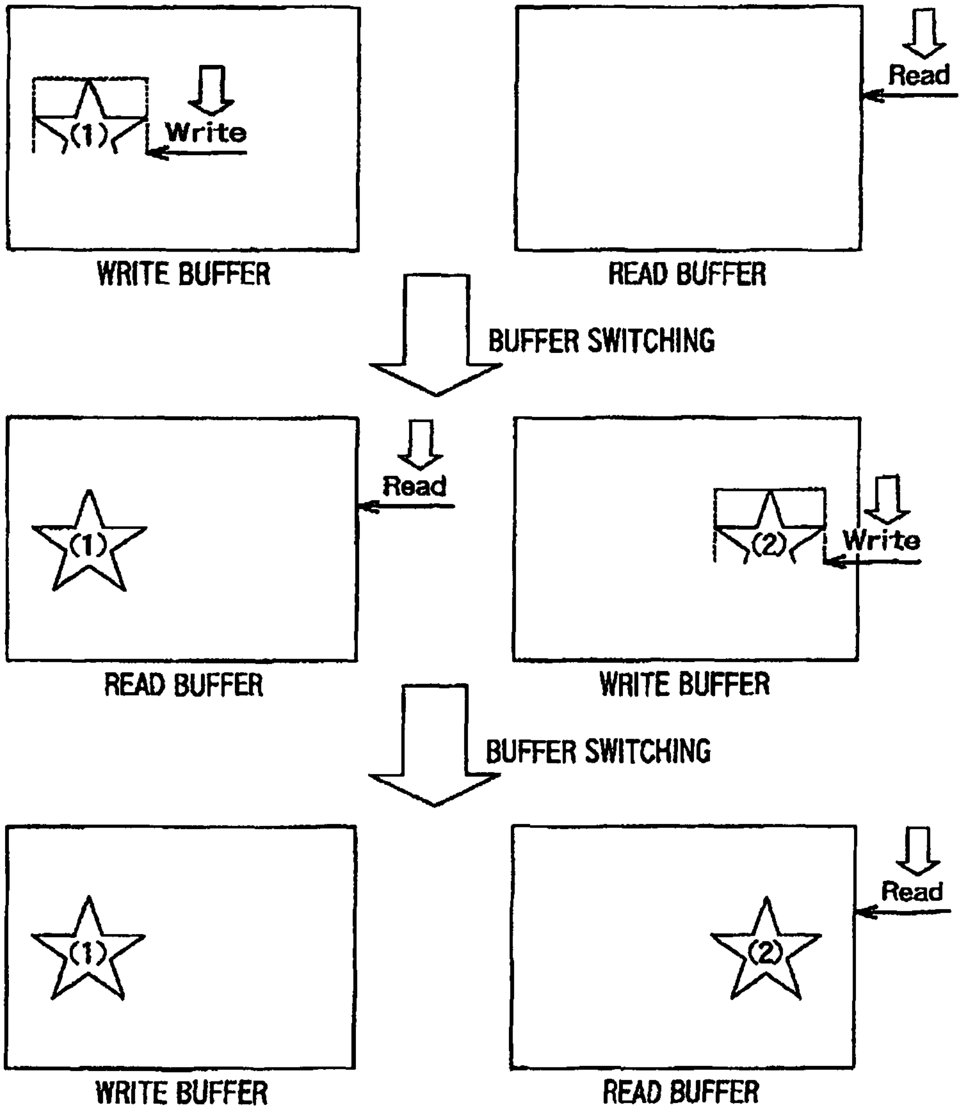
FIG. 8 (PRIOR ART)
FIG. 8 illustrates a problem that arises when the same update as FIG. 7 is performed with the double buffer structure.
Figure 9:
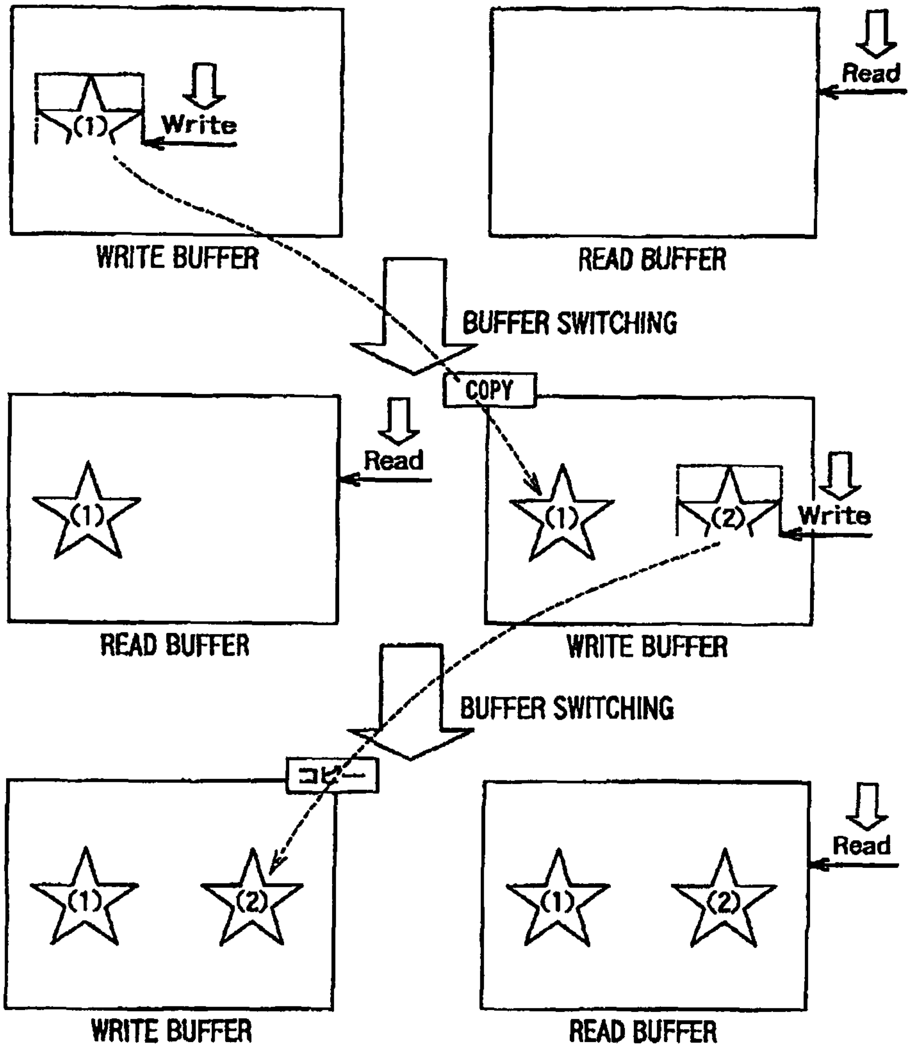
FIG. 9 (PRIOR ART)
FIG. 9 shows an example of a simple solution for avoiding the problem of FIG. 8.
Figure 15:
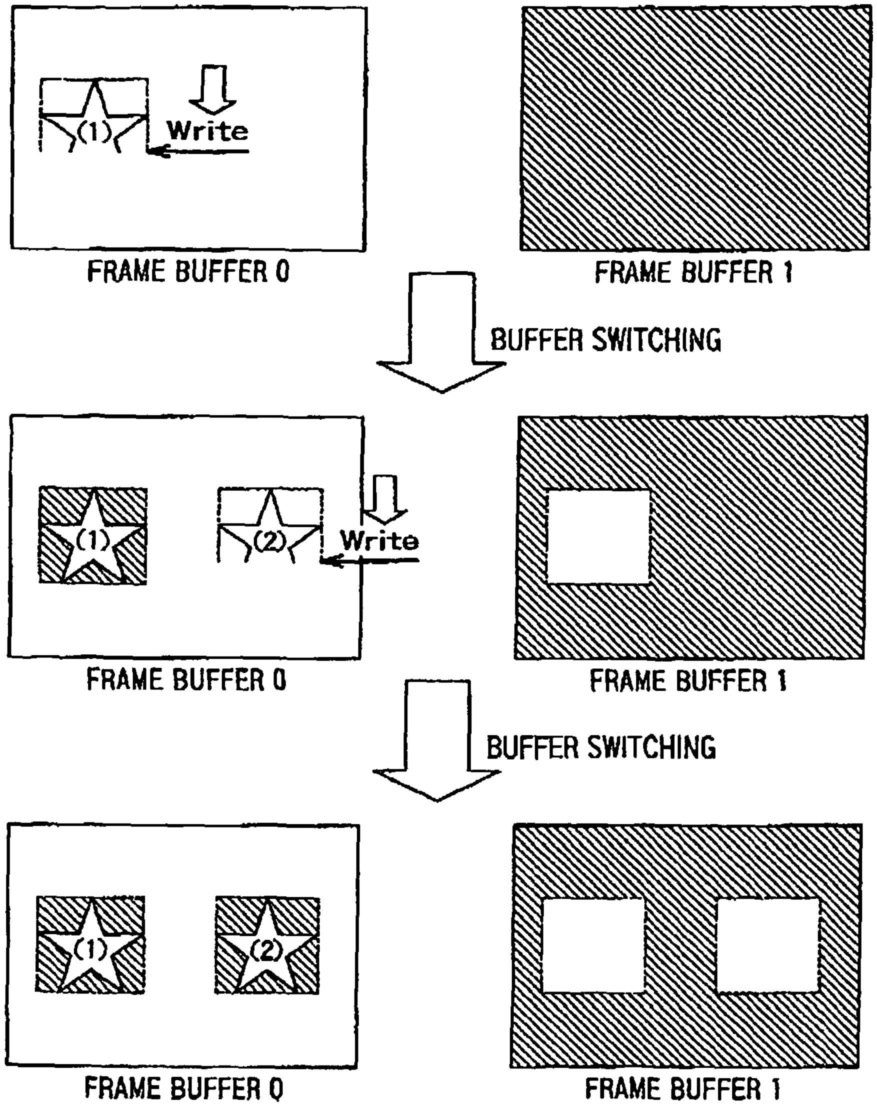
FIG. 15 shows an example of applying the first embodiment to the same screen update as FIG. 7 according to the first embodiment.

FIG. 15 illustrates the case of FIG. 9 which was referenced in Related Art as performed according to the present invention. The area shaded with diagonal lines from upper left to lower right again denotes a read-out area. First, supposing the frame buffer 1 is the read buffer, the star (1) is written to the frame buffer 0. After the star (1) is written, the next read-out frame is read from the frame buffer 0 for an area in which the star (1) is written and from the frame buffer 1 for the other area. Thereafter, the star (2) is also written to the frame buffer 0 because the area of star (2) has been read out from the frame buffer 1. After the star (2) is written, the next read-out frame is read from the frame buffer 0 for the areas of stars (1) and (2) and from the frame buffer 1 for the other area.

What is described above is the most basic operation of the present invention. By performing such operations, no overtaking occurs because a different buffer is accessed for writing and reading on a per-area basis. Furthermore, since only a written area is read out from the other buffer when a new frame is read out after writing is completed, the operation of copying an updated area between the buffers in consideration of consistency between the buffers becomes unnecessary. As copying is not necessary, memory accesses can be reduced, which in turn can decrease power consumption.

Second Embodiment

Figure 16:
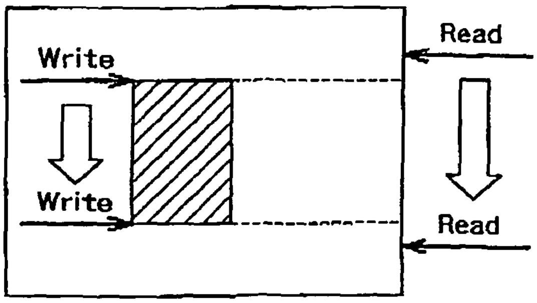
FIG. 16 illustrates an example where an overtaking occurs according to a second embodiment.
Figure 17:
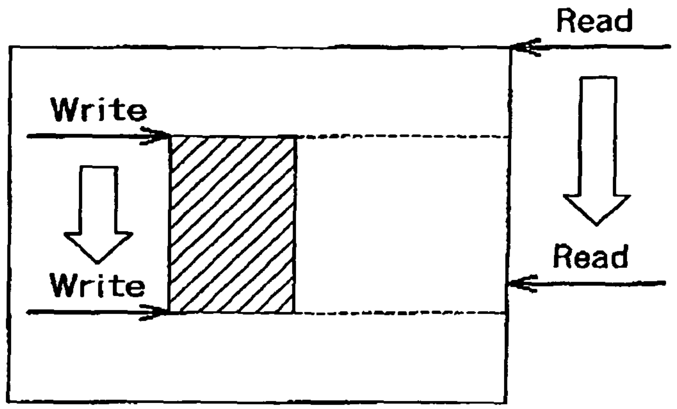
FIG. 17 shows an example where an overtaking does not occur according to the second embodiment.

The previous embodiment operates so as to always avoid overtaking. But in reality, overtaking does not occur in some cases even when the same buffer as the read buffer is written. For example, when writing scan is slower than reading scan, an overtaking occurs in the case of FIG. 16 but not in the case of FIG. 17. When an overtaking does not occur, the same buffer as the read buffer may be written. When an image is written to the other buffer than the read buffer, the written image will be read out in the next read-out frame. On the other hand, especially in such a case as shown in FIG. 17, if an image is written to the same buffer as the read buffer, delay before reading of the image becomes shorter because reading is performed immediately after writing. Thus, it is preferable to determine whether an overtaking will occur before writing an image and write the image to the buffer same as the read buffer if an overtaking does not occur. The second embodiment of the invention provides an overview of operations including such an operation.

Figure 18:
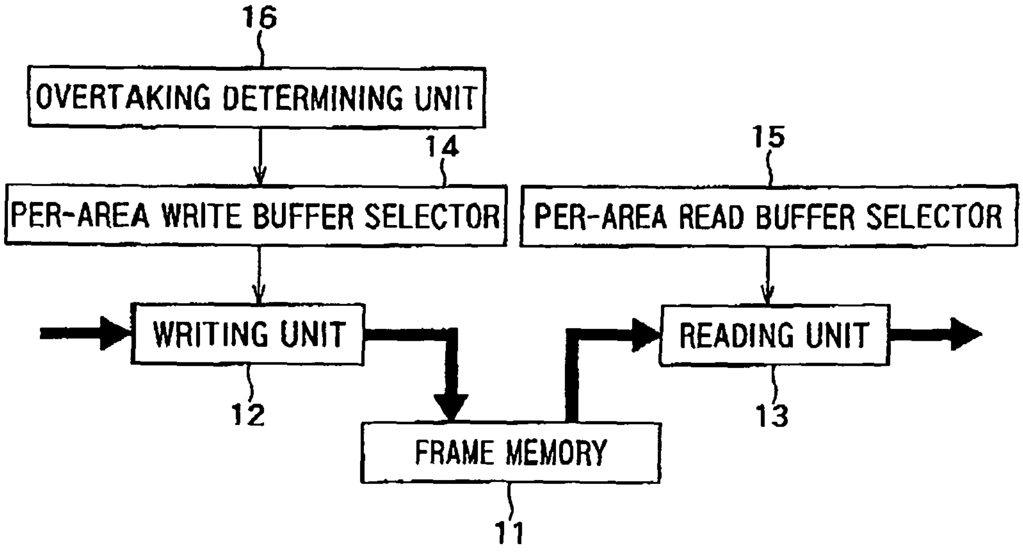
FIG. 18 shows a configuration of the image generating apparatus as the second embodiment.

FIG. 18 shows a configuration of the present embodiment, in which an overtaking determining unit 16 is added to the previous embodiment shown in FIG. 10. First, prior to writing an updated image, the overtaking determining unit 16 determines whether an overtaking will occur by the time the image has been written based on such information as the speed of writing scan, the positions where writing starts and ends, the speed of reading scan, the positions where reading starts and ends, and the like. Overtaking includes both overtaking of reading scan by writing scan and overtaking of writing scan by reading scan.

Figure 19:
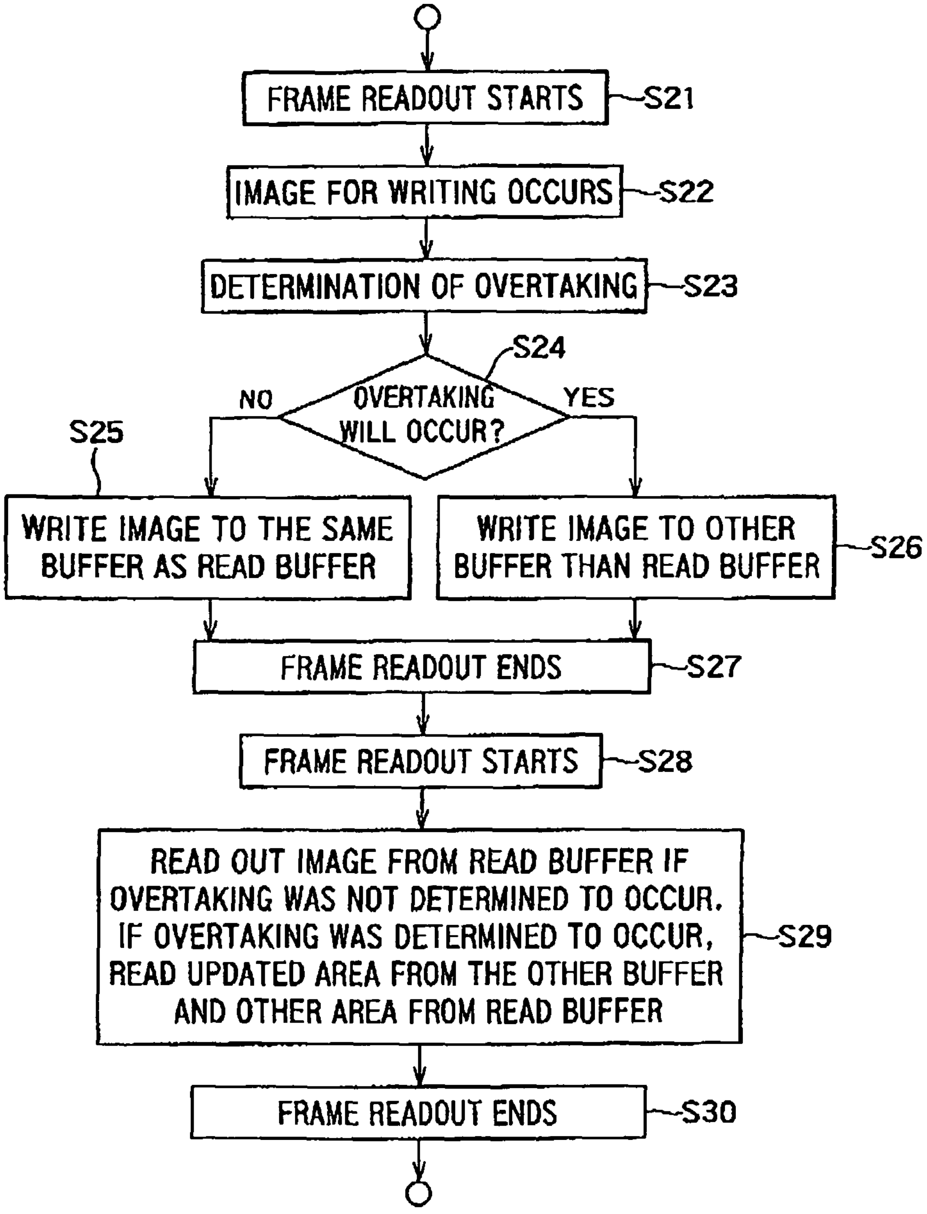
FIG. 19 is a flowchart illustrating an operational procedure of the apparatus of FIG. 18 according to the second embodiment.
Figure 20:
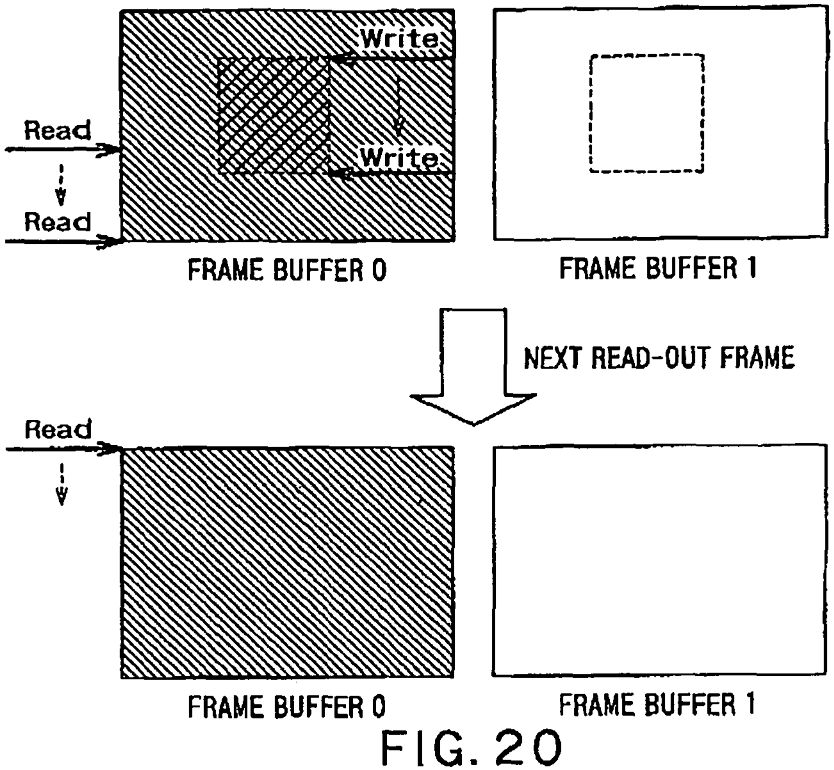
FIG. 20 shows the simplest example for illustrating the operation of the apparatus of FIG. 18 according to the second embodiment.

The operational procedure for writing an image under conditions similar to FIG. 11 is shown in FIG. 19. Reading of a frame starts (S21), and when an image to be written occurs (S22), determination of overtaking is performed before writing the image (S23). If it is determined that an overtaking will not occur (No at S24), operations like FIG. 20 are performed. In FIG. 20, as in the previous examples, the area shaded with diagonal lines from upper left to lower right denotes the read-out area, and the area shaded with diagonal lines from upper right to lower left denotes an area in which an updated image is written. Unlike FIG. 11, writing is performed in the read-out area (S25). Since the image is written in the read-out area, even after the writing is completed and frame reading is finished (S27), and when a new frame is read out by reading (S28), the read buffer remains unchanged (S29). If the overtaking determining unit 16 determines that an overtaking will occur when an image is to be written (YES at S24), writing of the image and reading of the next frame operate as in the first embodiment in the manner shown in FIG. 11 (S26 to S29). When frame reading is completed (S30), the procedure moves on to reading of the next frame. If an image for writing occurs during the frame reading period from S27 to S30, selection of a buffer and writing of the image to the buffer are performed in parallel with frame reading in accordance with the flow from S23 to S26.

Figure 21:
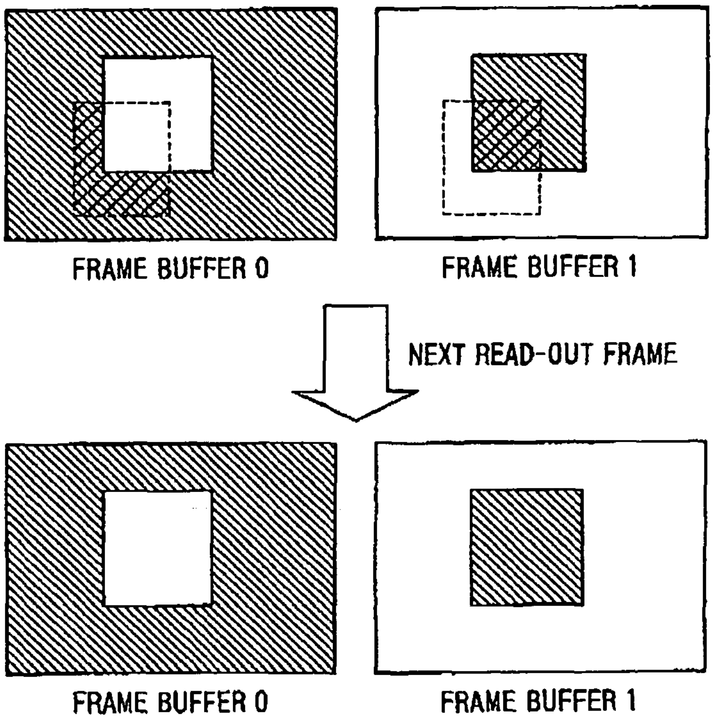
FIG. 21 shows another example for illustrating the operation of the apparatus of FIG. 18 according to the second embodiment.

Next, FIG. 21 shows the case of FIG. 13 without occurrence of an overtaking. A difference from FIG. 13 is again that the read buffer is selected and written for each read-out area. Although a buffer is selected for each area, the read buffer is selected and the area is written to the buffer. Accordingly, the read buffer remains unchanged when a new frame is read out by reading after writing is completed. Also in this case, if it is determined that an overtaking will occur, operations are performed as shown in FIG. 13.

Figure 22:
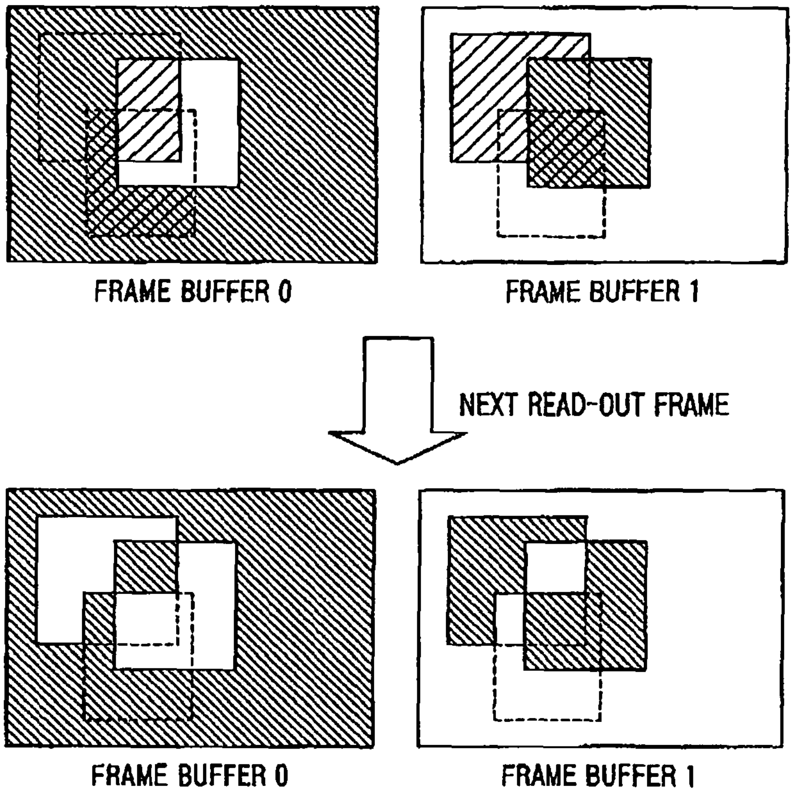
FIG. 22 shows another example for illustrating the operation of the apparatus of FIG. 18 according to the second embodiment.

Next, FIG. 22 illustrates a case where images are sequentially written, which corresponds to FIG. 14. The case of FIG. 22 is when two updated images are written, but it is determined that an overtaking will occur for the first image written in the upper left portion and not for the second image written in the lower left portion. In this case, each area of the upper left image for which an overtaking will occur is written to the other buffer than the read buffer as in FIG. 14, and the lower left image for which no overtaking occurs is written to the same buffer as the read buffer. Since the lower left image overwrites the upper left image, the read buffer is toggled for the upper left image when a new frame is read out by reading after writing is finished. On the other hand, the read buffer is not toggled for the lower left image, and especially in the area over which the two images overlap, higher priority is given to the image being overwritten. In other words, the read buffer is not toggled for the overlapping portion.

As has been described, this embodiment showed the operation of determining whether an overtaking will occur before writing an image, and writing each area to the same buffer as the read buffer if no overtaking will occur and writing each area to the buffer other than the read buffer if an overtaking will occur. As a result, a written image can be read out with shorter delay when no overtaking occurs.

Third Embodiment

Figure 23:
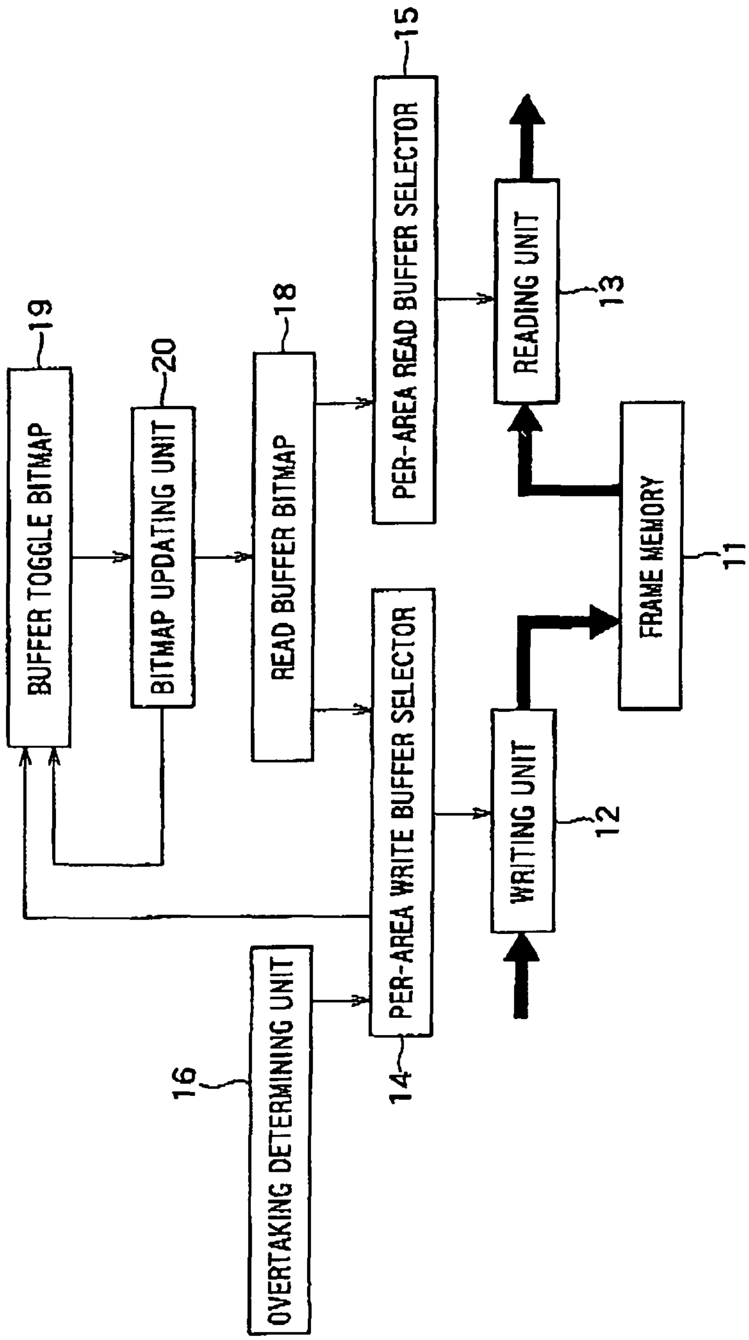
FIG. 23 shows a configuration of the image generating apparatus as a third embodiment.

While the previous embodiments showed the general operation of the present invention, a third embodiment provides specific operations of processing for selecting a buffer for each area. The third embodiment of the invention is shown in FIG. 23. In addition to the elements of FIG. 18, FIG. 23 includes a read buffer BITMAP (read buffer retaining unit) 18, a buffer toggle BITMAP (read buffer toggle retainer) 19, and a BITMAP updating unit (read buffer updating unit) 20. The read buffer BITMAP 18 is bitmap information in which one bit corresponds to each pixel of an image frame. That is, an image frame of resolution XGA (1024 pixels wide and 768 pixels high) has an area of 1024×768=786432 bits. Each bit information (readout information) shows from which one frame buffer of the two buffers a corresponding pixel should be read out. For instance, a pixel for which 0 is set means the pixel should be read from the frame buffer 0 and a pixel for which 1 is set means the pixel should be read from the frame buffer 1. The buffer toggle BITMAP 19 has a storage area of the same size as the read buffer BITMAP 18 that corresponds one-to-one to the read buffer BITMAP 18, and each bit corresponds to a pixel of an image frame. For example, a pixel for which "1" (toggle information) is written in the buffer toggle BITMAP 19 means the read buffer should be toggled when the reading unit 13 reads out a new frame after the writing unit 12 writes an updated image. The BITMAP updating unit 20 performs inversion of the read buffer BITMAP 18 using information in the buffer toggle BITMAP 19 and also conducts BITMAP updating which is resetting of the buffer toggle BITMAP 19 with all "0"s. The read buffer BITMAP 18 and buffer toggle BITMAP 19 are realized by a storage medium such as SDRAM and SRAM, for example, but they are not specifically limited thereto.

Figure 24:
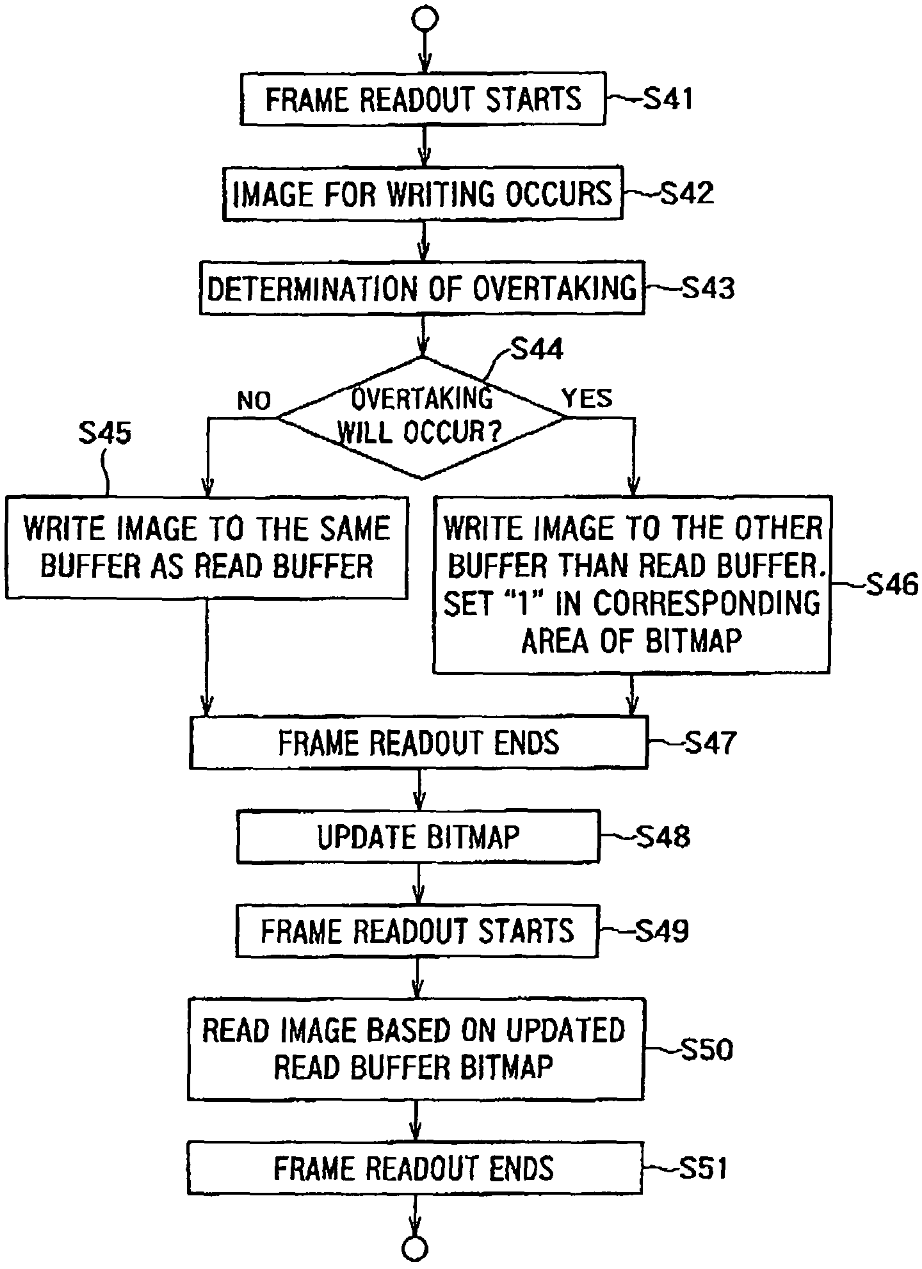
FIG. 24 is a flowchart illustrating the operation of the apparatus of FIG. 23 according to the third embodiment.
Figure 25:
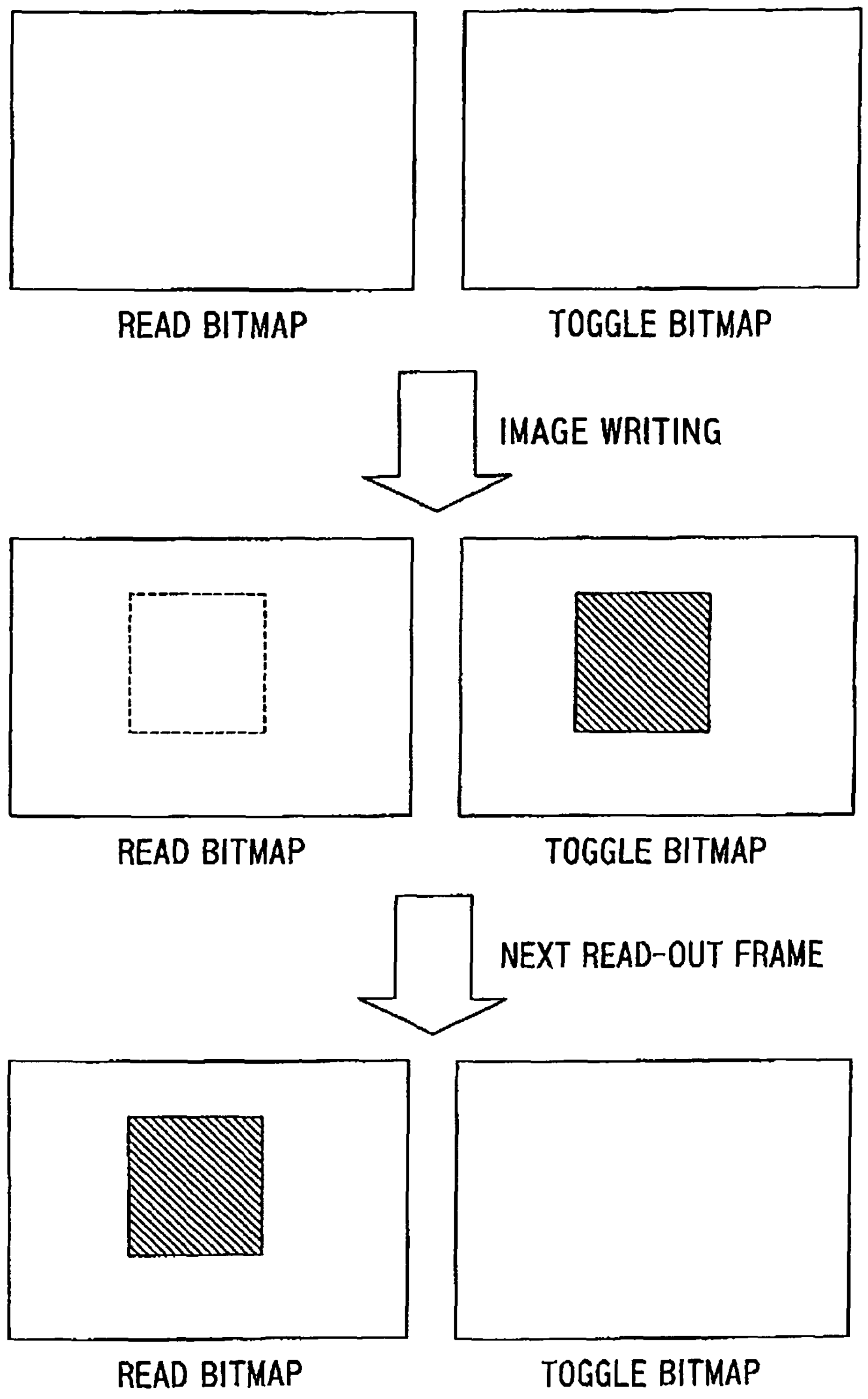
FIG. 25 shows contents of a read buffer BITMAP and a buffer toggle BITMAP in the case of FIG. 11 according to the third embodiment.

The operational procedure is shown in FIG. 24. Specific operations are as follows. The read buffer BITMAP 18 and buffer toggle BITMAP 19 with respect to the operation of FIG. 11 are shown in FIG. 25. In both the BITMAPS, the shaded areas in the figure mean that "1" is written therein and "0" is written in the other area. The procedure of FIG. 11 starts with the frame buffer 0 being the read buffer for the entire area of an image frame. This is realized by an operation of selecting the frame buffer 0 for every area because the read buffer BITMAP 18 has all "0"s, which is read out by the per-area read buffer selector 15 to reveal that all the areas have "0".

As mentioned in the second embodiment, FIG. 11 shows operations of when the overtaking determining unit 16 determines that an overtaking will occur. That is, frame reading starts (S41) and when an image to be written occurs (S42), determination of overtaking is performed before writing the image (S43), and it is determined that an overtaking will occur (YES at S44). Since it is determined that an overtaking will occur, the image is written to the frame buffer 1 (S46). More specifically, first, when the writing unit 12 writes the image, the per-area write buffer selector 14 references read buffer information in the read buffer BITMAP 18 that corresponds to the area to be written, and determines that the frame buffer 0 should be the read buffer because "0" is set in it. Since it is determined that an overtaking will occur, the per-area write buffer selector 14 selects as the write buffer the frame buffer 1 which is the other buffer than the read buffer, and the writing unit 12 accordingly writes the image.

The buffer toggle BITMAP 19 also starts with all areas being "0", but after the image is written to the frame buffer 1 by the writing unit 12, the per-area write buffer selector 14 sets "1" (updated information) in a corresponding area of the buffer toggle BITMAP 19 as shown on the right portion of the middle column in FIG. 25 (S46). Then, the image writing is finished and thereafter reading of the present frame is finished (S47), and in an interim period before reading of the next frame starts (e.g., a vertical blank period of an image being generated), the BITMAP updating unit 20 reads out all information in the buffer toggle BITMAP 19, and inverts any bit of the read buffer BITMAP 18 that has "1" in the corresponding bit in the buffer toggle BITMAP 19 (S48). Specifically, calculation of new read-out bits=[read-out bits XORed with inverted bits] is performed on all bits between corresponding bits of the read buffer BITMAP 18 and the buffer toggle BITMAP 19. At the same time, all bits of the buffer toggle BITMAP 19 are reset to "0"s (non-updated information) (S48). As a result, the read buffer BITMAP 18 becomes the one shown at the lower left corner of FIG. 25, and when reading of a new frame starts (S49), only the portion in which the updated image is written is read out from the frame buffer 1 and the other portion is read out from the frame buffer 0 based on the updated read buffer BITMAP 18 (S50). When the frame reading is completed (S51), the procedure proceeds to reading of the next frame.

If it is not determined that an overtaking will occur as in FIG. 20 (NO at S44), the image is written to the same buffer as the read buffer, and no "1" is set in the buffer toggle BITMAP 19 and all bits remain "0" (S45). Then, reading of the present frame is finished (S47), and before reading of the next frame starts, BITMAP updating is performed (S48), and reading of a new frame starts (S49). Since no "1" is set and all the bits remain "0" in the buffer toggle BITMAP 19, the read buffer BITMAP 18 has not changed since the last frame reading even when reading of the new frame is started.

If an image for writing occurs during the frame reading period from S49 to S51, selection of a buffer and writing of the image to the buffer are performed ("1" is also set in the buffer toggle BITMAP 19 when step S46 is performed) in accordance with the flow from S43 to S46 in parallel with the frame reading.

Figure 26:
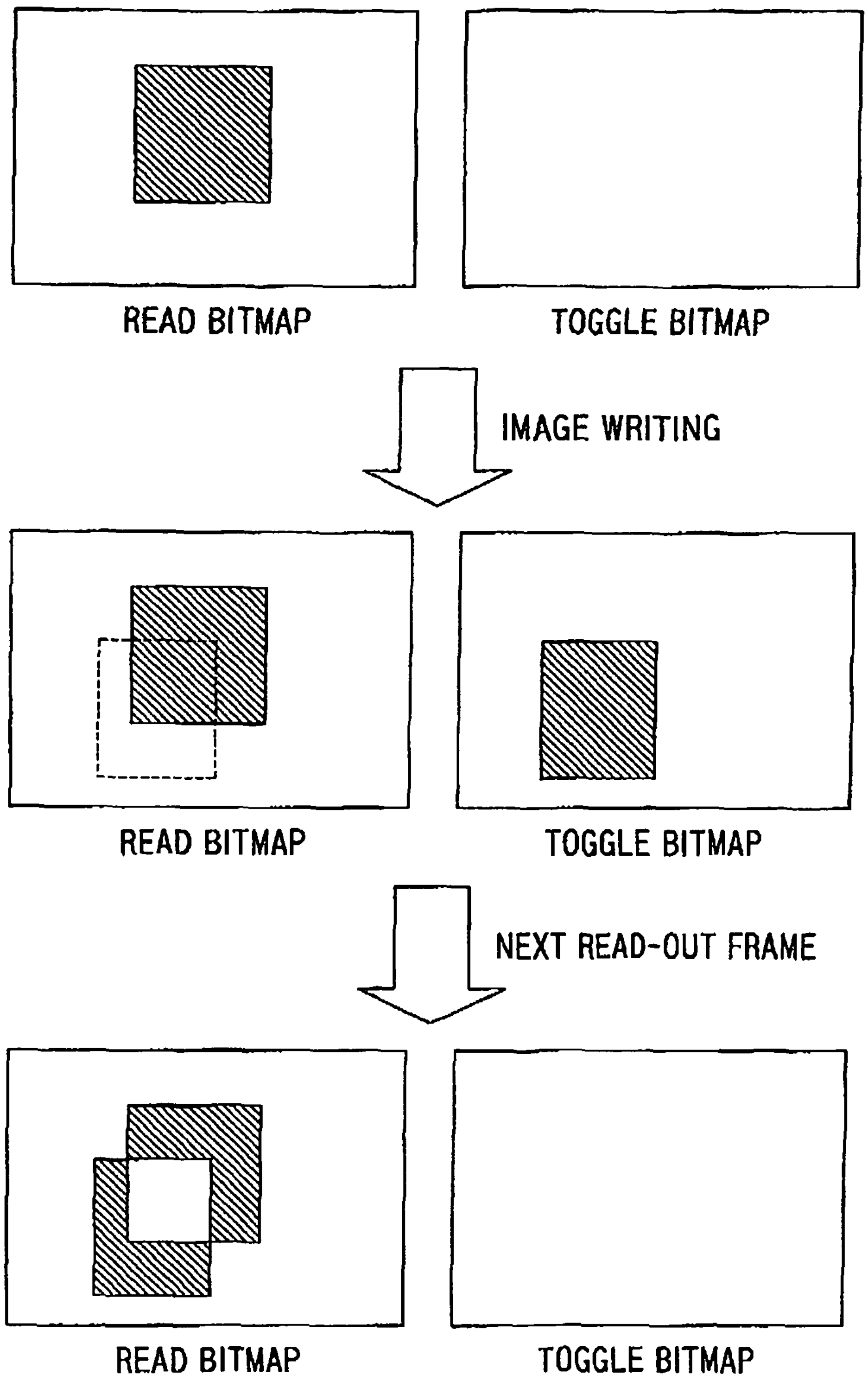
FIG. 26 shows contents of the read buffer BITMAP and the buffer toggle BITMAP in the case of FIG. 13 according to the third embodiment.

The read buffer BITMAP 18 and buffer toggle BITMAP 19 in the case of FIG. 13 are shown in FIG. 26. An operation of reading out an area positioned about the center of an image frame from the frame buffer 1 and the other area from the frame buffer 0 is realized by the read buffer BITMAP 18 being as illustrated at top left in FIG. 26. After the image is written, "1" is set in corresponding bits of the buffer toggle BITMAP 19 as in the previous examples, and when moving to the next read-out frame after the image writing, information in the read buffer BITMAP 18 is inverted using information in the buffer toggle BITMAP 19. As a result, the read buffer BITMAP 18 becomes the one shown at bottom left of FIG. 26, and the read buffer is selected as illustrated in the lower portion of FIG. 13.

When an overtaking does not occur as in FIG. 21, the read buffer BITMAP 18 and the buffer toggle BITMAP 19 do not change and remain the ones shown in the middle column of FIG. 26 even after image writing and transition to the next read-out frame.

Figure 27:
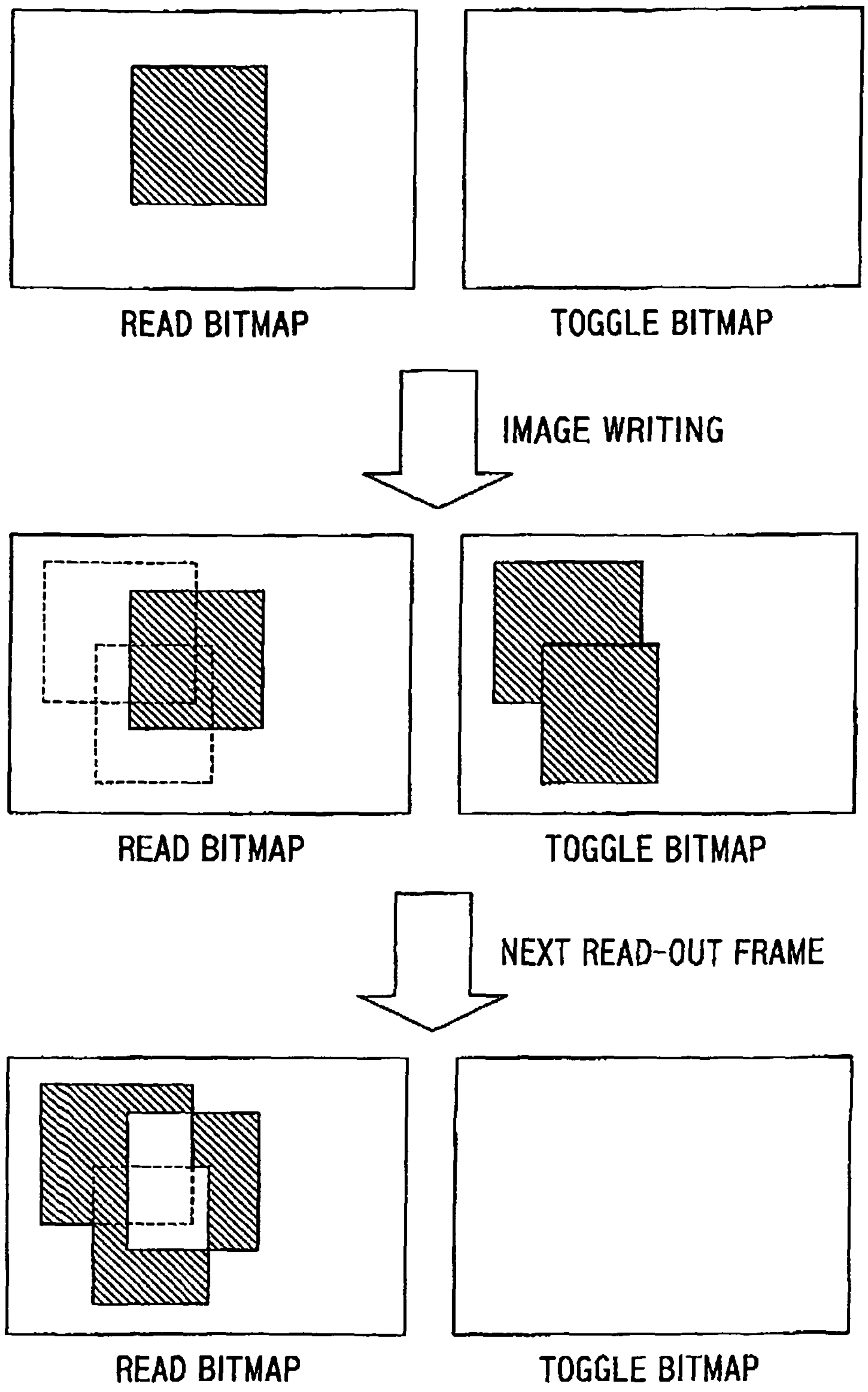
FIG. 27 shows contents of the read buffer BITMAP and the buffer toggle BITMAP in the case of FIG. 14 according to the third embodiment.
Figure 28:
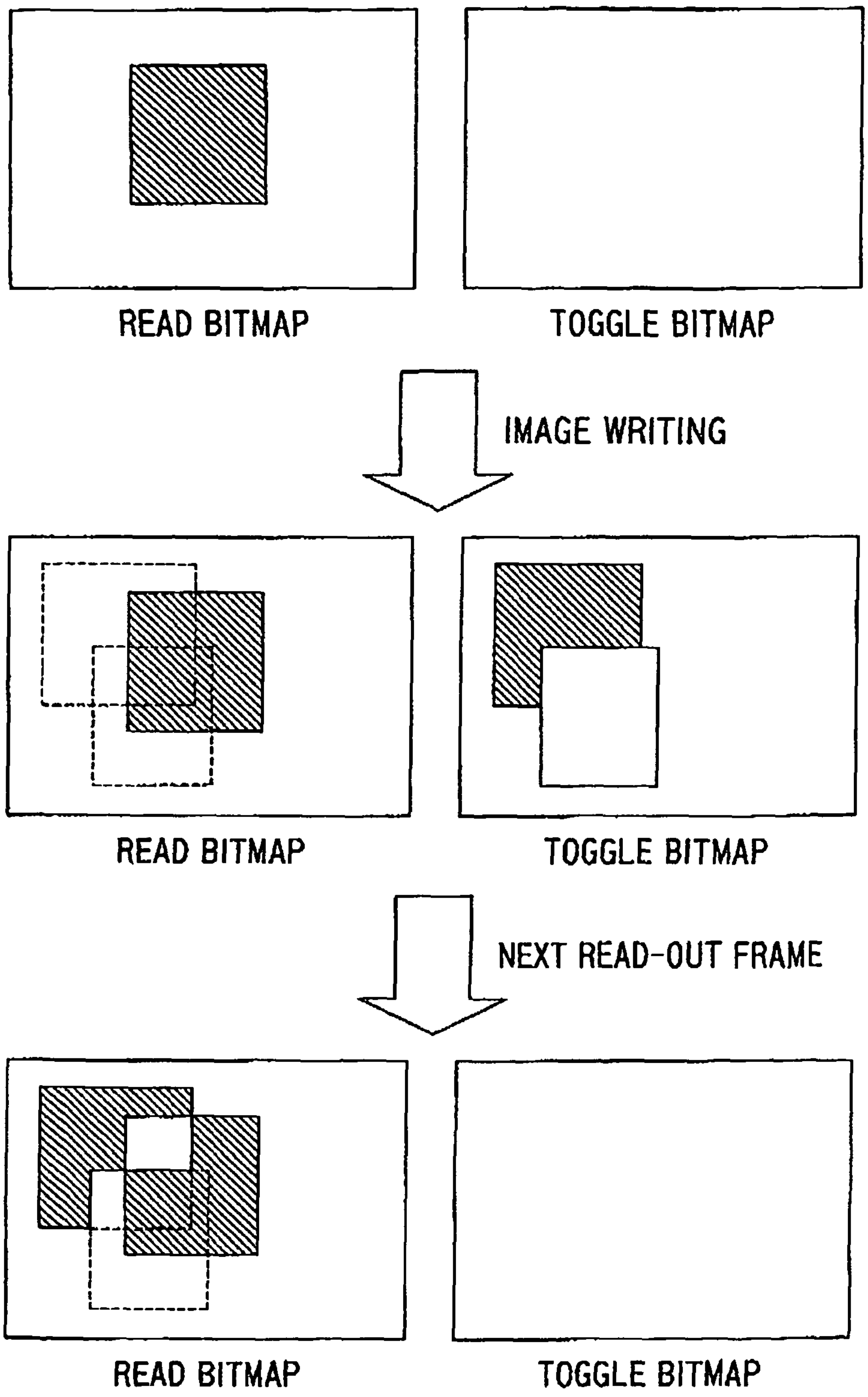
FIG. 28 shows contents of the read buffer BITMAP and the buffer toggle BITMAP in the case of FIG. 22 according to the third embodiment.

The read buffer BITMAP 18 and buffer toggle BITMAP 19 in the case of FIG. 14 are shown in FIG. 27, and those in the case of FIG. 22 are shown in FIG. 28. Even if updated images occur in succession, the buffer toggle BITMAP 19 simply overwrites information that was set first with information that was set later. In the case of FIG. 28, for example, when the upper left image for which an overtaking will occur is first written, "1" is set in a corresponding area of the buffer toggle BITMAP 19, but when the lower left image for which no overtaking will occur is subsequently written, "0" is set in a corresponding area by overwriting. With such operations, in a read-out frame after completion of writing, for the overlapping portion of the two images, higher priority is given to the subsequently written image for which an overtaking does not occur and the read buffer is not toggled as mentioned above.

Figure 29:
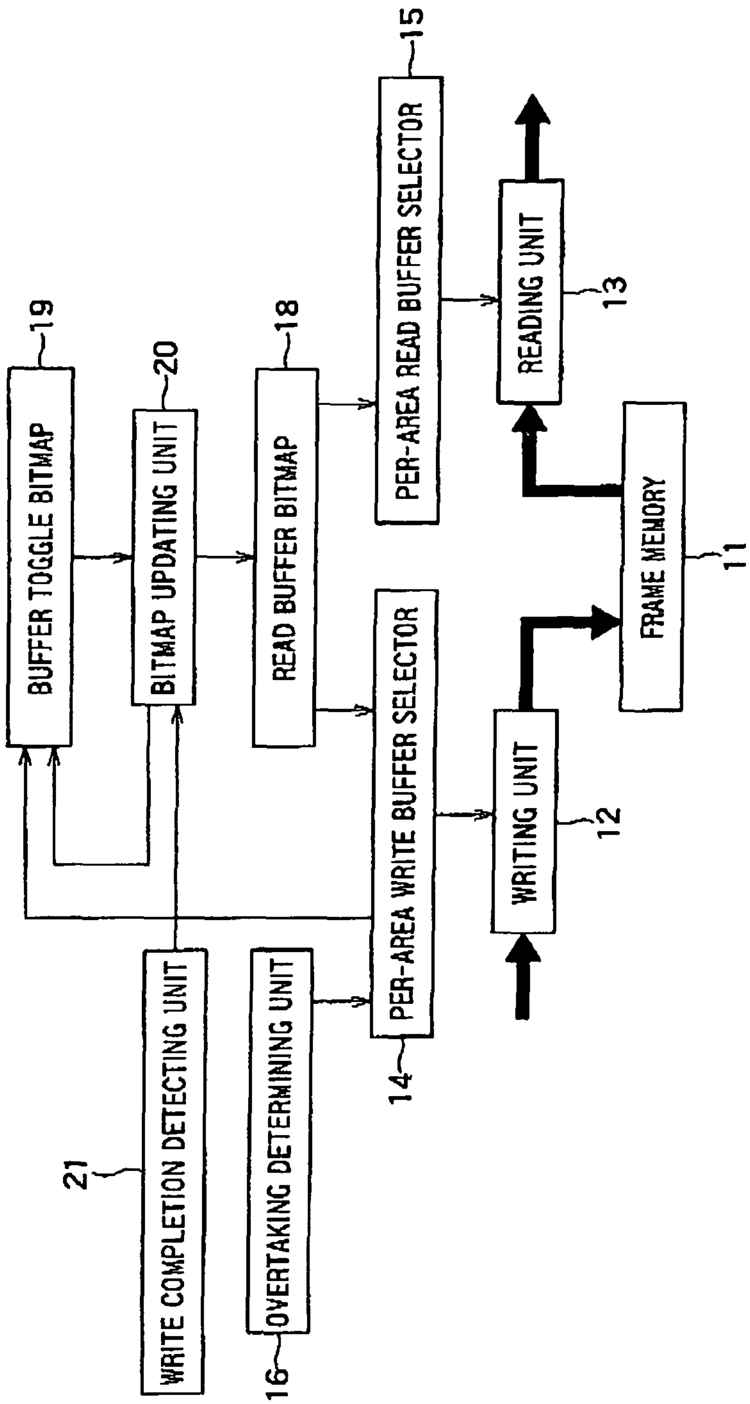
FIG. 29 shows a configuration which adds a write completion detecting unit to the apparatus of FIG. 23 according to the third embodiment.

In updating of the BITMAP, if no access was made to the buffer toggle BITMAP 19 by the writing unit 12 during the immediately preceding frame reading period, update may be skipped because it is known that the buffer toggle BITMAP 19 has all "0"s. This can be realized by detecting whether writing of an image to the other buffer than the read buffer has finished. A configuration including a write completion detecting unit 21 that performs this operation is illustrated in FIG. 29. By performing such detection and updating the BITMAP only when a completion of writing is detected, memory accesses to BITMAP information are reduced, which can decrease power consumption and therefore make the effect of the present invention more apparent.

While information on the read buffer and buffer toggling for each area is managed as BITMAP information in the examples above, the present invention is not limited thereto. When the image is a rectangle, the information may also be managed as a set of information in the form of vectors, such as the X and Y coordinates of the upper left corner of the rectangle, length and width thereof, and the like.

Fourth Embodiment

An image may be written across read-out frame periods. That is, when the BITMAP is updated by the BITMAP updating unit 20, writing of an image may have not finished yet and be still in progress. This embodiment describes several configurations that can address such a situation.

Figure 30:
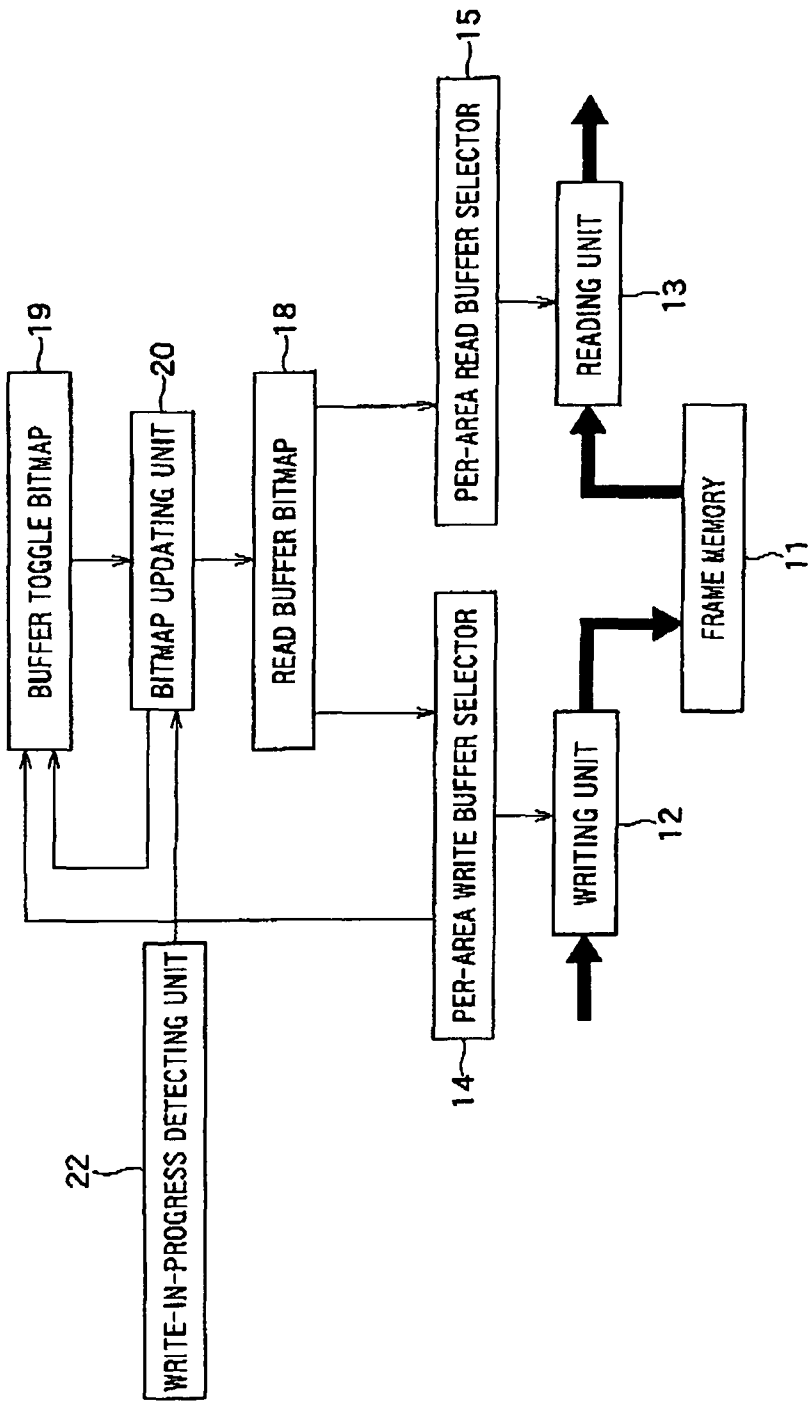
FIG. 30 shows a configuration of the image generating apparatus as a fourth embodiment.

First, a basic configuration for a case without overtaking determination is shown in FIG. 30. Compared to FIG. 23, FIG. 30 includes a write-in-progress detecting unit 22. Detection of write in progress detects whether an image is currently being written. The BITMAP updating unit 20 does not update the BITMAP if the write-in-progress detecting unit 22 detects that writing is in progress.

Figure 31:
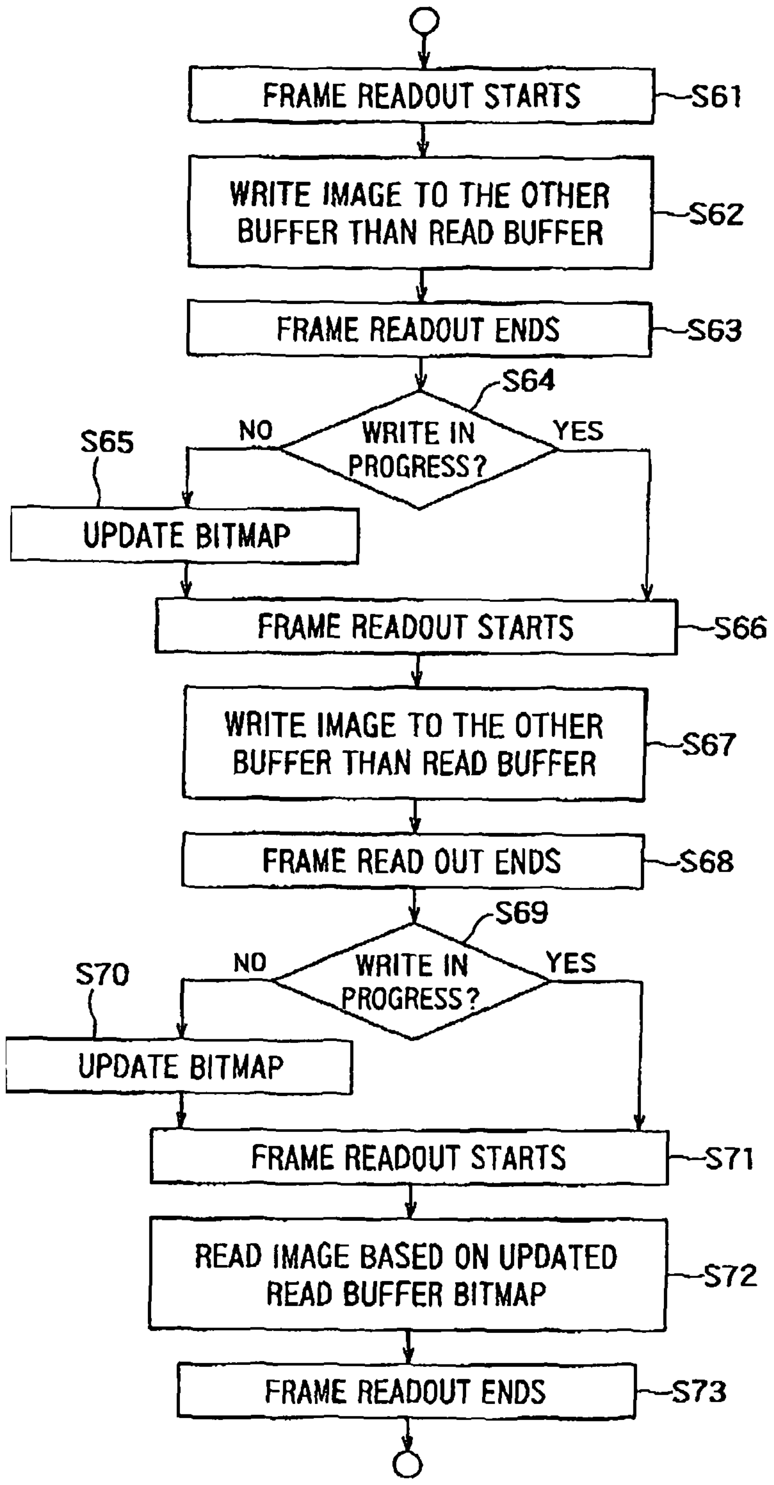
FIG. 31 is a flowchart illustrating the operation of the apparatus of FIG. 30 according to the fourth embodiment.
Figure 32:
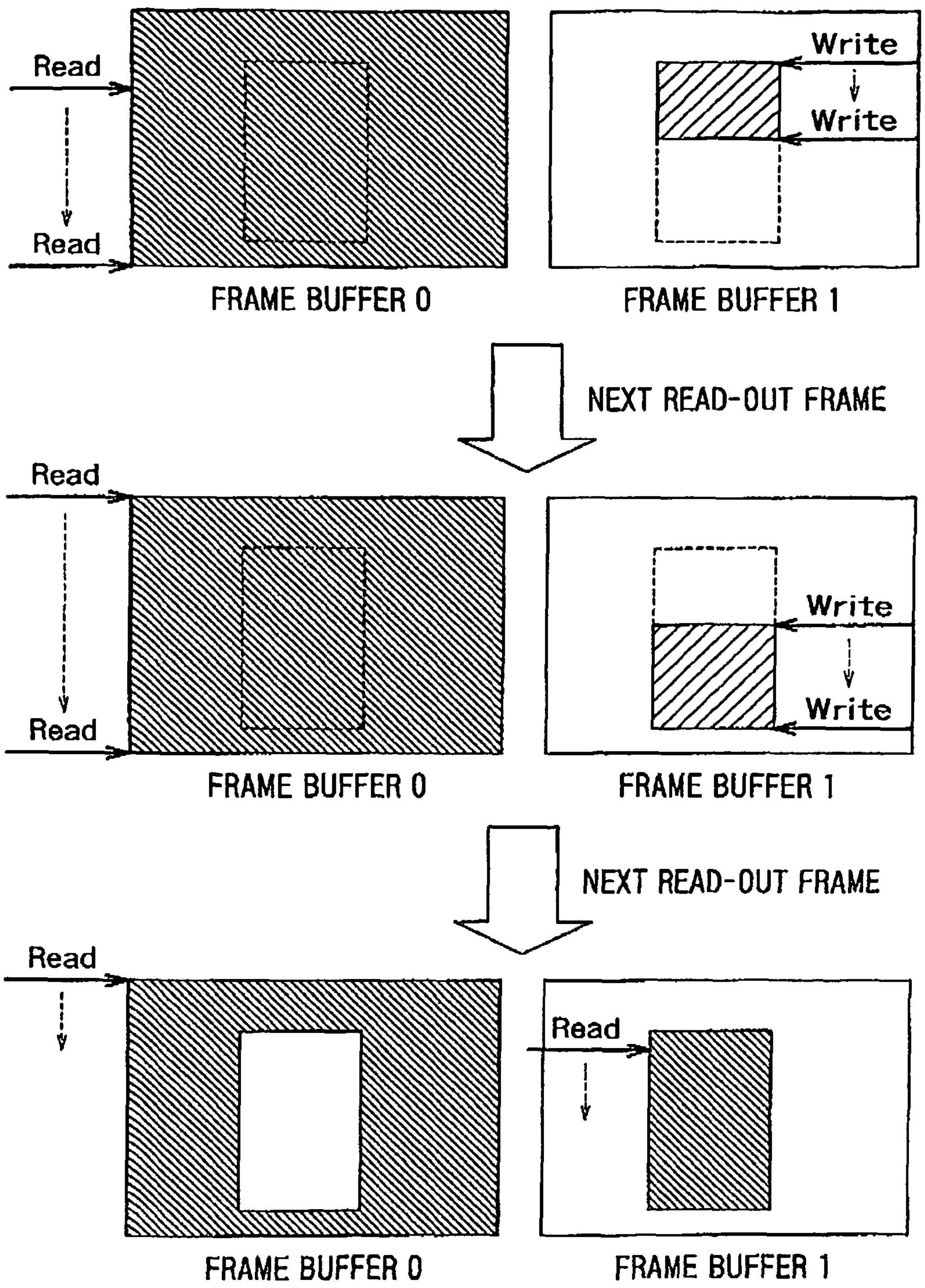
FIG. 32 illustrates an exemplary operation of frame buffers according to the fourth embodiment.

The procedure of this operation is shown in FIG. 31 and specific operation of the frame buffers is illustrated in FIG. 32. When writing an image, the per-area write buffer selector 14 selects the frame buffer 1 which is the other buffer than the read buffer, and the writing unit 12 writes the image to the frame buffer 1 (S61 to S63). As the image is being written in the first and second read-out frame periods, the write-in-progress detecting unit 22 detects that writing is in progress (YES at S64), thus the BITMAP updating unit 20 does not update the BITMAP. When moving to the third read-out frame period, writing of the image has finished (NO at S69). The BITMAP is therefore updated (S70), and the written image can be correctly read out in the third read-out frame period (S72).

Figure 33:
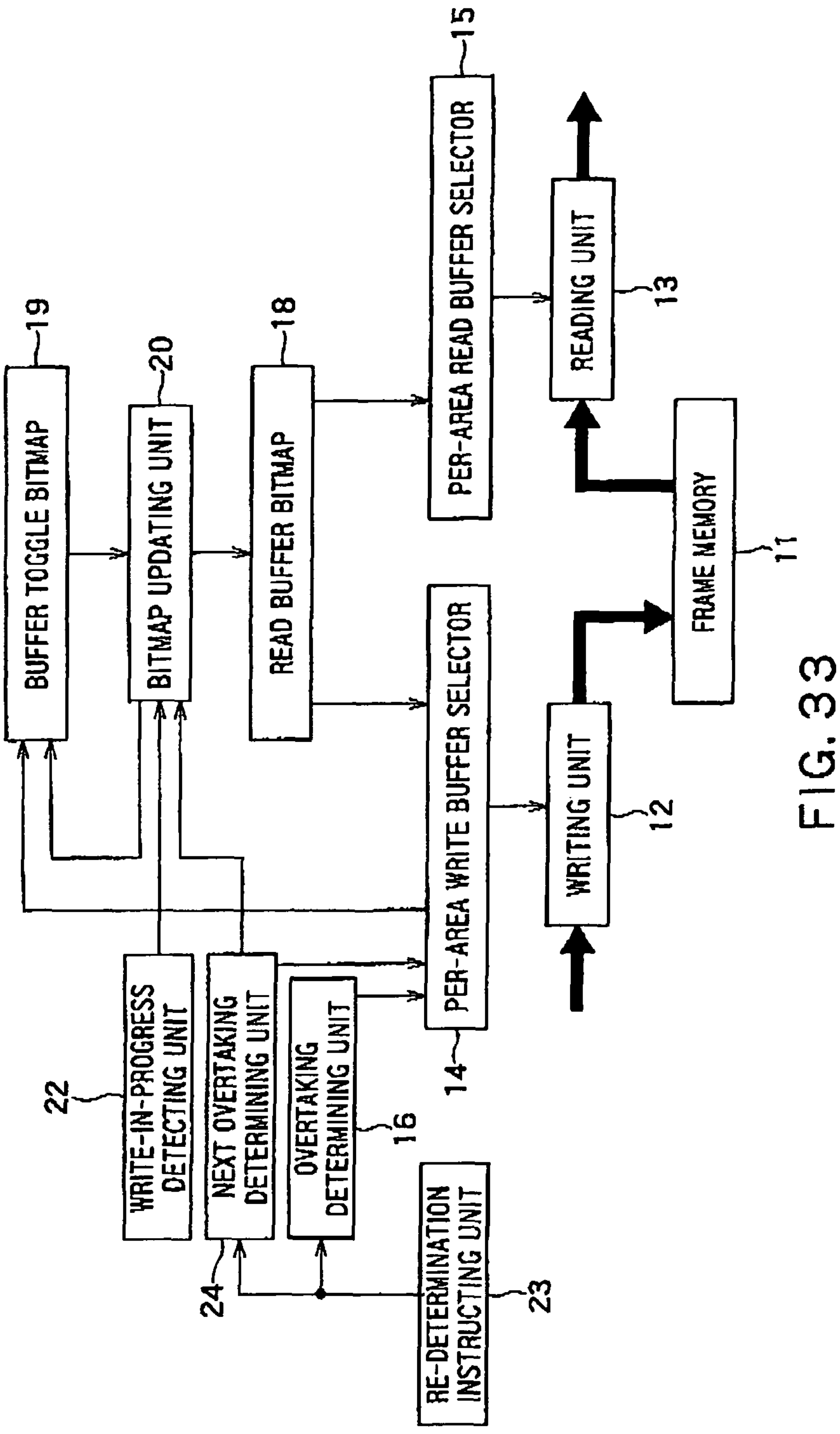
FIG. 33 shows a configuration of the image generating apparatus which is different from that of FIG. 30 according to the fourth embodiment.

Next, a case with overtaking determination is described. When determination of overtaking is performed, if an overtaking will occur in the next reading period, an image that spans two read-out frame periods cannot be read in the next read-out frame period, for example. Accordingly, a similar operation to FIG. 32 should be performed: the written image will be read out in reading of the frame after the next frame. On the other hand, if an overtaking occurs in the present read-out frame period but not in the next read-out frame period, the written image can be read out in the next frame reading. FIG. 33 shows a configuration for operation that is based on both whether an overtaking occurs in the present read-out frame period and whether an overtaking will occur in the next read-out frame period as described above. FIG. 33 includes an overtaking determining unit 16, a next overtaking determining unit 24, and a re-determination instructing unit 23 in addition to the elements of FIG. 30, and is different in that the BITMAP updating unit 20 determines whether to update the BITMAP based on a result from the next overtaking determining unit 24. The overtaking determining unit 16 determines whether an overtaking occurs in the image currently being written. In the present read-out frame period as mentioned above, and the next overtaking determining unit 24 determines whether an overtaking will occur in writing of the remaining portion of the currently written image in the next read-out frame period. Every time a new read-out frame period is entered when an image is written across a number of read-out frame periods, the re-determination instructing unit 23 instructs the overtaking determining unit 16 to again determine whether an overtaking will occur in the new read-out frame, period and the next overtaking determining unit 24 to again determine whether an overtaking will occur in the read-out frame period following the new read-out frame period. If the next overtaking determining unit 24 determines that no overtaking will occur in the next read-out frame period, the BITMAP updating unit 20 updates the BITMAP even if the write-in-progress detecting unit 22 detects that writing is in progress. The per-area write buffer selector 14 and per-area read buffer selector 15 then select a buffer based on information in the updated read buffer BITMAP 18 and information on overtaking and next overtaking determinations.

Figure 34:
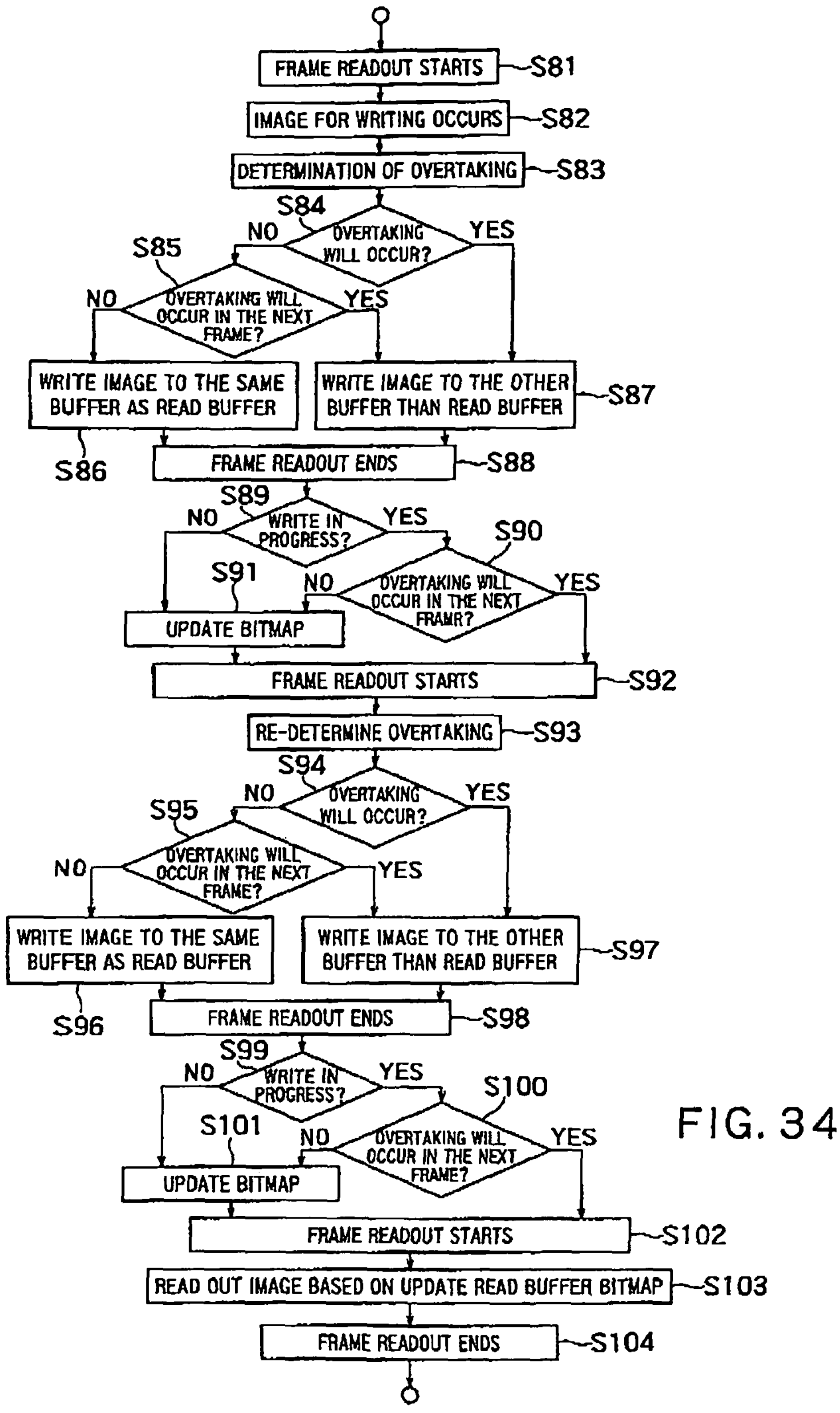
FIG. 34 is a flowchart illustrating the operation of the apparatus of FIG. 33 according to the fourth embodiment.

The procedure of this operation is shown in FIG. 34. Describing the operation of FIG. 32 first, as an overtaking will occur in the next read-out frame period in FIG. 32 (YES at S85), the next overtaking determining unit 24 determines an overtaking will occur and an image is written to the frame buffer 1 which is the other buffer than the read buffer even in the present read-out frame period (S87). Thereafter, frame reading is finished (S88), and when the procedure moves to the next read-out frame, the image is being written at the time (YES at S89), and the next overtaking determining unit 24 determines that an overtaking will occur (YES at S90). Accordingly, the BITMAP updating unit 20 does not update the BITMAP and the read buffer remains the same. When the next read-out frame period is entered (S92), the re-determination instructing unit 23 instructs the overtaking determining unit 16 and the next overtaking determining unit 24 to perform re-determination (S93). They respectively determine that an overtaking will occur (YES at 594) and that no overtaking will occur (because image writing will finish in the present read-out frame period). Based on these results, the writing unit 12 writes the remaining area of the image to the frame buffer 1, the other buffer than the read buffer (S97). Then, when the read-out frame period ends (S98), as writing is now finished (NO at S99), the BITMAP updating unit 20 updates the BITMAP (S101). The read buffer is toggled so that the written image is read out, and the written image can be read out in the next read-out frame period (S102 to S104).

Figure 35:
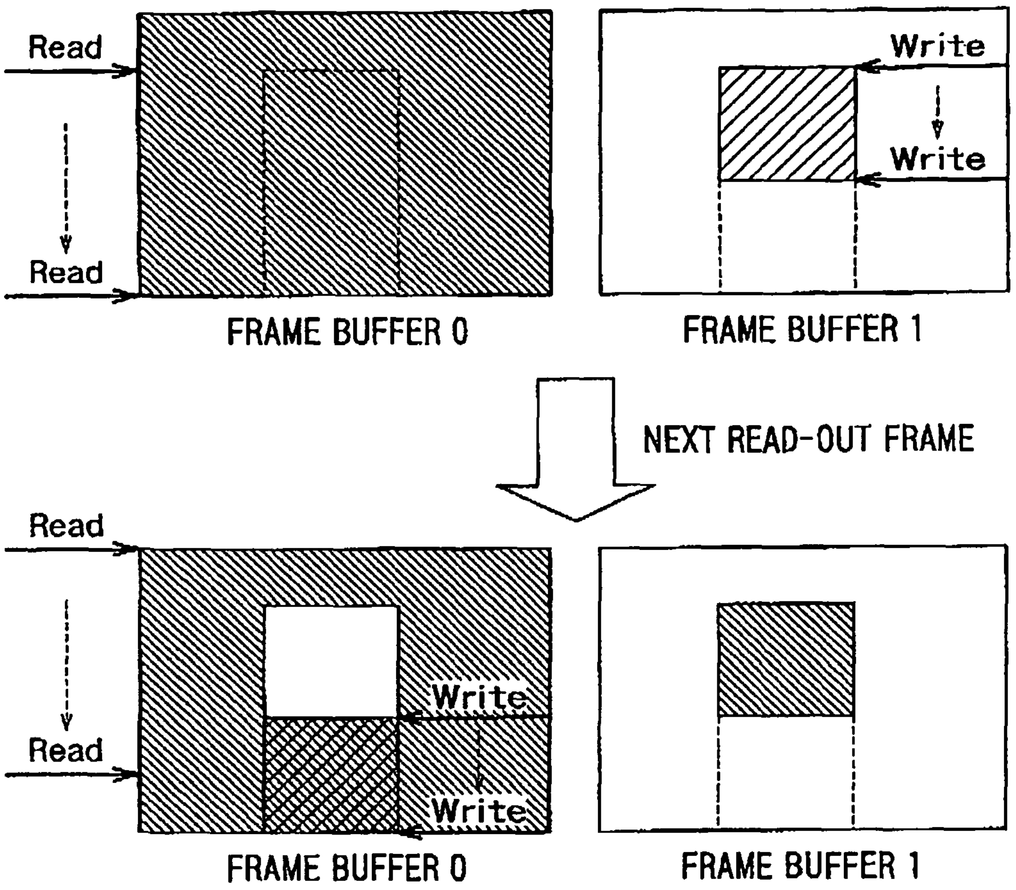
FIG. 35 illustrates an exemplary operation of frame buffers according to the fourth embodiment.

Next, FIG. 35 illustrates specific operations of the frame buffers in a case where no overtaking occurs in the second read-out frame period. Since an overtaking first occurs in the present read-out frame period for the image written in FIG. 35, the overtaking determining unit 16 determines that an overtaking will occur (YES at S84), and the per-area read buffer selector 15 selects the frame buffer 1, the one not being the read buffer, and the writing unit 12 writes the image to the frame buffer 1 (S87). Thereafter, the present read-out frame period ends (S88), but the write-in-progress detecting unit 22 detects that the image is now being written because writing of the image has not completed (YES at S89). However, as the next overtaking determining unit 24 does not determine that an overtaking will occur in this case (NO at S90), the BITMAP is updated in accordance with the above-mentioned operations (S91). Consequently, the area which was written in the previous read-out frame period becomes the read buffer in the next read-out frame period, thus the image can be read out. At this point, the re-determination instructing unit 23 instructs the overtaking determining unit 16 and next overtaking determining unit 24 to perform re-determination. The overtaking determining unit 16 determines that no overtaking occurs in the current read-out frame (NO at S94), and the next overtaking determining unit 24 also determines that there will be no overtaking (because image writing will finish in the present read-out frame period) (NO at S95). This causes the per-area write buffer selector 14 to select as the read buffer the frame buffer 0 that is the same as the read buffer, the writing unit 12 writes an image to the frame buffer 0 (S96), and the remaining area of the image can also be read out in this read-out frame period. Since the result or re-determination by the overtaking determining unit 16 is actually the same as that by the next overtaking determining unit 24 in the previous read-out frame period, the information may be utilized here.

Figure 36:
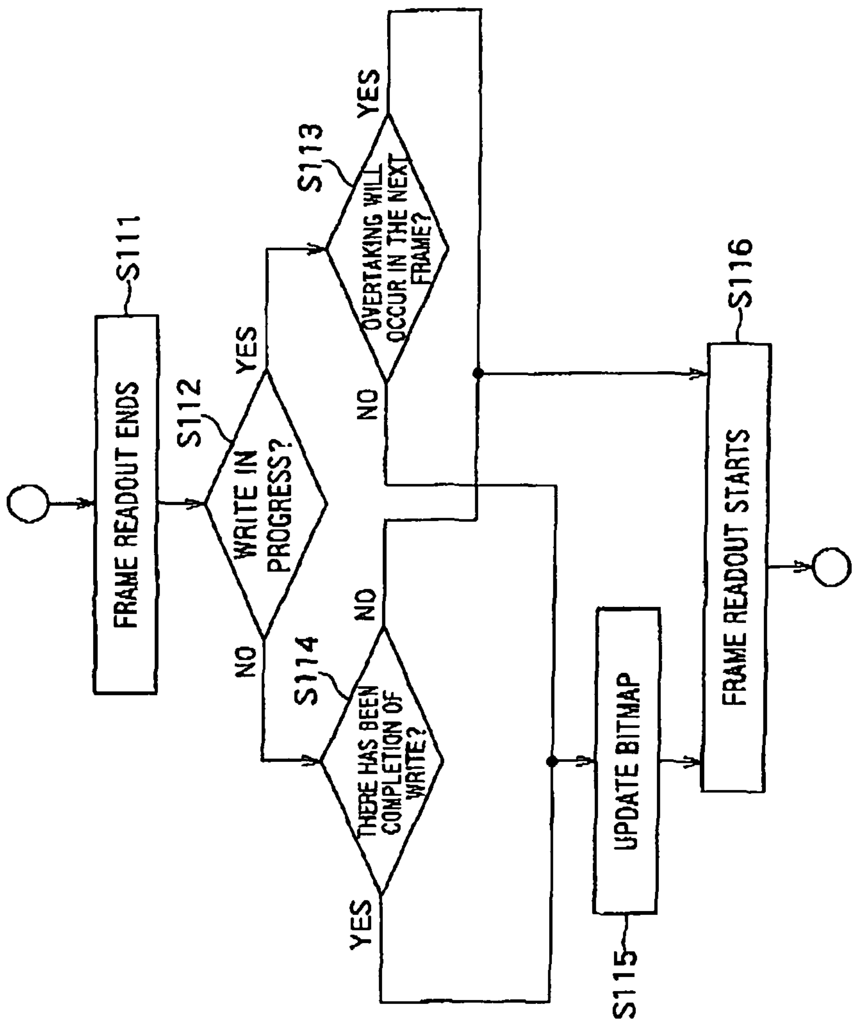
FIG. 36 shows an example which adds processing of skipping BITMAP update when a completion of writing is not detected to the operational procedure of FIG. 33 according to the fourth embodiment.

FIG. 36 shows a combination of the determination of whether to update the BITMAP in FIG. 34 with the determination to skip updating if completion of writing is not detected, which was described at the end of the third embodiment. That is, steps S88 to S92 and S98 to S102 of FIG. 34 may be replaced with the flow of FIG. 36. This flow is different from FIG. 34 in that the BITMAP is not updated if an image is not being written (NO at S112) and if completion of writing is not detected (NO at S114).

Even when an image is written spanning three or more read-out frame periods, the image can be handled in a similar manner by repeating the above-mentioned operations upon each transition to a new read-out frame.

According to the previous embodiments described above, when an image is written across a number of read-out frame periods, the written image will be read out in the frame after the next frame even if an overtaking will not occur in the next read-out frame period. However, according to this embodiment, the written image can be read out in the next frame when no overtaking will occur in the next read-out frame period, which can reduce delay in image reading.

Fifth Embodiment

The fourth embodiment showed a case where an image is written across read-out frame periods. A fifth embodiment discusses an embodiment for reading earlier an image already written in the same read-out frame period also when an image is written across read-out frame periods.

Figure 37:
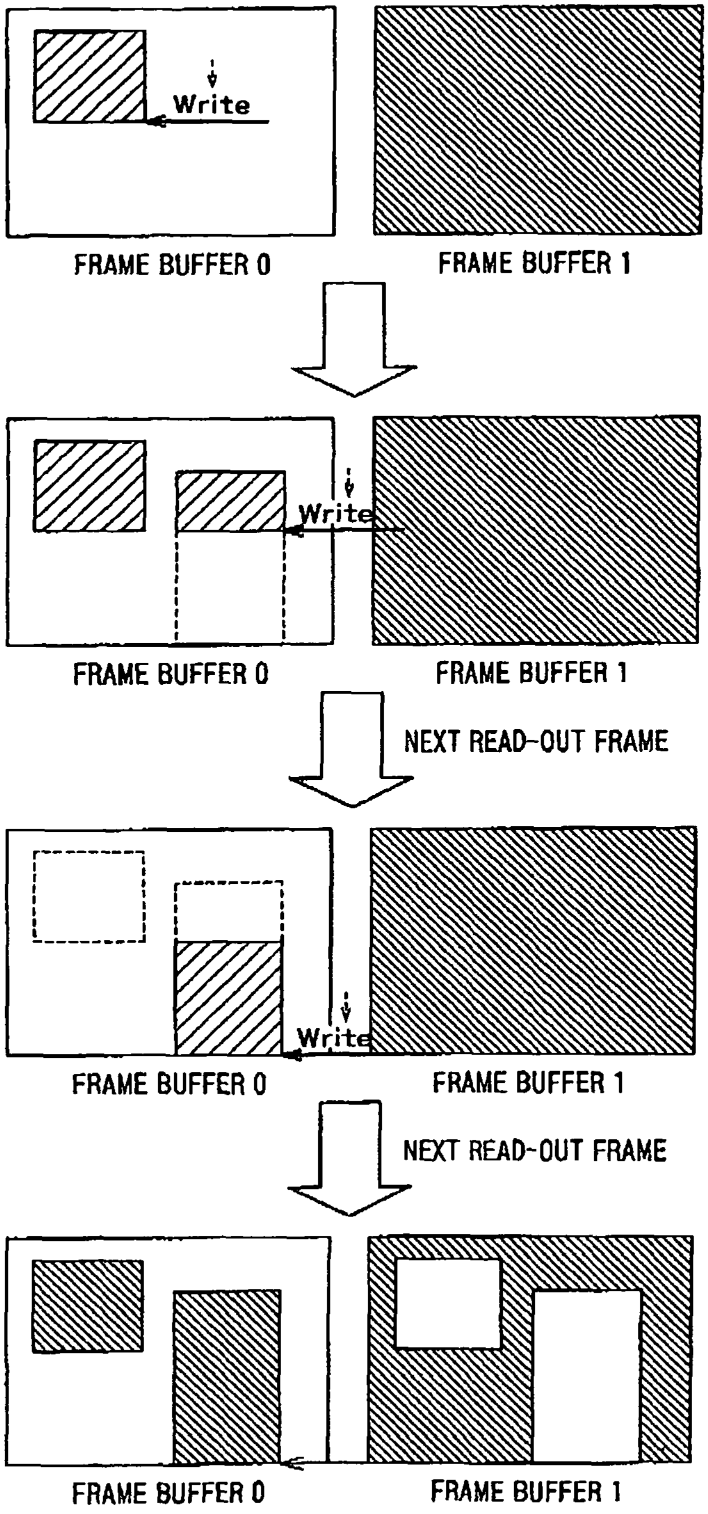
FIG. 37 illustrates an aim of a fifth embodiment.

For example, in a case shown in FIG. 37, the upper left image for which an overtaking will occur is first written to the frame buffer 0, the buffer other than the frame buffer 1 which is the read buffer. Thereafter, another image is written on the right of the image during the same read-out frame period. Since this image is written spanning read-out frame periods and will encounter an overtaking in the second read-out frame it spans, the image is written to the frame buffer 0 which is the other buffer than the read buffer and will be read out in the read-out frame after the next frame. A problem here is the image that was written first: writing of the image has finished in the initial read-out frame period and thus the image should be able to be read out in the next read-out frame period, namely the read-out frame period immediately following the present frame. However, according to the previous embodiments, the image will be read out in the read-out frame after the next read-out frame as the second image, causing a delay.

Figure 38:
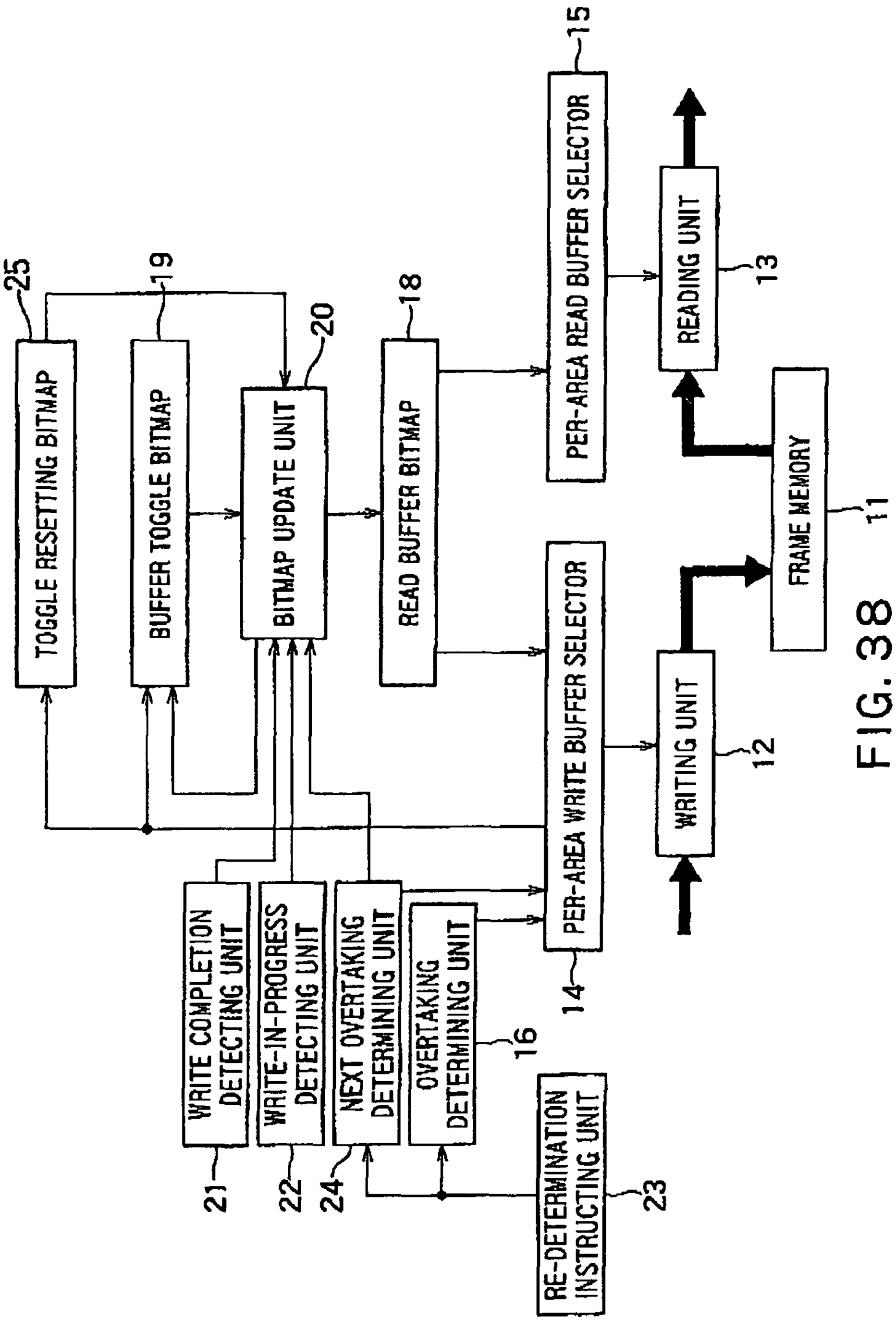
FIG. 38 shows a configuration of the image generating apparatus as the fifth embodiment.
Figure 39:
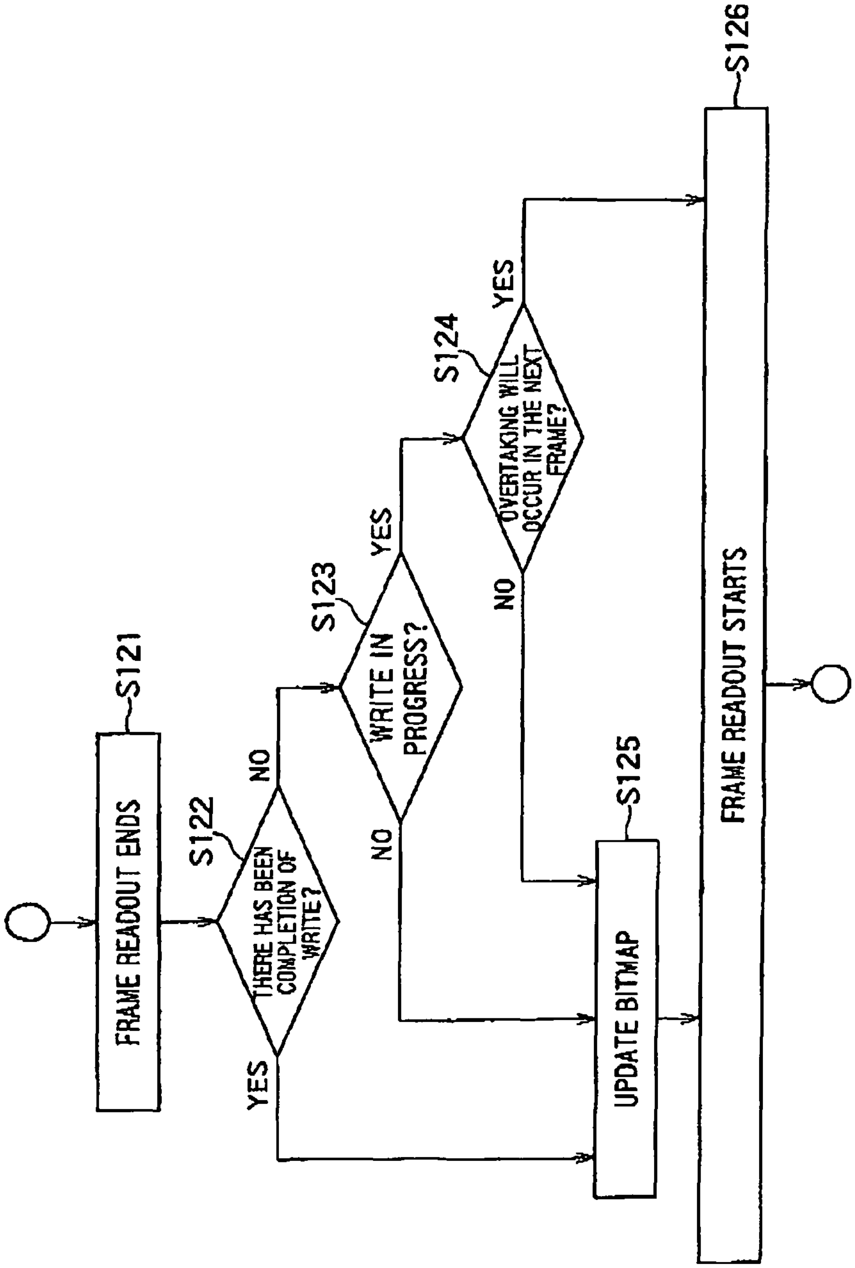
FIG. 39 is a flowchart illustrating the operation of essential components of the apparatus of FIG. 38 according to the fifth embodiment.
Figure 40:
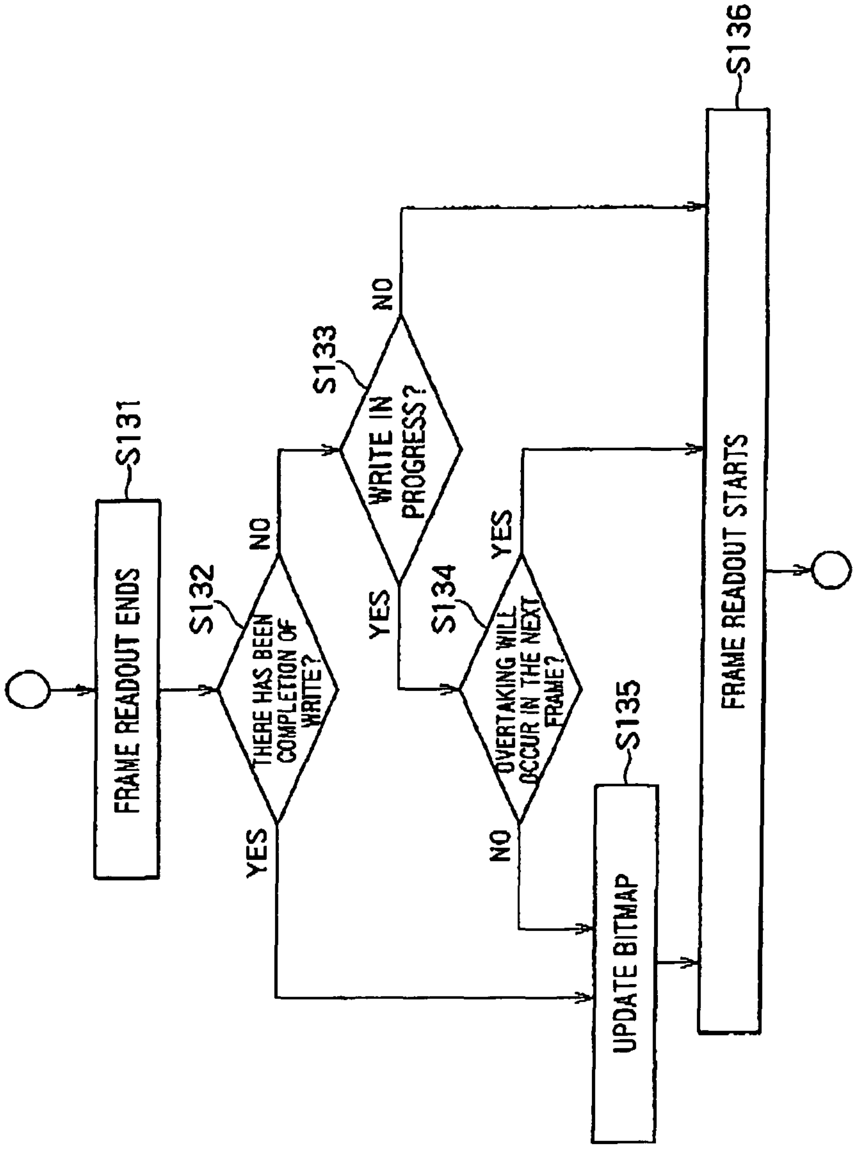
FIG. 40 shows an example which adds processing of skipping BITMAP update when a completion of writing is not detected to the operational procedure of FIG. 38 according to the fifth embodiment.

To solve this problem, such a configuration as shown in FIG. 38 is adopted. As compared to FIG. 33, FIG. 38 includes the write completion detecting unit 21, which was described in FIG. 29, and a toggle resetting BITMAP (update inverted/non-inverted information retainer) 25. In the previous embodiments, the buffer toggle BITMAP 19 is reset to all "0"s when the BITMAP updating unit 20 updates the buffer toggle BITMAP 19, whereas in this embodiment, information in the buffer toggle BITMAP 19 is updated by copying the contents of the toggle resetting BITMAP 25 to it. At the same time, information in the toggle resetting BITMAP 25 is reset to all "0"s (i.e., update non-inverted information) in this embodiment. If the write completion detecting unit 21 detects a completion of image writing, the BITMAP updating unit 20 updates the BITMAP even if an image is now being written, and further, even if the next overtaking determining unit 24 determines that the image will encounter an overtaking in the next read-out frame period. The operational procedure pertaining to this portion is shown in FIG. 39. This is replacement for the determination steps for BITMAP update of FIG. 34. That is, steps S88 to S92 and S98 to S102 of FIG. 34 are replaced with the flow of FIG. 39. Also, FIG. 40 shows a combination of determination of whether to update the BITMAP of FIG. 39 with determination to skip updating if a completion of writing is not detected, which was described at the end of the third embodiment. FIG. 40 is different from FIG. 39 in that the BITMAP is not updated if a completion of writing is not detected (NO at S132) and if no image is being written (NO at S133).

Figure 41:
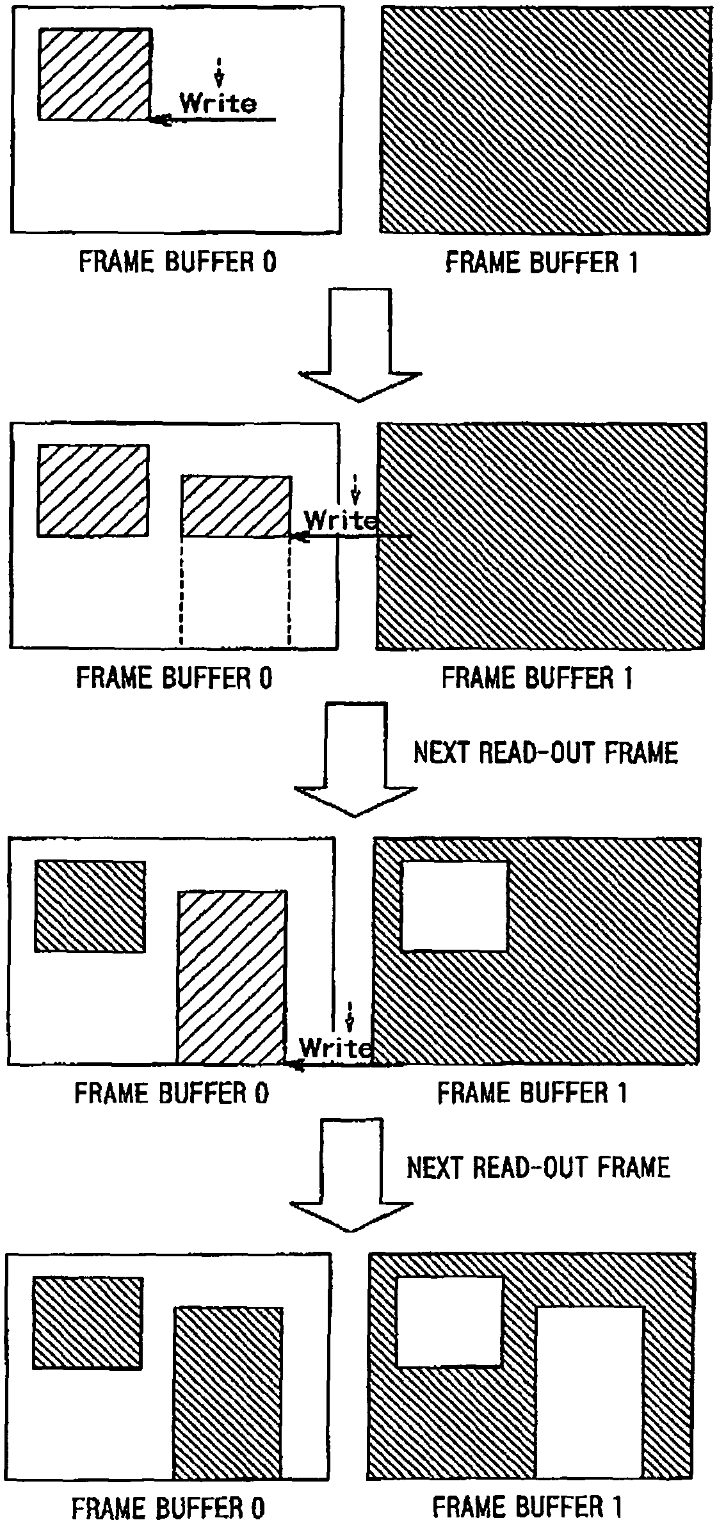
FIG. 41 shows an operational procedure of frame buffers according to the fifth embodiment.
Figure 42:
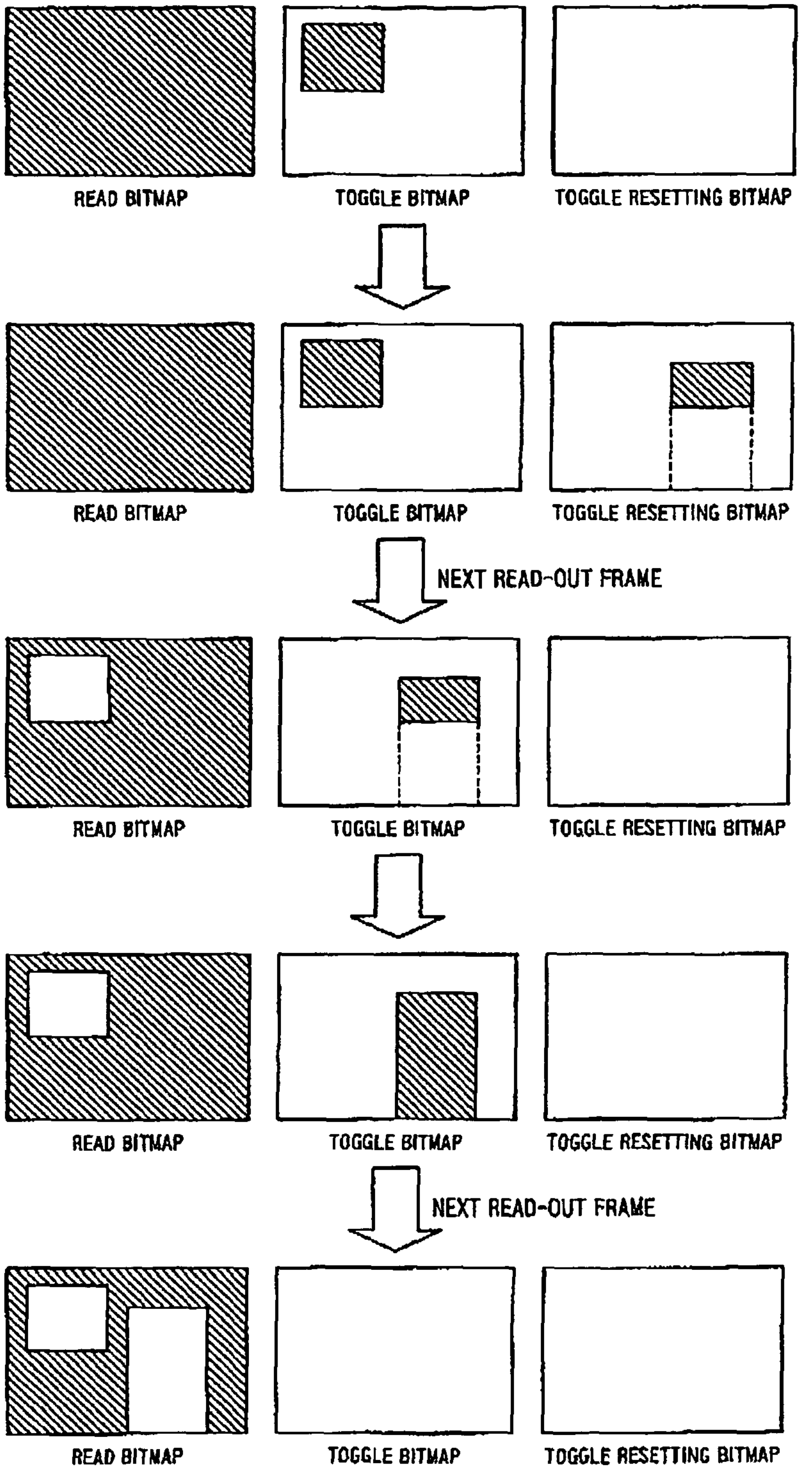
FIG. 42 shows an operational procedure of the read buffer BITMAP, the buffer toggle BITMAP, and a toggle resetting BITMAP according to the fifth embodiment.

The procedure of operation of the frame buffers is shown in FIG. 41 and that of the read buffer BITMAP 18, buffer toggle BITMAP 19, and toggle resetting BITMAP 25 is shown in FIG. 42. First, as shown in FIG. 41, an image is written at upper left and then an image that spans read-out frame periods is written on the right of the image as in FIG. 37. Then, when the write completion detecting unit 21 detects that writing of another image has already finished in the present read-out frame period, "1" (update inverted information) is set in the toggle resetting BITMAP 25 for the second image rather than setting "1" in the buffer toggle BITMAP 19. Then, since the write completion detecting unit 21 has detected a completion of image writing, the BITMAP updating unit 20 updates the BITMAP as mentioned above. As a result, the read buffer BITMAP 18 is first inverted using the information in the buffer toggle BITMAP 19 so that the read buffer is toggled for reading out the first image. At the same time, as information in the toggle resetting BITMAP 25 is copied to the buffer toggle BITMAP 19, "1" is set for an already written area so that the second image currently being written will be read out in the following read-out frame period. Then, writing of the remaining area of the image is finished, setting of that portion in the buffer toggle BITMAP 19 is also finished and after the BITMAP is updated upon transition to the next read-out frame period, "1" has been set in the area of the second written image in the buffer toggle BITMAP 19. Accordingly, the read buffer is toggled for reading out this area, enabling the second image to be read out in the next read-out frame period.

Figure 43:
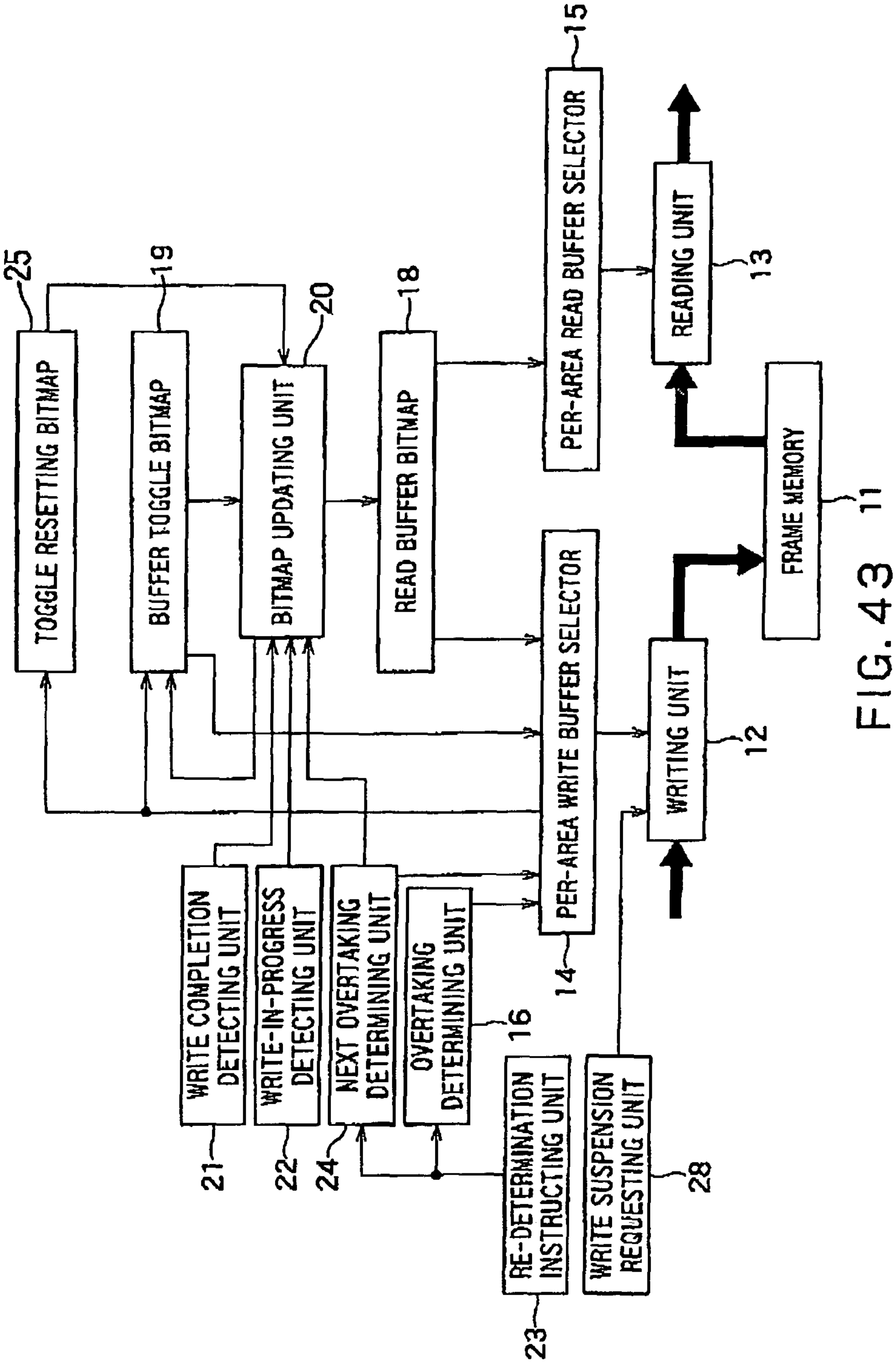
FIG. 43 shows a configuration of the image generating apparatus as the fifth embodiment which is different from that of FIG. 38.
Figure 44:
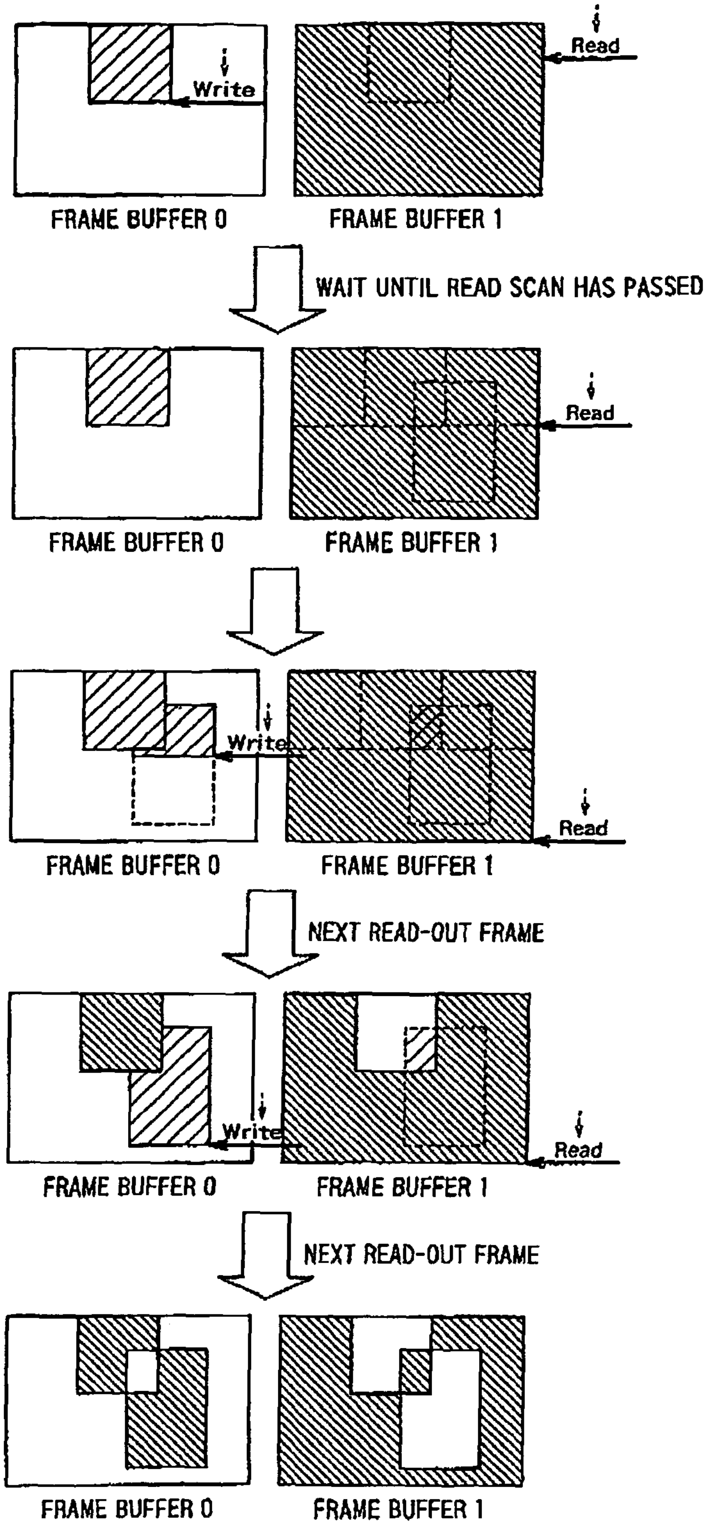
FIG. 44 shows an operational procedure of image frames according to the fifth embodiment.
Figure 45:
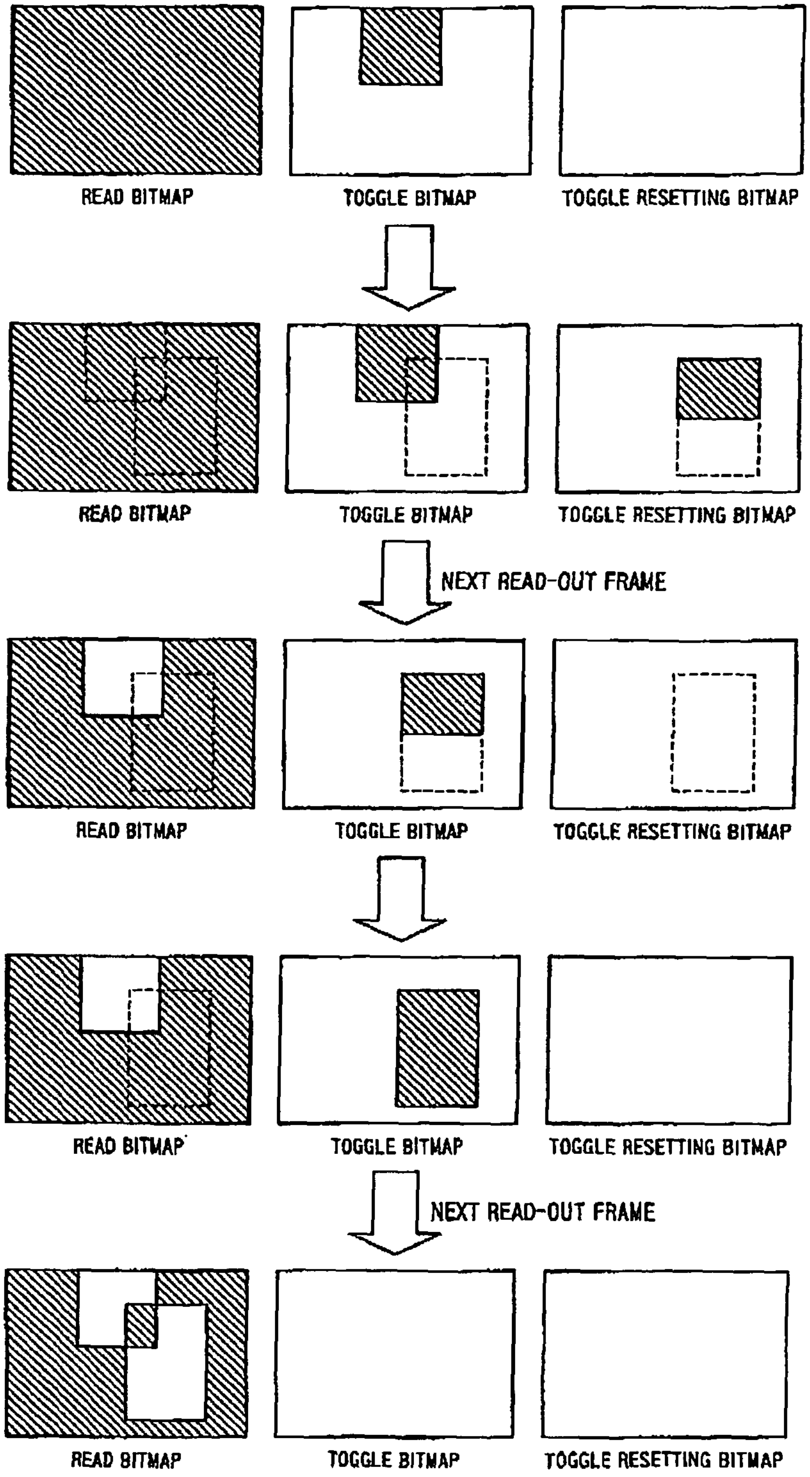
FIG. 45 shows an operational procedure of the read buffer BITMAP, the buffer toggle BITMAP, and the toggle resetting BITMAP according to the fifth embodiment.

However, when the first and second images overlap, the second image overwrites the first image. This causes a problem of reading out the overwriting portion of the second image in the next read-out frame. A configuration that can address such a situation is shown in FIG. 43. The configuration of FIG. 43 is different from that of FIG. 38 in that the per-area write buffer selector 14 selects a buffer also with reference to the buffer toggle BITMAP 19 and that FIG. 43 includes a write suspension requesting unit 28 which requests the writing unit 12 to suspend writing. The procedure of operation of image frames is illustrated in FIG. 44 and that of the read buffer BITMAP 18, buffer toggle BITMAP 19, and toggle resetting BITMAP 25 is shown in FIG. 45. First, as in the earlier examples, a first image for which an overtaking will occur is written on the left. Then, on the right of the image, a second image is written that spans read-out frame periods and will encounter an overtaking in the next read-out frame period. When selecting an area for writing the second image, the per-area write buffer selector 14 also references the buffer toggle BITMAP 19 and selects a frame that is not the read-out frame in the next read-out frame period. That is to say, the present read-out frame can be given by referencing the read buffer BITMAP 18, but the read-out frame of the next read-out frame period is represented by [bits of the read buffer BITMAP 18 XORed with bits of the buffer toggle BITMAP 19]. Accordingly, the per-area write buffer selector 14 performs this calculation and selects the buffer other than the determined buffer. By these operations, when the first and the second image do not overlap, "0"s are set in the buffer toggle BITMAP 19, thus the frame buffer 0 which is the buffer other than the present read buffer is selected as in the previous example. However, when the two images overlap, the inverted bit is "1", thus the other buffer, namely the frame buffer 1 which is the present read buffer, is selected. Then, the writing unit 12 writes the overlapping portion to the frame buffer 1 and non-overlapping potions to the frame buffer 0, and also writes inverted information in an area for the second image in the toggle resetting BITMAP 25, not the buffer toggle BITMAP 19, as in the previous example.

This processing is necessary because what should be originally written to a third frame buffer is written to the first buffer as the read buffer, that is, the first buffer is used as a substitute of the third buffer. In other words, in the present read-out frame period, the reading unit 13 is supposed to read out the image that is written in the read buffer and should not read out the second image which is going to be written in that buffer. Thus, the write suspension requesting unit 28 issues a suspension request to the writing unit 12 to suspend writing until reading scan has passed the area in which the second image is written, namely the area in which the first and second images overlap. The writing unit 12 accordingly suspends writing and starts writing when reading scan has passed the area. This prevents the reading unit 13 from reading the second image in the present frame period. The following processing is similar to the previous case: the read buffer BITMAP 18 is updated with the buffer toggle BITMAP 19 on the next BITMAP update and the first image will be read out in the next read-out frame period. Furthermore, because the buffer toggle BITMAP 19 is updated with the toggle resetting BITMAP 25, inverted bits have been set in a portion in which the image is already written and will also be set in the remaining portion upon writing of the remaining area. Consequently, the second image will be read out in the next read-out frame period.

As has been thus far described, according to this embodiment, when an image is written across read-out frames, an image which has been already written in the same read-out frame period can be read out in the next frame, which can reduce delay in image reading.

Although the toggle resetting BITMAP 25 is saved in a bitmap format in the example above for the sake of simplicity, BITMAP information may also be saved in a vector form as mentioned above. Since only area information for a single image has to be saved in the toggle resetting BITMAP 25 in particular, it is preferable to save the information in a vector form because bit information can be made less.

Sixth Embodiment

Figure 46:
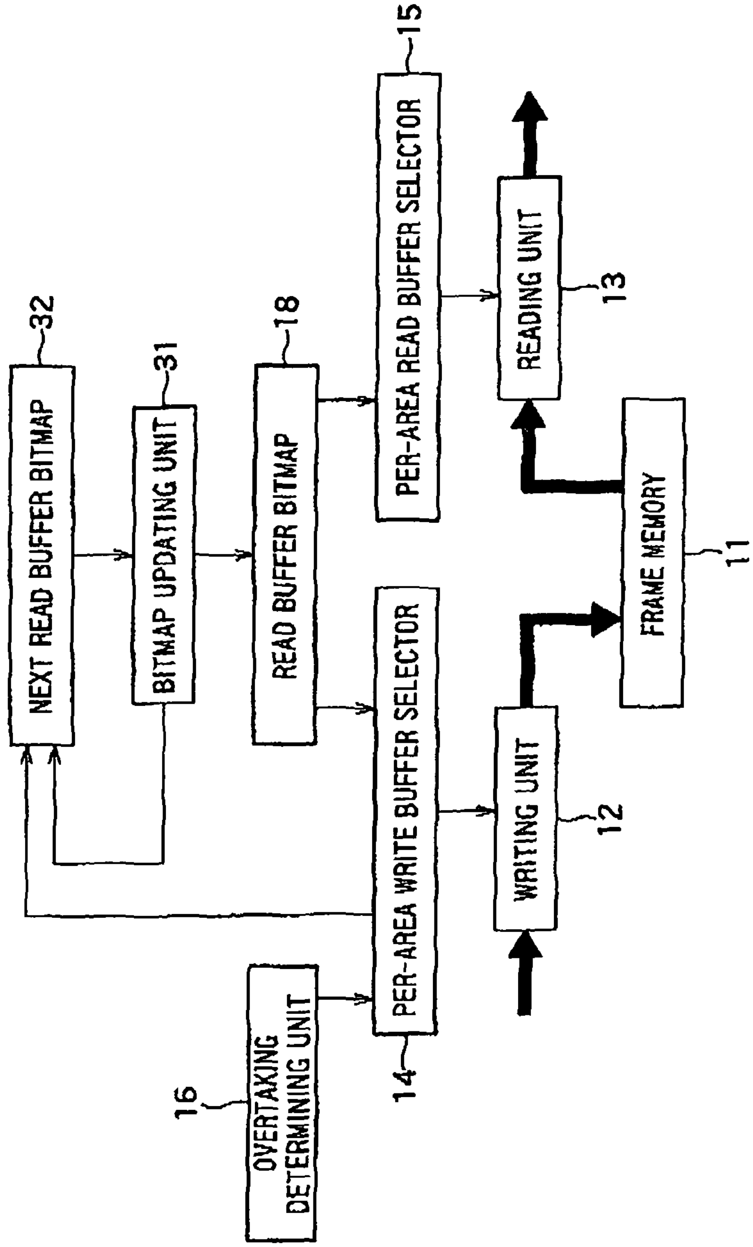
FIG. 46 shows a configuration of the image generating apparatus as a sixth embodiment.

While the third embodiment showed specific operations for selecting a buffer for each area, this embodiment describes another method of the same. This embodiment is shown in FIG. 46. In addition to the elements of FIG. 18, FIG. 46 includes a read buffer BITMAP 18, a next read buffer BITMAP (next read buffer retainer) 32, and a BITMAP updating unit 31. The read buffer BITMAP 18 is bitmap information in which one bit corresponds to each pixel of an image frame. That is, an image frame of resolution XGA (1024 pixels wide and 768 pixels high) has an area of 1024×768=786432 bits. Each bit information (readout information) shows from which one of the two buffers a corresponding pixel should be read out. For instance, a pixel for which "0" is set means the pixel should be read from the frame buffer 0 and a pixel for which "1" is set means the pixel should be read from the frame buffer 1. The next read buffer BITMAP 32 has a storage area of the same size as the read buffer BITMAP 18 that corresponds one-to-one to the read buffer BITMAP 18, each bit corresponding to a pixel of an image frame. Each bit (readout information) indicates from which one of the two frame buffers a corresponding pixel should be read out in the next read-out frame period. The BITMAP updating unit 31 performs BITMAP update by copying the information in the next read buffer BITMAP 32 to the read buffer BITMAP 18. The read buffer BITMAP 18 and next read buffer BITMAP 32 are realized by a storage medium such as SDRAM and SRAM, for example, but they are not specifically limited thereto.

Figure 47:
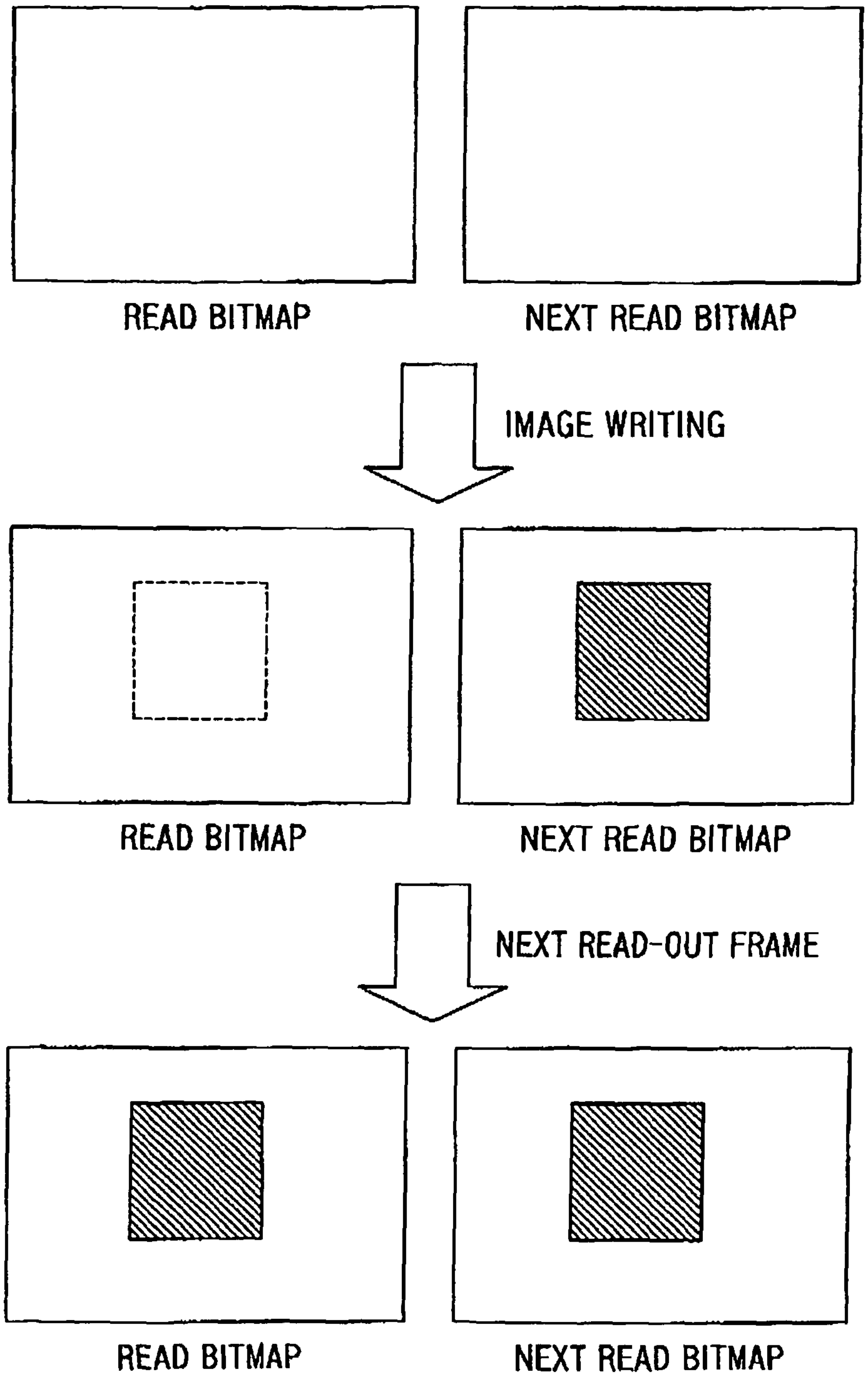
FIG. 47 shows examples of the read buffer BITMAP and a next read buffer BITMAP in the case of FIG. 11 according to the sixth embodiment.

The operational procedure is shown in FIG. 24. Specific operations are as follows. The read buffer BITMAP 18 and the next read buffer BITMAP 32 as illustrated with respect to the operation of FIG. 11 are shown in FIG. 47. In both the BITMAPs, the shaded areas in the figure mean that "1" is written therein and "0" is written in the other area. The procedure of FIG. 11 starts with the frame buffer 0 being the read buffer for the entire area of an image frame. This is realized by an operation of selecting the frame buffer 0 for every area because the read buffer BITMAP 18 has all "0"s, which is read out by the per-area read buffer selector 15 to reveal that all the areas have "0".

As mentioned in the second embodiment, FIG. 11 shows operations of when the overtaking determining unit 16 determines that an overtaking will occur, wherein an image is written to the frame buffer 1. Operations for this are as follows. First, when the writing unit 12 writes an image, the per-area write buffer selector 14 references read buffer information in the read buffer BITMAP 18 that corresponds to the area to be written, and determines that the frame buffer 0 should be the read buffer because "0" is set in it. Then, if an overtaking is determined to occur, the per-area write buffer selector 14 selects the frame buffer 1 which is the buffer other than the frame buffer 0, and the writing unit 12 accordingly writes the image.

The next read buffer BITMAP 32 also starts with all areas being "0", but after an image is written to the frame buffer 1 by the writing unit 12, the writing unit 12 sets the inverted value of a value which is set in the corresponding area of the read buffer BITMAP 18, namely "1", into a corresponding area of the next read buffer BITMAP 32 (the dotted-line portion at middle left in FIG. 47) as illustrated in the middle right in FIG. 47. Then, after the image writing is finished, reading of the present frame is finished, and in an interim period before reading of the next frame starts (e.g., a vertical blank period of an image being generated), the BITMAP updating unit 31 reads out all information in the next read buffer BITMAP 32 and copies the information to the corresponding read buffer BITMAP 18. As a result, the read buffer BITMAP 18 becomes the one shown at the bottom left corner of FIG. 37 and a new frame will be read out from the frame buffer 1 only for the portion in which the updated image is written.

If it is not determined that an overtaking will occur as in FIG. 20, the values of the next read buffer BITMAP 32 are not updated, thus the read buffer BITMAP 18 remains unchanged when the procedure moves on to the next read-out frame.

Figure 48:
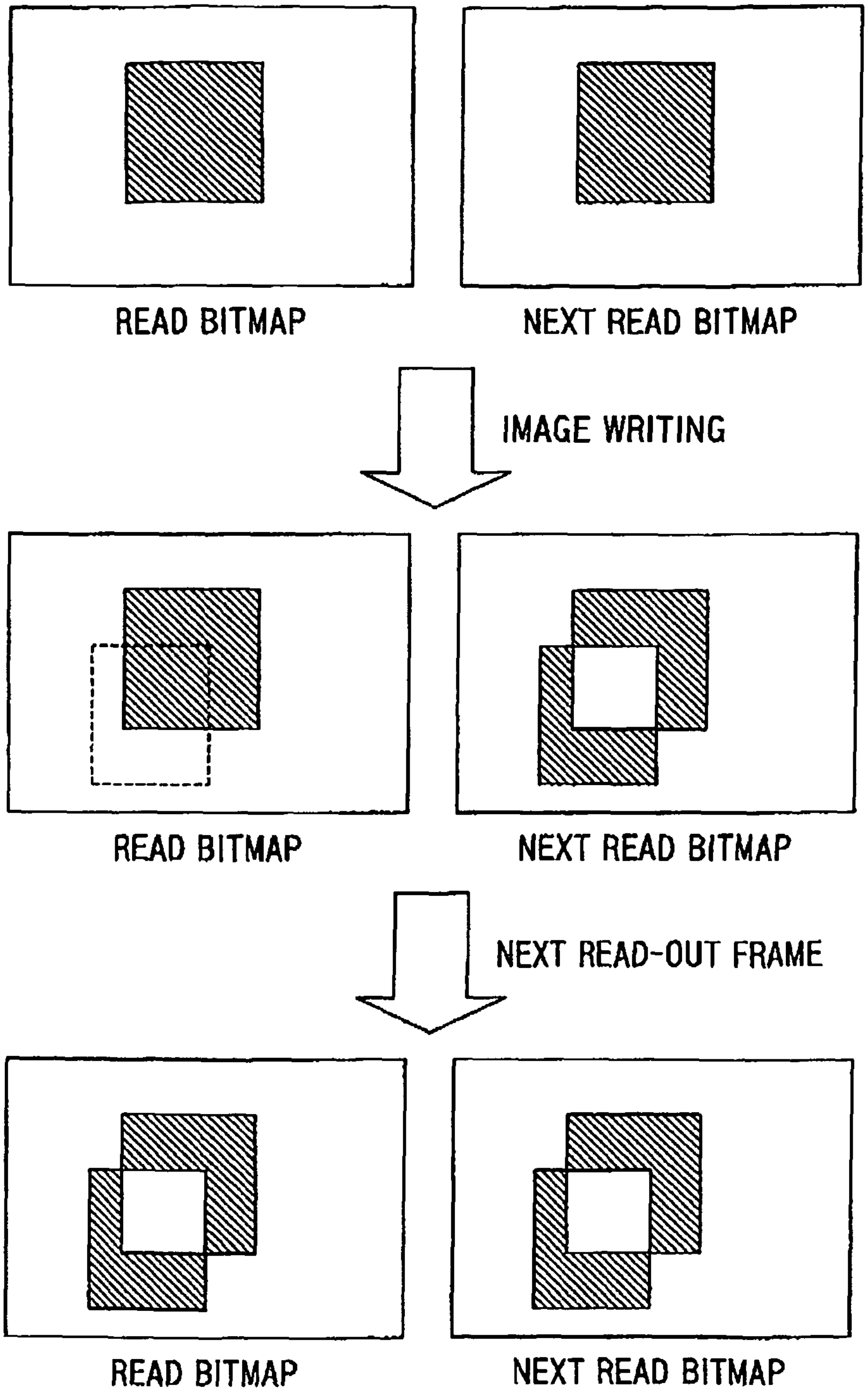
FIG. 48 shows examples of the read buffer BITMAP and the next read buffer BITMAP in the case of FIG. 13 according to the sixth embodiment.

The read buffer BITMAP 18 and next read buffer BITMAP 32 in the case of FIG. 13 are shown in FIG. 48. An operation of reading an area positioned about the center of an image frame from the frame buffer 1 and the other area from the frame buffer 0 is realized by the read buffer BITMAP 18 being as illustrated in the upper left portion of FIG. 48. After an image is written, the inverted value of a value set in a corresponding area of the read buffer BITMAP 18 is set into the corresponding next read buffer BITMAP 32 as in the previous example, and upon transition to the next read-out frame after completion of image writing, information in the next read buffer BITMAP 32 is copied to the read buffer BITMAP 18 by the BITMAP updating unit 31. As a result, the read buffer BITMAP 18 becomes as illustrated in the bottom left corner in FIG. 48 and the read buffer is selected as shown in the bottom portion of FIG. 13.

If an overtaking does not occur as in FIG. 21, the read buffer BITMAP 18 and next read buffer BITMAP 32 do not change from the ones shown at the top of FIG. 48 even after image writing and transition to the next read-out frame.

Figure 49:
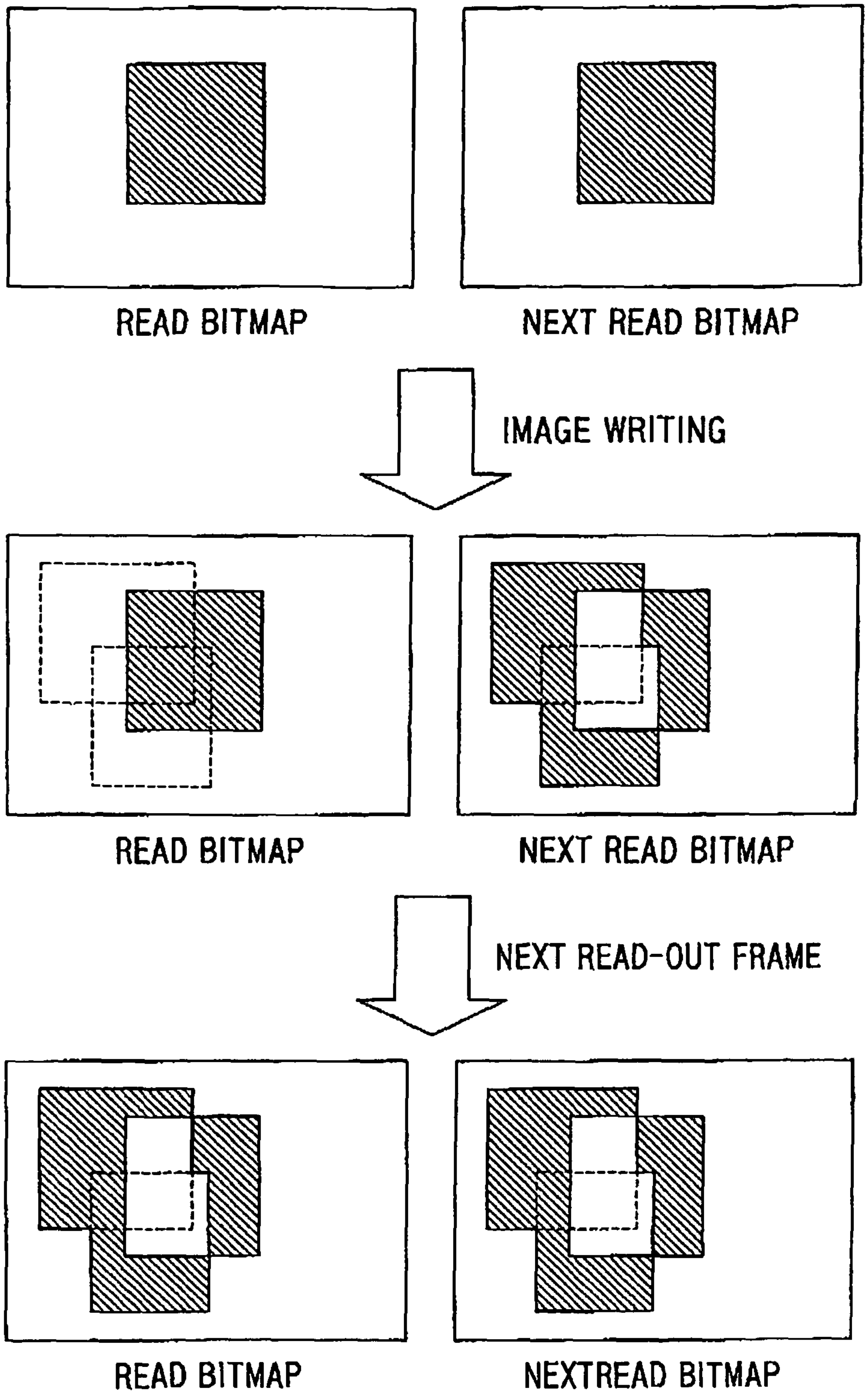
FIG. 49 shows examples of the read buffer BITMAP and the next read buffer BITMAP in the case of FIG. 14 according to the sixth embodiment.
Figure 50:
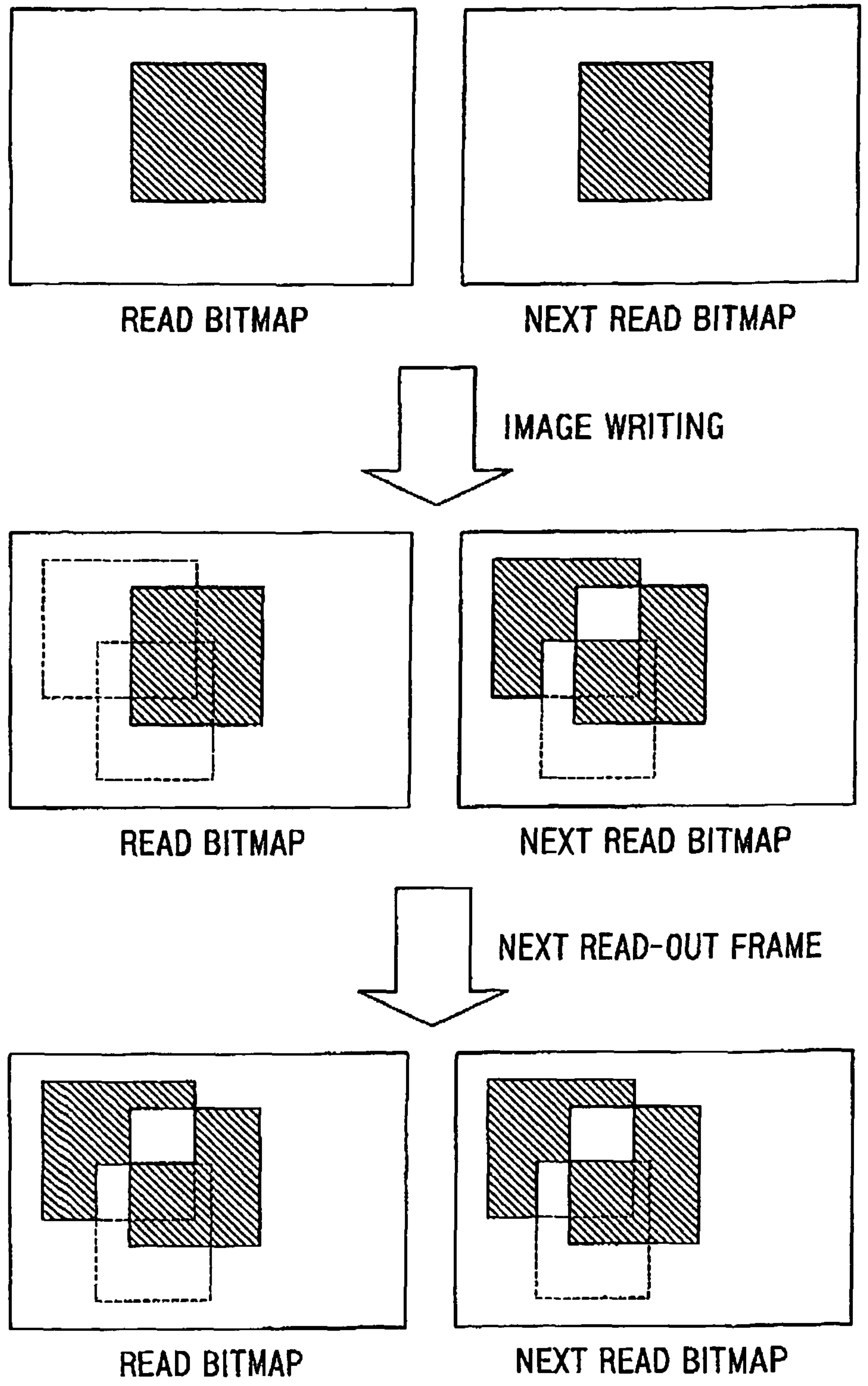
FIG. 50 shows examples of the read buffer BITMAP and the next read buffer BITMAP in the case of FIG. 22 according to the sixth embodiment.

The read buffer BITMAP 18 and next read buffer BITMAP 32 in the case of FIG. 14 are shown in FIG. 49, and those in the case of FIG. 22 are shown in FIG. 50. Even if updated images occur in succession, the next read buffer BITMAP 32 simply overwrites information that was set first with information that was set later. In the case of FIG. 50, for example, when the upper left image for which an overtaking will occur is first written, the inverted value of a value in the corresponding area of the read buffer BITMAP 18 is set in the corresponding area of the next read buffer BITMAP 32. However, when an image for which an overtaking will not occur is subsequently written to just lower right of the image, the former portion is overwritten with the value in the corresponding area of the read buffer BITMAP 18. With such operations, in a read-out frame after completion of writing, for the overlapping portion of the two images, higher priority is given to the subsequently written image for which an overtaking does not occur as mentioned above.

Figure 51:
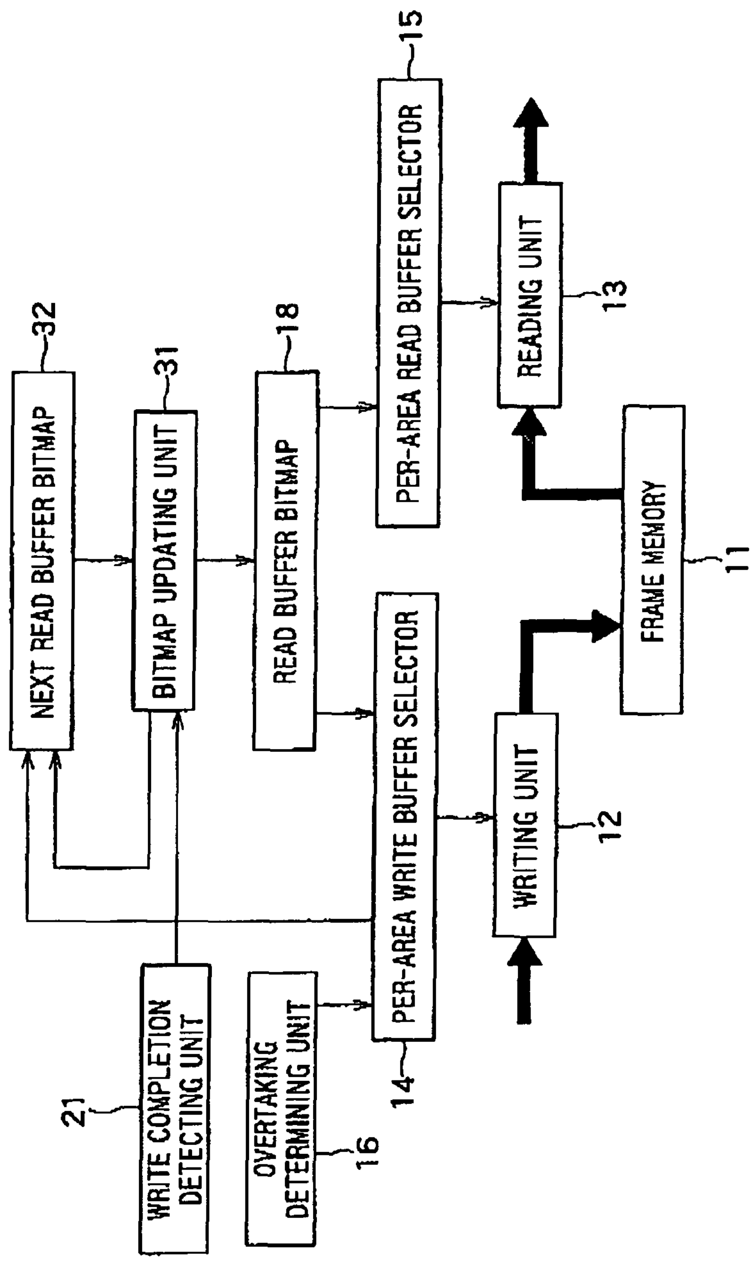
FIG. 51 shows a configuration which adds a write completion detecting unit to the apparatus of FIG. 46 according to the sixth embodiment.

In updating of the BITMAP, if no access was made to the next read buffer BITMAP 32 by the writing unit 12 during the immediately preceding frame reading period, updating may be skipped because it is known that values of the next read buffer BITMAP 32 have not changed. This can be attained by detecting whether writing of an image to the buffer other than the read buffer has finished. A configuration including a write completion detecting unit 21 performing this operation is shown in FIG. 51. By performing such detection and updating the BITMAP only when a completion of writing is detected, memory accesses to BITMAP information are reduced, which can decrease power consumption and therefore make the effect of the present invention more apparent.

While information on the read buffer and the next read buffer for each area is managed as BITMAP information in the examples above, the present invention is not limited thereto. When the image is a rectangle, the information may also be managed as a set of information in the form of vectors, such as the X and Y coordinates of the upper left corner of the rectangle, length and width thereof, and the like.

Seventh Embodiment

An image may be written across read-out frame periods. That is, when the BITMAP is updated by the BITMAP updating unit 31, writing of an image may have not finished yet and be still in progress. This embodiment shows a several configurations that can address such a situation.

Figure 52:
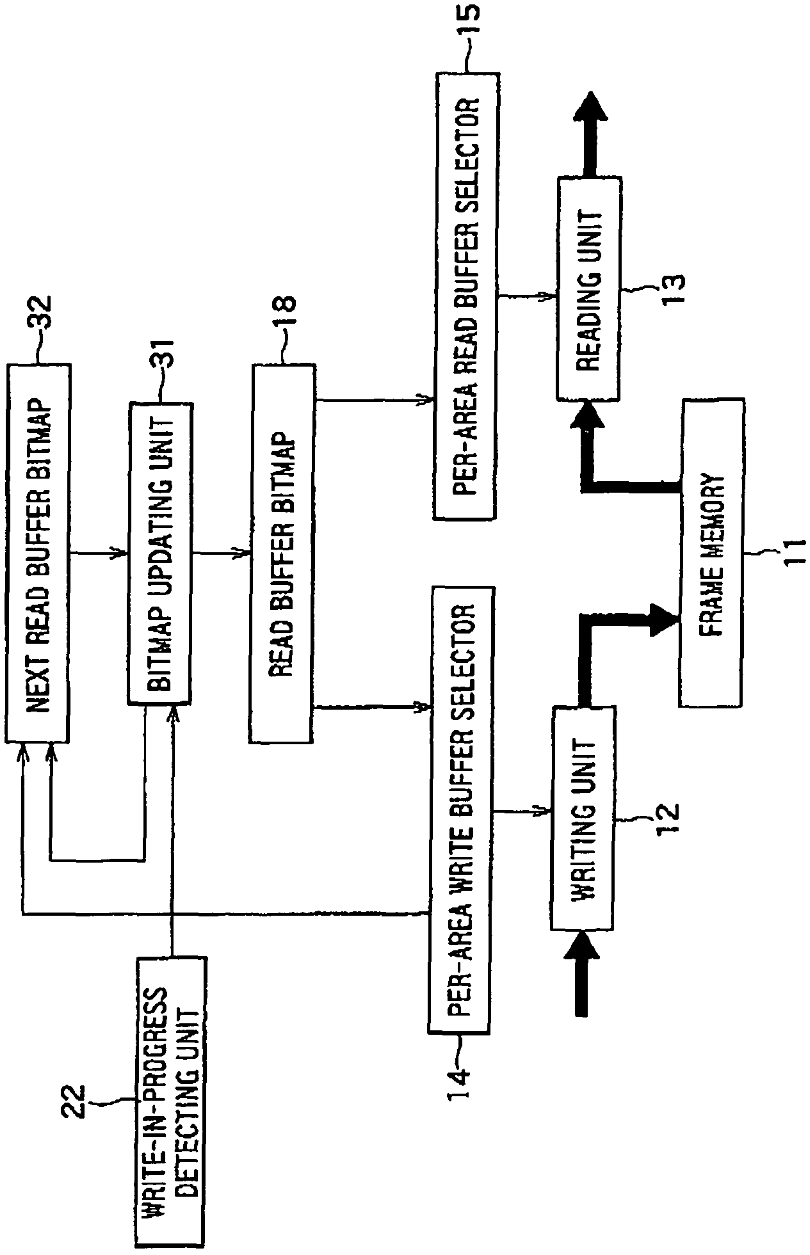
FIG. 52 shows a configuration of the image generating apparatus as a seventh embodiment.

First, a basic configuration for a case without overtaking determination is shown in FIG. 52. As compared to FIG. 46, FIG. 52 includes a write-in-progress detecting unit 22. The write-in-progress detecting unit 22 detects whether an image is now being written. If the write-in-progress detecting unit 22 detects that a write is in progress, the BITMAP updating unit 31 does not update the BITMAP.

The procedure of the operation is shown in FIG. 31 and specific operation of the frame buffers is shown in FIG. 32. When writing an image, the per-area write buffer selector 14 selects the frame buffer 1 which is the other buffer than the read buffer, and the writing unit 12 writes the image to the frame buffer 1. As the image is being written in the first and second read-out frame periods, the write-in-progress detecting unit 22 detects that writing is in progress, thus the BITMAP updating unit 20 does not update the BITMAP. Since writing of the image has finished when the procedure moves to the third read-out frame period, the BITMAP is updated. Accordingly, the written image can be correctly read out in the third read-out frame period.

Figure 53:
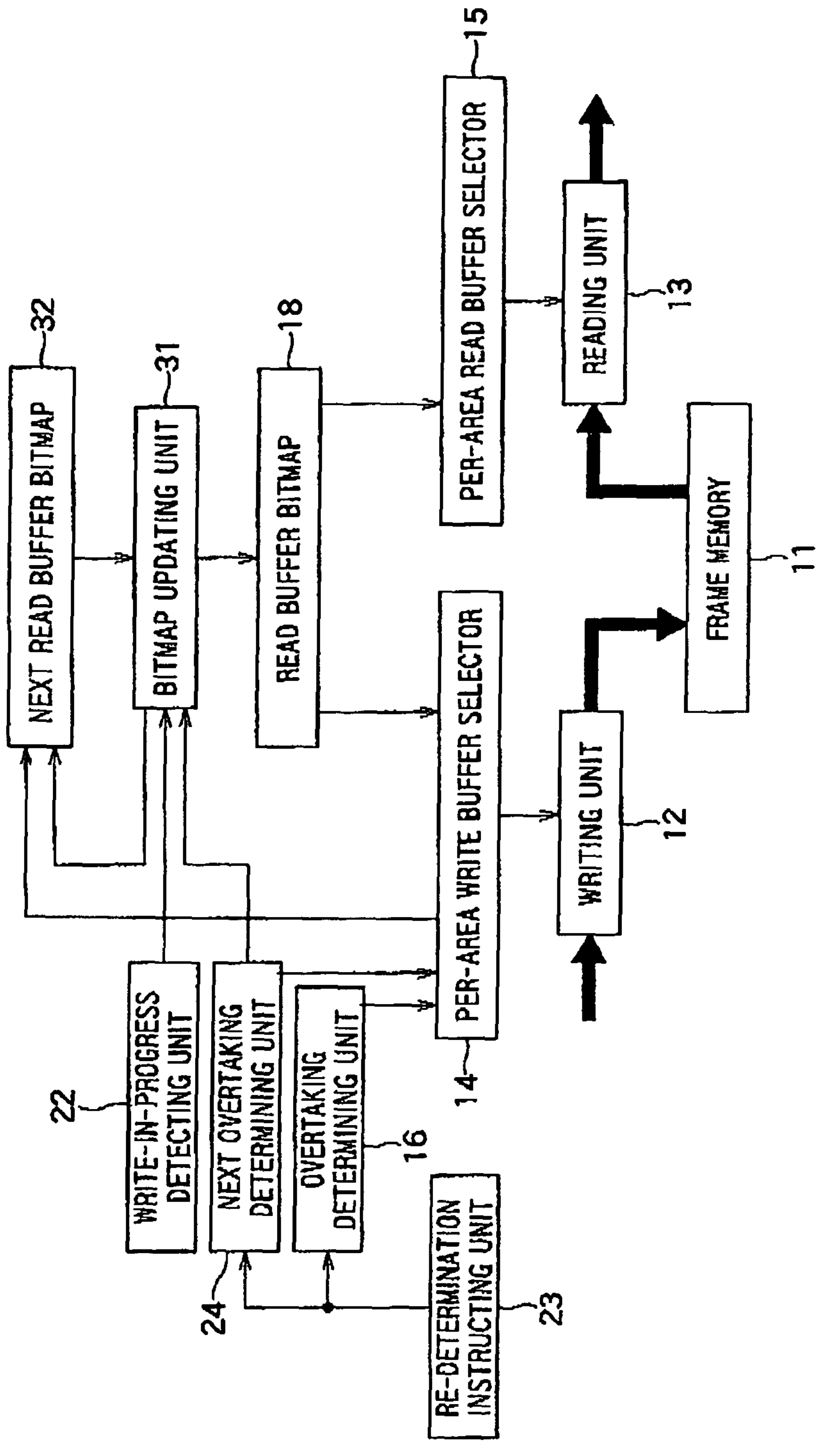
FIG. 53 shows a configuration of the image generating apparatus as the seventh embodiment which is different from that of FIG. 52.

Next, a case with overtaking determination is described. When determination of overtaking is performed, if an overtaking will occur in the next read-out frame period, an image that spans two read-out frame periods cannot be read in the next read-out frame period, for example. Accordingly, a similar operation to FIG. 32 should be performed: the written image will be read out in reading of the frame after the next frame. On the other hand, if an overtaking will occur in the present read-out frame period but not in the next read-out frame period, the written image can be read out in the next frame reading. FIG. 53 shows a configuration for operation that is based on both whether an overtaking occurs in the present read-out frame period and whether an overtaking will occur in the next read-out frame period as described above. FIG. 53 includes an overtaking determining unit 16, a next overtaking determining unit 24, and a re-determination instructing unit 23 in addition to the elements of FIG. 52, and is different in that the BITMAP updating unit 31 determines whether to update the BITMAP based on a result from the next overtaking determining unit 24. The overtaking determining unit 16 determines whether an overtaking occurs in the image currently being written in the present read-out frame period as mentioned above, and the next overtaking determining unit 24 determines whether an overtaking will occur in writing of the remaining portion of the currently written image in the next read-out frame period. Every time a new read-out frame period is entered when an image is written across a number of read-out frame periods, the re-determination instructing unit 23 instructs the overtaking determining unit 16 to again determine whether an overtaking will occur in the new read-out frame period and the next overtaking determining unit 24 to again determine whether an overtaking will occur in the read-out frame period following the new read-out frame period. If the next overtaking determining unit 24 determines that no overtaking will occur in the next read-out frame period, the BITMAP updating unit 31 updates the BITMAP even if the write-in-progress detecting unit 22 detects that writing is in progress. The per-area write buffer selector 14 and per-area read buffer selector 15 then select a buffer based on the updated read buffer BITMAP 18 and information on overtaking and next overtaking determinations.

The procedure of this operation is shown in FIG. 34. Describing the operation of FIG. 32 first, as an overtaking will occur in the next read-out frame period in FIG. 32, the next overtaking determining unit 24 determines an overtaking will occur and an image is written to the frame buffer 0 which is the other buffer than the read buffer even in the present read-out frame period. Thereafter, when the procedure moves to the next read-out frame, the image is being written at the time and since the next overtaking determining unit 24 has determined that an overtaking will occur, the BITMAP updating unit 31 does not update the BITMAP and the read buffer remains the same. When the next read-out frame period is entered, the re-determination instructing unit 23 instructs the overtaking determining unit 16 and the next overtaking determining unit 24 to perform re-determination. They respectively determine that an overtaking will occur and that no overtaking will occur (because image writing will finish in the present read-out frame period). Based on these results, the writing unit 12 writes the remaining area of the image to the frame buffer 0, the other buffer than the read buffer. Then, when the read-out frame period ends, as writing is now finished, the BITMAP updating unit 31 updates the BITMAP. The read buffer is toggled so that the written image is read out, and the written image can be read out in the next read-out frame period.

Next, FIG. 35 illustrates specific operations of the frame buffers in a case where no overtaking occurs in the second read-out frame period. Since an overtaking first occurs in the present read-out frame period in the image written in FIG. 35, the overtaking determining unit 16 determines that an overtaking will occur, and the per-area read buffer selector 15 selects the frame buffer 1, the one not being the read buffer, and the writing unit 12 writes the image to the frame buffer 1. The present read-out frame period thereafter ends, but the write-in-progress detecting unit 22 detects that the image is now being written because writing of the image has not completed. However, as the next overtaking determining unit 24 does not determine that an overtaking will occur in this case, the BITMAP is updated in accordance with the above-mentioned operations. Consequently, the area which was written in the previous read-out frame period becomes the read buffer in the next read-out frame period, thus the image can be read out. At this point, the re-determination instructing unit 23 instructs the overtaking determining unit 16 to perform re-determination and the overtaking determining unit 16 determines that no overtaking will occur in this read-out frame. The per-area write buffer selector 14 selects as the read buffer the frame buffer 0 that is the same as the read buffer, the writing unit 12 writes an image to the frame buffer 0, and the remaining area of the image can also be read out in this read-out frame period. Since the result of re-determination by the overtaking determining unit 16 is actually the same as that by the next overtaking determining unit 24 performed in the previous read-out frame period, the information may be utilized here.

FIG. 36 shows a combination of the determination of whether to update the BITMAP in FIG. 34 with the determination to skip updating if completion of writing is not detected, which was described at the end of the third embodiment. FIG. 36 is different from FIG. 34 in that the BITMAP is not updated if an image is not being written and if completion of writing is not detected.

Even when an image is written spanning three or more read-out frame periods, the image can be handled in a similar manner by repeating the above-mentioned operations upon each transition to a new read-out frame.

According to the previous embodiments described above, when an image is written across a number of read-out frame periods, the written image will be read out in the frame after the next frame even if an overtaking will not occur in the next read-out frame period. However, according to this embodiment, the written image can be read out in the next frame if no overtaking will occur in the next read-out frame period, which can reduce delay in image reading.

Eighth Embodiment

The seventh embodiment showed a case where an image is written across read-out frame periods. This embodiment discusses an embodiment for reading earlier an image which has been already written in the same read-out frame period also when an image is written across read-out frame periods.

For example, in a case shown in FIG. 37, the upper left image for which an overtaking will occur is first written to the frame buffer 0, the buffer other than the frame buffer 1 which is the read buffer. Thereafter, another image is written to the right of the image during the same read-out frame period. Since this image is written spanning read-out frame periods and will encounter an overtaking in the second read-out frame it spans, the image is written to the frame buffer 0 which is the other buffer than the read buffer and will be read out in the read-out frame after the next frame. A problem here is the image that was written first: writing of this image has finished in the initial read-out frame period and thus the image should be able to be read out in the next read-out frame period, namely the read-out frame period immediately following the present frame. However, according to the previous embodiments, the image will be read out in the read-out frame after the next read-out frame as the second image, causing a delay.

Figure 54:
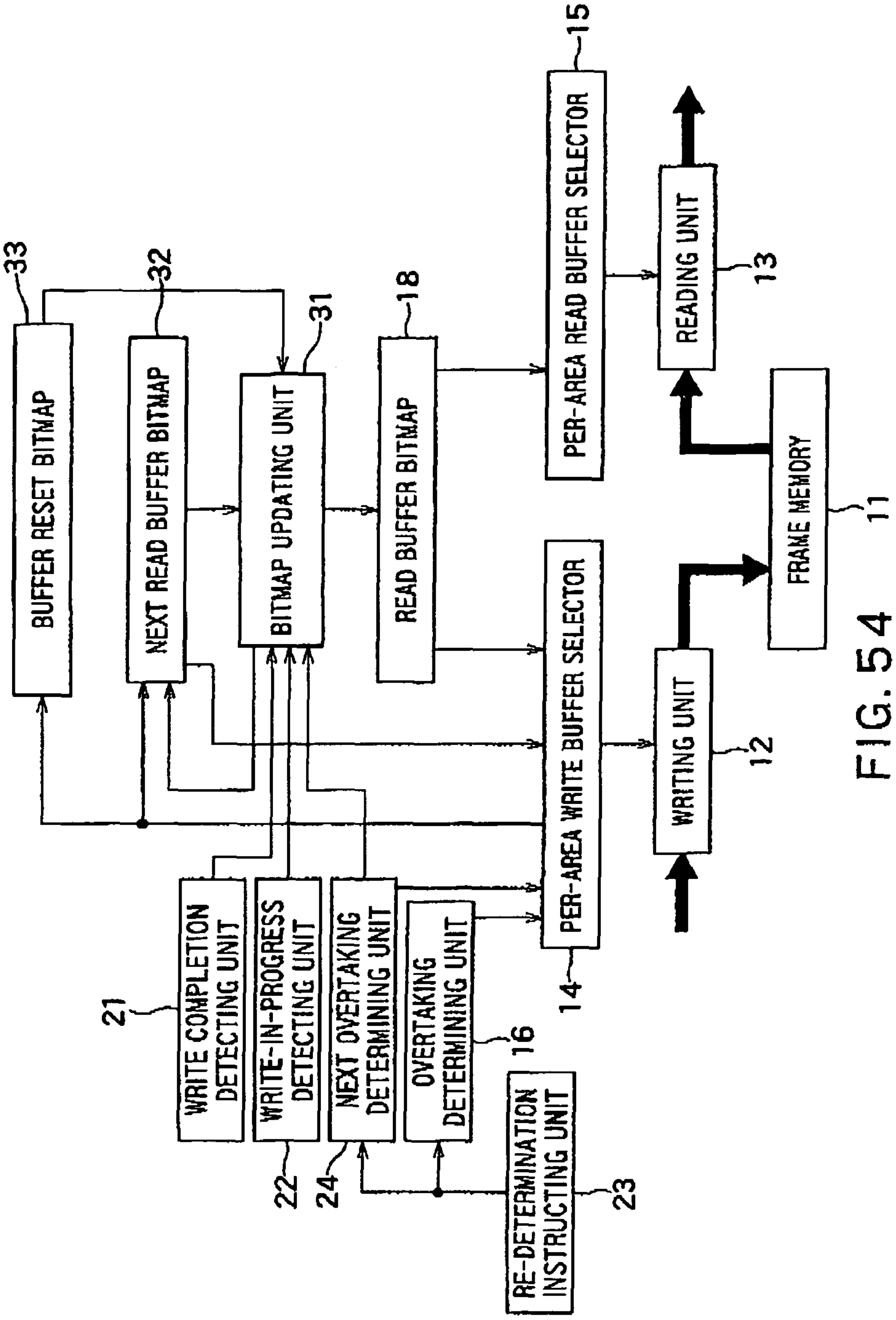
FIG. 54 shows a configuration of the image generating apparatus as an eighth embodiment.

To solve this problem, such a configuration as shown in FIG. 54 is adopted. As compared to FIG. 53, FIG. 54 includes the write completion detecting unit 21 which was described in FIG. 29 and a buffer reset BITMAP (next read buffer toggle retainer) 33. The BITMAP updating unit 31 updates the next read buffer BITMAP 32 by copying the values of the next read buffer BITMAP 32 to the read buffer BITMAP 18 and inverting the value in a corresponding area of the next read buffer BITMAP 32 with respect to an area of the buffer reset BITMAP 33 which has “1” (inverted information) in it. At the same time, the BITMAP updating unit 31 also resets information in the buffer reset BITMAP 33 to all “0”s (non-inverted information) in this embodiment. If the write completion detecting unit 21 detects a completion of image writing, the BITMAP updating unit 31 updates the BITMAP even if an image is now being written, and further, even if the next overtaking determining unit 24 determines that the image will encounter an overtaking in the next read-out frame period. The operational procedure pertaining to this portion is shown in FIG. 39. This is replacement for the determination steps for BITMAP update of FIG. 34. Also, FIG. 40 shows a combination of determination of whether to update the BITMAP of FIG. 39 with determination to skip updating if a completion of writing is not detected, which was described at the end of the third embodiment. FIG. 40 is different from FIG. 39 in that the BITMAP is not updated if no image is being written and if a completion of writing is not detected.

Figure 55:
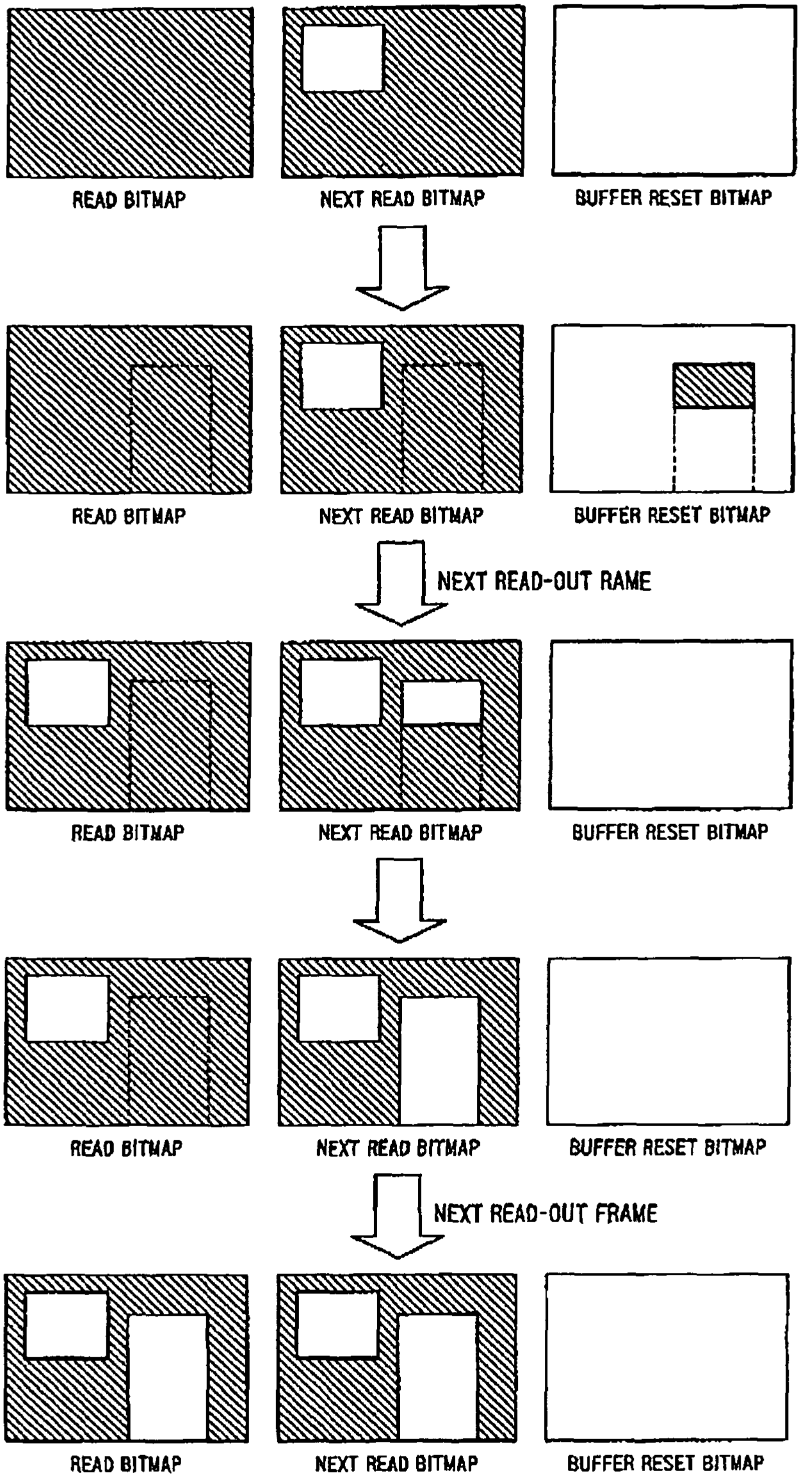
FIG. 55 shows an operational procedure of the read buffer BITMAP, next read buffer BITMAP, and a buffer reset BITMAP according to the eighth embodiment.

The procedure of operation of the frame buffers is shown in FIG. 41 and that of the read buffer BITMAP 18, next read buffer BITMAP 32, and buffer reset BITMAP 33 is shown in FIG. 55. First, as shown in FIG. 41, an image is written at upper left and then an image that spans read-out frame periods is written to the right of the image as in FIG. 37. Then, when the write completion detecting unit 21 detects that writing of another image has already finished in the present read-out frame period, “1” is set in the buffer reset BITMAP 33 for the second image rather than setting a value in the next read buffer BITMAP 32. Then, since the write completion detecting unit 21 has detected a completion of image writing, the BITMAP updating unit 31 updates the BITMAP as mentioned above. Then, the read buffer BITMAP 18 is updated first with information in the next read buffer BITMAP 32 so that the first image is read out, at which phase the first image can be read out. At the same time, values in an area of the next read buffer BITMAP 32 whose corresponding area of the buffer reset BITMAP 33 has “1” are inverted. Accordingly, “1” is set for an area of the second image that are already written so that the second image now being written will be read out in the next read-out frame period. Then, writing of the remaining area of the image is finished, setting of a value for that portion in the next read buffer BITMAP 32 is also finished and after the BITMAP is updated upon transition to the next read-out frame period, the read buffer BITMAP 18 is updated such that the second written image is read out and the second image can be read out in the next read-out frame period.

Figure 56:
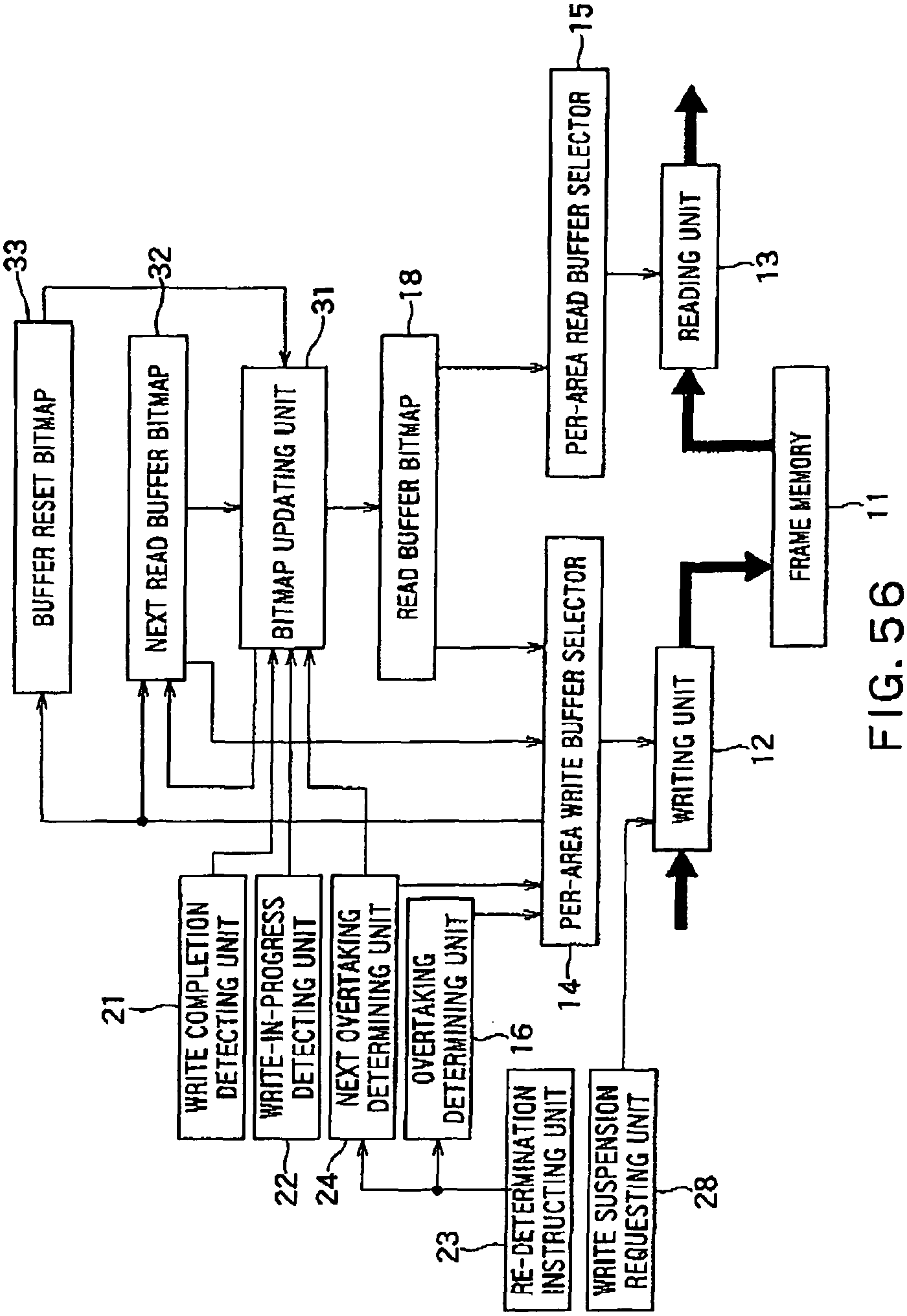
FIG. 56 shows a configuration of the image generating apparatus as the eighth embodiment which is different from that of FIG. 54.
Figure 57:
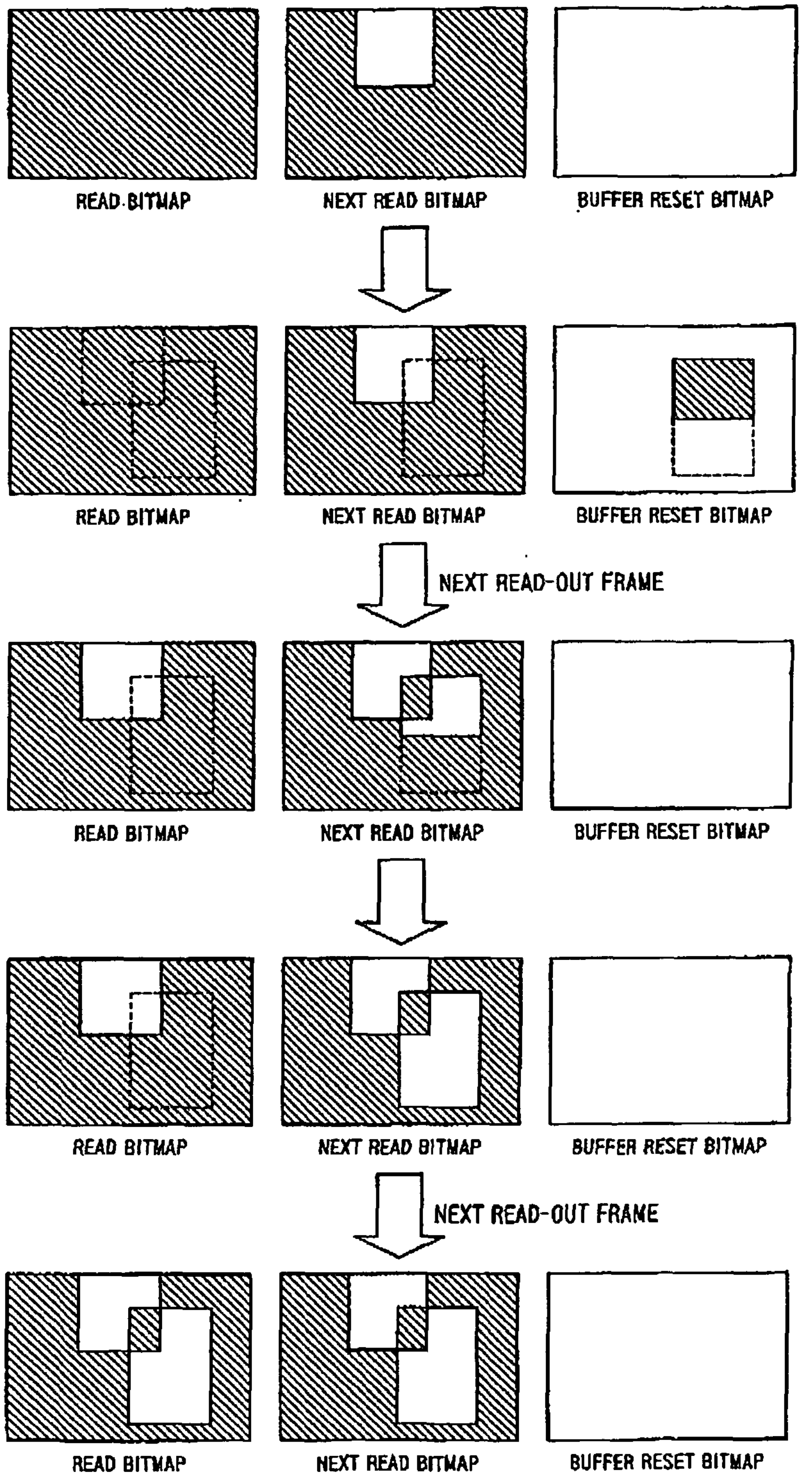
FIG. 57 shows an operational procedure of the read buffer BITMAP, next read buffer BITMAP, and buffer reset BITMAP according to the eighth embodiment.

However, when the first and second images overlap, the second image overwrites the first image. This causes a problem of reading out the overwriting portion of the second image in the next read-out frame. A configuration that can address such a situation is illustrated in FIG. 56. The configuration of FIG. 56 is different from that of FIG. 54 in that the per-area write buffer selector 14 selects a buffer also with reference to next read buffer BITMAP 32 and that FIG. 56 includes a write suspension requesting unit 28 which requests the writing unit 12 to suspend writing. The procedure of operation of image frames is illustrated in FIG. 44 and that of the read buffer BITMAP 18, next read buffer BITMAP 32, and buffer reset BITMAP 33 is shown in FIG. 57. First, as in the earlier examples, a first image for which an overtaking will occur is written on the left. Then, on the right of the image, a second image is written that spans read-out frame periods and will encounter an overtaking in the next read-out frame period. When selecting an area for writing the second image, the per-area write buffer selector 14 also references the next read buffer BITMAP 32 and selects a frame that is not the read-out frame in the next read-out frame period. That is to say, since the present read-out frame can be given by referencing the read buffer BITMAP 18 but the read-out frame of the next read-out frame period is represented by the next read buffer BITMAP 32, the per-area write buffer selector 14 selects a buffer that is other than the one indicated by the value. By these operations, when the first and the second image do not overlap, "0"s are set in the next read buffer BITMAP 32, thus the frame buffer 0 which is the buffer other than the present read buffer is selected as in the previous example. However, when the two images overlap, the other buffer, namely the frame buffer 1 is selected. Then, the writing unit 12 writes the overlapping portion to the frame buffer 1 and non-overlapping potions to the frame buffer 0, and also writes inverted information in an area for the second image in the buffer reset BITMAP 33, not the next read buffer BITMAP 32, as in the previous example.

This processing is necessary because what should be originally written to a third frame buffer is written to the first buffer as the read buffer, that is, the first buffer is used as a substitute of the third buffer. In other words, in the present read-out frame period, the reading unit 13 is supposed to read out the image that is written in the read buffer and should not read out the second image which is going to be written in that buffer. The write suspension requesting unit 28 therefore issues a suspension request to the writing unit 12 to suspend writing until reading scan has passed the area in which the second image is written, namely the area in which the first and second images overlap. The writing unit 12 accordingly suspends writing and starts writing when reading scan has passed the area. This prevents the reading unit 13 from reading the second image in the present frame period. The following processing is similar to the previous case: the read buffer BITMAP 18 is updated with the next read buffer BITMAP 32 on the next BITMAP update and the first image will be read out in the next read-out frame period. Furthermore, because the next read buffer BITMAP 32 is updated with the buffer reset BITMAP 33, inverted values of the read buffer BITMAP 18 are set in a portion of the next read buffer BITMAP 32 in which the image is already written and will also be set in the remaining portion upon writing of the remaining area. Consequently, the second image will be read out in the next read-out frame period.

As has been thus far described, according to this embodiment, when an image is written across read-out frames, an image which has been already written in the same read-out frame period can be read out in the next frame, which can reduce delay in image reading.

Although the buffer reset BITMAP 33 is saved in a bitmap format in the example above for the sake of simplicity, BITMAP information may also be saved in a vector form as mentioned above. Since only area information for a single image has to be saved in the buffer reset BITMAP 33 in particular, it is preferable to save the information in a vector form because bit information can be made less.

Ninth Embodiment

This embodiment describes a more specific form of implementation. A primary effect of the present invention as compared to conventional arts is the reduction of memory accesses to frame buffers as already mentioned. Meanwhile the invention has a problem of adding accesses to the read buffer BITMAP 18 and the buffer toggle BITMAP 19. While a method for reducing the accesses was described at the end of the third embodiment, another effective method is shown below.

Figures 58, 59:
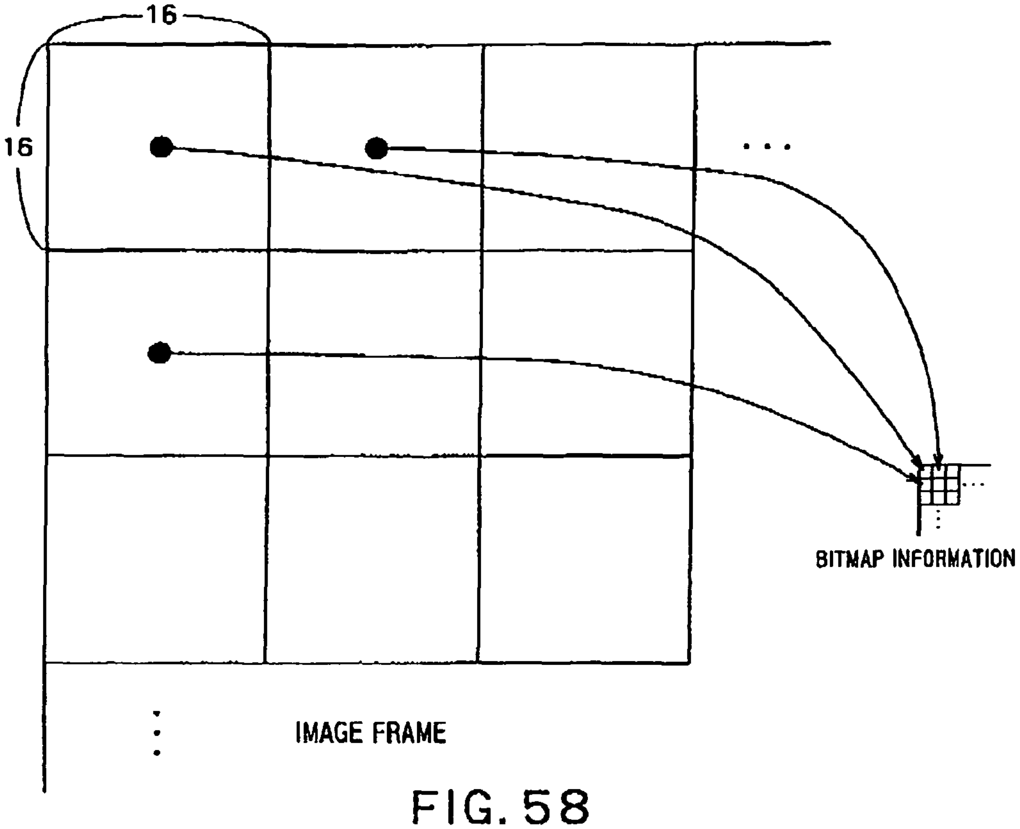
FIG. 58 illustrates an example where an image frame is sectioned into blocks and BITMAP information (one bit) is assigned to each of the blocks according to a ninth embodiment.
FIG. 59 illustrates an example of mapping in SDRAM as the double buffer according to the ninth embodiment.

The previous embodiments showed cases in which BITMAP information one-to-one corresponds with a pixel of an image frame. However, as shown in FIG. 58, it is also possible to section an image frame into blocks of 16×16 pixels and assign one bit to each of the blocks. In this case, in the case of XGA (1024 pixels wide and 768 pixels high), for instance, there are 1024/16=64 blocks horizontally and 768/16=48 blocks vertically. Accordingly, the number of bits in a BITMAP is 64×48=3072 bits. When compared to one-to-one correspondence with a pixel, the memory amount of the read buffer BITMAP 18 can be significantly reduced by a factor of 16×16=265 and memory accesses to BITMAPs can be significantly decreased as well. This can reduce power consumption and therefore make the effect of the present invention more apparent.

Figure 60:
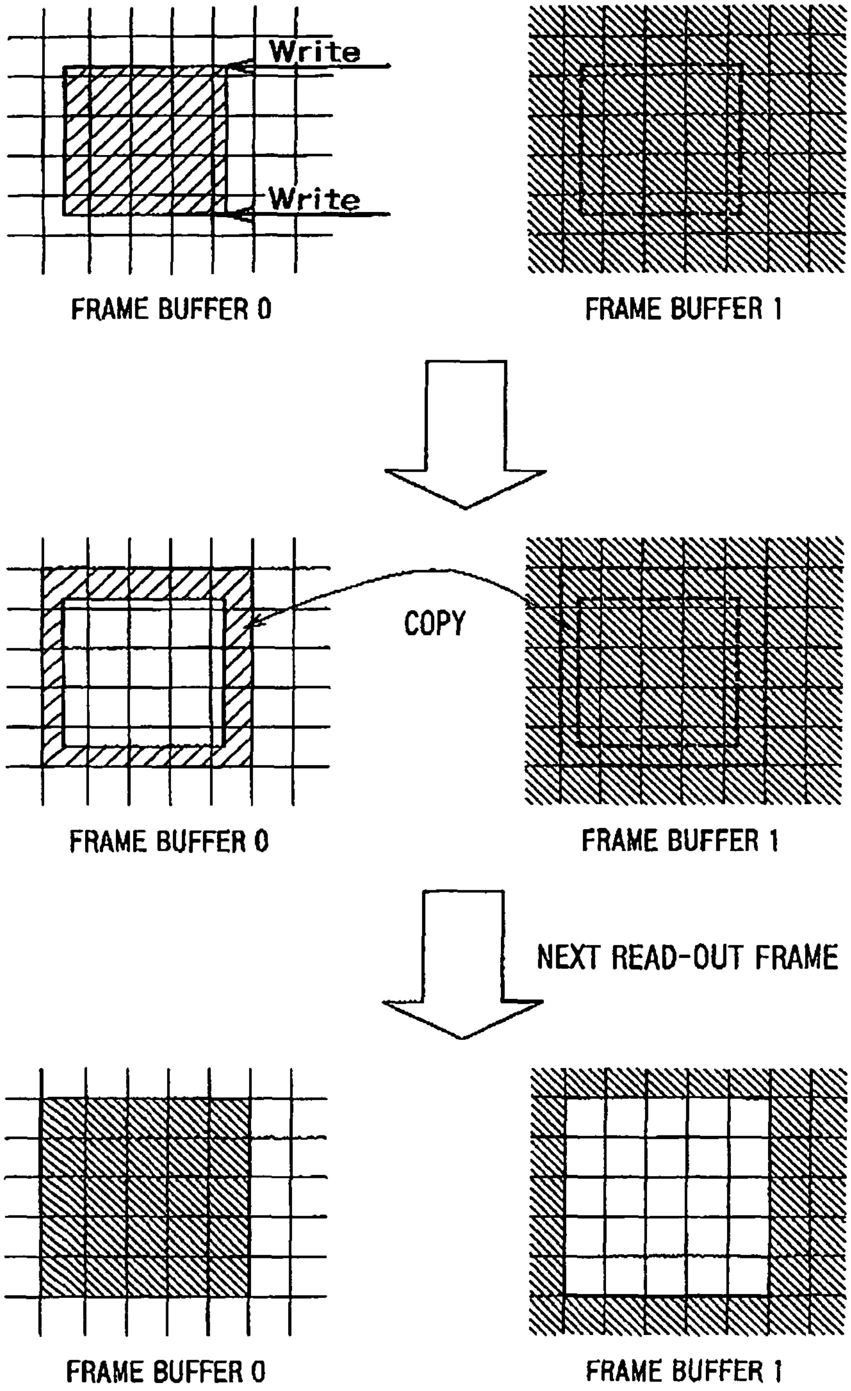
FIG. 60 illustrates the operation of a lacking area copying unit of FIG. 61 according to the ninth embodiment.
Figure 61:
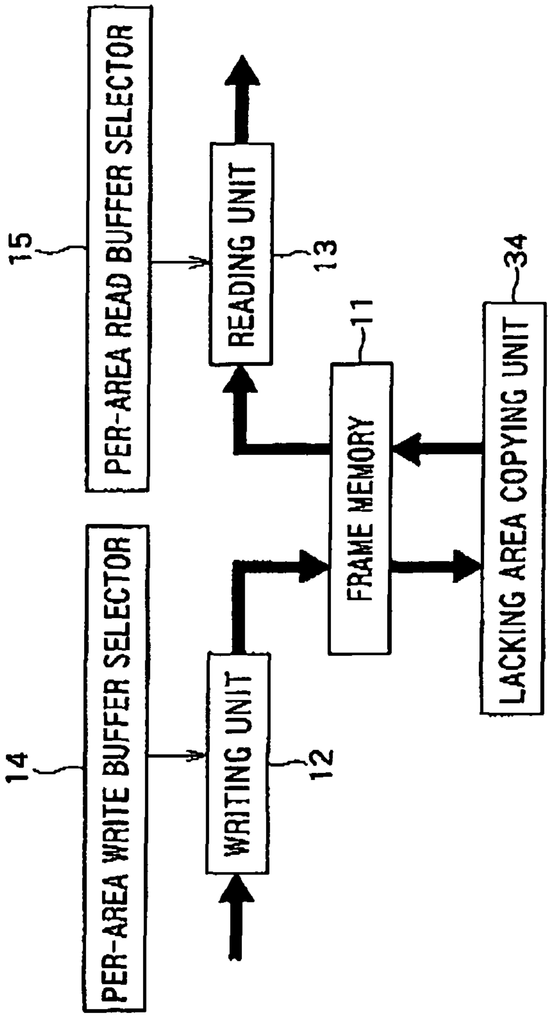
FIG. 61 shows a configuration of the image generating apparatus as the ninth embodiment.

If a written image is also in units of 16 pixels on X and Y coordinates and in length and width, all accesses to image frames can be made in units of 16 pixels, thus mapping to BITMAP information is possible without particular problems. A case where an image is not in units of 16 pixels is illustrated by FIG. 60. FIG. 60 shows an example in which an image for which an overtaking will occur is written to the buffer other than the read buffer. Since reading of the buffers is performed in units of 16 pixels only, it is necessary to compensate for a remaining area that lacks when an image is sectioned in units of 16 pixels. As the image is in the read buffer which is the latest frame buffer, the image is written and also this lacking remaining area is copied from the read buffer. Then, by making blocks including the written area the read buffer for the next frame reading, the written image and the remaining area can be correctly read out. A configuration for this case is illustrated in FIG. 61. A lacking area copying unit 34 which is newly added performs this copy. Although the gist of the present invention originally lies in the fact that no copy is performed between frame buffers and the operation described here is seemingly against the gist, it does not violate the gist of the invention because what is copied is just a lacking area, not a written image itself. While in the example above an image frame is sectioned in units of 16 pixels, the number of pixels for sectioning is not limited to 16. Also, length and width may be different.

In addition, by implementing memory for BITMAPs as physically separate memory from memory for frame buffers, memory accesses to the frame buffers can be reduced. As accesses to a frame buffer require a large bandwidth, they often become a bottleneck in a system. By implementing BITMAP memory as separate memory in such a case, it is possible to eliminate occurrence of a bottleneck and prevent degradation of system performance. In addition, control of memory access can be simplified.

As to actual physical mapping of a double buffer, frame buffers may be SDRAM, for example. But a problem inherent in SDRAM is that change of a row address causes a delay (overhead) of several clock cycles though a column address can be rapidly changed every one clock cycle. Thus, when two buffers are simply reserved in separate memory areas, if accesses are made with the two buffers being frequently switched as in the present invention, change of a row address frequently occurs and access time overhead becomes large, resulting in the problem of performance degradation.

To overcome this, the same row of both the two buffers should be mapped to the same row of the SDRAM. In particular, mapping in the SDRAM between two buffers is easy when done in a manner shown in FIG. 59. FIG. 59 illustrates mapping of pixels at X coordinates “0” to “3” and Y coordinates “0” to “3” between two buffers. For example, (X0, Y0, B0) denotes a pixel at X coordinate “0”, Y coordinate “0” and in the frame buffer 0, and (X1, Y2, B1) denotes a pixel at X coordinate “1”, Y coordinate “2”, and in the frame buffer 1. As can be seen, coordinates are arranged in a stripe pattern such that corresponding pixels of the two buffers are positioned side by side. By this way of mapping, the two buffers can be switched just by changing the first bit of a column address, which enables accesses to be made while rapidly switching between the two buffers with a small overhead and can prevent performance degradation.

While several embodiments of the present invention are illustrated above, any combination of those embodiments is possible and the present invention is not limited to those embodiments. Although an image written to frame buffers is shown to be a rectangle for the sake of simplicity, the image does not have to be a rectangle and may be of any shape in the present invention. Although elements constituting the present invention are realized by circuits such as ASICs and FPGAS, a CPU that operates according to software (an image generating program) and so forth, the form of implementation is not limited thereto. The image generating program may be stored in a computer readable medium like a CD-ROM, Memory stick, and Hard-disk etc.

What is claimed is:

1. An image generating apparatus, comprising:

a storage configured to have first and second buffers each capable of storing an image of one frame;

a write buffer selecting unit configured to select, individually for each area forming a part of one frame to be written, a buffer to which an image of each area is to be written from among the first and second buffers, respectively;

a writing unit configured to write an image of each area of each part of the one frame to a buffer selected individually for each area by the write buffer selecting unit, respectively;

a read buffer selecting unit configured to select, individually for each area of each part forming an entirety of one frame to be read, a buffer from which an image of each area is to be read out from among the first and second buffers, respectively;

a reading unit configured to read out at regular intervals an image in each area of each part of the entirety of the one frame from a buffer selected individually for each area by the read buffer selecting unit to generate an image frame;

a read buffer retaining unit configured to retain readout information indicating from which one of the first and second buffers the reading unit is to read out an image for each area of one frame; and a read buffer updating unit configured to update the read buffer retaining unit so that the read buffer retaining unit retains readout information indicating an other buffer than a buffer which was read in the certain reading period for each area which has been written by the writing unit in the certain reading period, after reading of one frame in the certain reading period by the reading unit ends and before reading of a next frame reading period starts, wherein the write buffer selecting unit selects, individually for each area of each part of the one frame to be written by the writing unit in a certain frame reading period, an other buffer than a buffer from which each area is to be read out by the reading unit in the certain frame reading period, and obtains, from the read buffer retaining unit, information indicating which one of the first and second buffers is to be read by the reading unit for each area to be written by the writing unit, the read buffer selecting unit selects, among each area of the one frame to be read out in the certain reading period by the reading unit:

for an area in which the writing was performed by the writing unit in an immediately preceding frame reading period, a buffer to which the writing was performed by the writing unit in the immediately preceding reading period, and for an area in which the writing was not performed by the writing unit in the immediately preceding frame reading period, a same buffer as a buffer which was read by the reading unit in the immediately preceding reading period, the read buffer selecting unit obtains, from the read buffer retaining unit, information indicating which one of the first and second buffers is to be read by the reading unit for each area of the one frame, and each part of the one frame comprises less area than the entire frame area.

2. The apparatus according to claim 1, further comprising a read buffer toggle retainer configured to retain, for each area of the one frame, inverted information or non-inverted information that indicates whether or not to invert readout information for each area of the one frame which is retained in the read buffer retaining unit, wherein when the write buffer selecting unit selects an other buffer than the buffer being read by the reading unit as a buffer for writing an image of each area to be written by the writing unit, the write buffer selecting unit sets the inverted information for each area in the read buffer toggle retainer which is to be written by the writing unit, and the read buffer updating unit updates, as an update of the read buffer retaining unit, readout information for each area of one frame in the read buffer retaining unit based on inverted information and non-inverted information in each area of one frame which is retained in the read buffer toggle retainer, and further sets all areas of one frame in the read buffer toggle retainer to the non-inverted information.

3. The apparatus according to claim 1, further comprising a next read buffer retainer configured to retain, for each area of one frame, readout information indicating from which one of the first and second buffers an image in each area of the one frame is to be read out by the reading unit during the next reading period by the reading unit, wherein when the write buffer selecting unit selects an other buffer than the buffer being read by the reading unit as a buffer for writing to each area to be written by the writing unit, the write buffer selecting unit sets, in the next read buffer retainer, readout information that specifies an other buffer than a buffer specified by readout information in the read buffer retaining unit for each area to be written by the writing unit, and the read buffer updating unit overwrites, as an update of the read buffer retaining unit, readout information for each area in the read buffer retaining unit with readout information for each area retained in the next read buffer retainer.

4. The apparatus according to claim 1, wherein the read buffer retaining unit retains the readout information for one frame partitioned into sections of a fixed size on a per section basis, and when an other buffer than the buffer being read by the reading unit is selected by the write buffer selecting unit, the read buffer updating unit updates the read buffer retaining unit so that the read buffer retaining unit retains readout information indicating an other buffer than a buffer for the certain reading period for a section which contains an area to be written by the writing unit.

5. The apparatus according to claim 4, further comprising a lacking area copying unit configured to, when an entire or partial image of the one frame has been written by the writing unit to the other buffer than the buffer read by the reading unit, copy, to the other buffer, an image read by the reading unit that is in an other area than the area in which the image is written in a section containing the area in which the image is written.

6. The apparatus according to claim 1, wherein the read buffer retaining unit is a storage device physically separate from the storage which has the first and second buffers.

7. An image generating apparatus, comprising:

a storage configured to have first and second buffers each capable of storing an image of one frame;

a write buffer selecting unit configured to select, individually for each area forming a part of one frame to be written, a buffer to which an image of each area is to be written from among the first and second buffers, respectively;

a writing unit configured to write an image of each area of each part of the one frame to a buffer selected individually for each area by the write buffer selecting unit, respectively;

a read buffer selecting unit configured to select, individually for each area of each part forming an entirety of one frame to be read, a buffer from which an image of each area is to be read out from among the first and second buffers, respectively;

a reading unit configured to read out at regular intervals an image in each area of each part of the entirety of the one frame from a buffer selected individually for each area by the read buffer selecting unit to generate an image frame;

a read buffer retaining unit configured to retain readout information indicating from which one of the first and second buffers the reading unit is to read out an image for each area of one frame;

a read buffer updating unit configured to, when the write buffer selecting unit selects an other buffer than the buffer to be read by the reading unit for each area to be written by the writing unit, update the read buffer retaining unit so that the read buffer retaining unit retains readout information indicating an other buffer than the buffer which was read in the certain reading period for each area to be written by the writing unit, after reading of one frame by the reading unit in the certain reading period ends and before reading of the next frame reading period starts; and an overtaking determining unit configured to determine whether an overtaking of reading scan by writing scan or an overtaking of writing scan by reading scan will occur during image writing by the writing unit in the certain reading period, wherein the write buffer selecting unit selects, individually for each area of each part of the one frame to be written by the writing unit in a certain frame reading period, an other buffer than a buffer from which each area is to be read out by the reading unit in the certain frame reading period, obtains, from the read buffer retaining unit, information indicating which one of the first and second buffers is to be read by the reading unit for each area to be written by the writing unit, determines before selecting a buffer by using the overtaking determining unit whether the overtaking will occur during image writing by the writing unit, selects an other buffer than a buffer which is being read by the reading unit for each area to be written by the writing unit when it is determined that the overtaking will occur, and selects a same buffer as the buffer which is being read by the reading unit when it is not determined that the overtaking will occur, and the read buffer selecting unit selects, among each area of the one frame to be read out in the certain reading period by the reading unit:

for an area in which the writing was performed by the writing unit in an immediately preceding frame reading period, a buffer to which the writing was performed by the writing unit in the immediately preceding reading period, and for an area in which the writing was not performed by the writing unit in the immediately preceding frame reading period, a same buffer as a buffer which was read by the reading unit in the immediately preceding reading period, obtains, from the read buffer retaining unit, information indicating which one of the first and second buffers is to be read by the reading unit for each area of the one frame, when it has been determined that the overtaking will occur by the overtaking determining unit at a time of buffer selection by the write buffer selecting unit in the immediately preceding reading period, selects an other buffer than a buffer which was read during reading in the immediately preceding period for areas that has been written by the writing unit in the immediately preceding reading period, and selects the same buffer as the buffer which was read during reading in the immediately preceding reading period for areas which was not written by the writing unit in the immediately preceding reading period, and when it has not been determined that the overtaking will occur by the overtaking determining unit at a time of buffer selection by the write buffer selecting unit in the immediately preceding reading period, selects the same buffer as the buffer which was read during reading in the immediately preceding reading period for each area of the one frame to be read out by the reading unit.

8. The apparatus according to claim 7, further comprising a write completion detecting unit configured to detect a completion of image writing by the writing unit to an other buffer than the buffer that is read by the reading unit, wherein the read buffer updating unit does not update the read buffer retaining unit when a completion of image writing by the writing unit is not detected by the write completion detecting unit during reading of one frame by the reading unit.

9. The apparatus according to claim 8, further comprising a write-in-progress detecting unit configured to detect that writing by the writing unit is in progress, wherein the read buffer updating unit does not update the read buffer retaining unit when the write-in-progress detecting unit detects that the writing by the writing unit is in progress even if reading of one frame by the reading unit has completed.

10. The apparatus according to claim 9, further comprising:

a next overtaking determining unit configured to, if the writing unit will continue to write a remaining portion of an image which is being written in the certain reading period when the reading unit reads out a frame in the next reading period following the certain reading period, determine whether an overtaking of reading scan by writing scan for writing the remaining portion or an overtaking of the writing scan by the reading scan will occur while the frame is read out in the next reading period by the reading unit; and a re-determination instructing unit configured to, when the reading unit reads out a frame in a frame reading period, if the writing unit is continuing to write a remaining portion of an image which has been written in a reading period immediately preceding the frame reading period, instruct the overtaking determining unit and the next overtaking determining unit to determine whether an overtaking will occur or not, wherein the write buffer selecting unit selects an other buffer than the buffer which is being read by the reading unit for each area to be written by the writing unit if the overtaking determining unit determines that an overtaking will occur or if the next overtaking determining unit determines that an overtaking will occur, and selects the same buffer as the buffer being read by the reading unit if the overtaking determining unit does not determine that an overtaking will occur and if the next overtaking determining unit does not determine that an overtaking will occur, and the read buffer updating unit updates the read buffer retaining unit when the next overtaking determining unit does not determine that an overtaking will occur even if the write-in-progress detecting unit detects that writing is in progress.

11. The apparatus according to claim 10, further comprising:

a read buffer toggle retainer configured to retain, for each area of the one frame, inverted information or non-inverted information that indicates whether or not to invert readout information for each area of the one frame which is retained in the read buffer retaining unit; and an update inverted/non-inverted information retainer configured to retain update inverted information and update non-inverted information that orders setting of each area of one frame in the read buffer toggle retainer to inverted information and non-inverted information, wherein the write buffer selecting unit, when an other buffer than the buffer being read by the reading unit is selected for each area of a first image which is to be written by the writing unit and when a completion of writing of the first image by the writing unit is not detected by the write completion detecting unit while one frame image is read out by the reading unit, sets inverted information for each area of the first image which has written by the writing unit in the read buffer toggle retainer, and when an other buffer than the buffer being read by the reading unit is selected for each area of a first image which is to be written by the writing unit, when a completion of writing of the first image by the writing unit is detected by the write completion detecting unit while one frame is read out by the reading unit and when the write buffer selecting unit selects an other buffer than the buffer being read by the reading unit for each area of a second image which is to be written by the writing unit following the first image during same frame reading period in which the first image is written, sets update inverted information for each area of the second image which has written by the writing unit during the same frame reading period in the update inverted/non-inverted information retainer, and the read buffer updating unit, when a completion of writing of the first image is detected by the write completion detecting unit, updates, as an update of the read buffer retaining unit, each area of one frame in the read buffer retaining unit based on inverted information and non-inverted information in each area of one frame in the read buffer toggle retainer even if the write-in-progress detecting unit detects that writing of the second image is in progress when the frame reading period in which the first image has been written ends and even if the next overtaking determining unit determines that an overtaking will occur in a reading period following the frame reading period in which the first image has been written, thereafter updates each area of one frame in the read buffer toggle retainer based on update inverted information and update non-inverted information in each area of one frame in the update inverted/non-inverted information retainer, and thereafter sets all areas of one frame in the update inverted/non-inverted information retainer to the update non-inverted information.

12. The apparatus according to claim 11, further comprising a write suspension requesting unit configured to request the writing unit to suspend start of image writing, wherein the write buffer selecting unit, when selecting an other buffer than the buffer being read by the reading unit for each area of the second image which is to be written by the writing unit following the first image during the same frame reading period in which the first image is written, references the read buffer toggle retainer, selects the other buffer than the buffer being read by the reading unit for first areas among areas of the second image for which the non-inverted information is set in the read buffer toggle retainer, and selects the same buffer as the buffer being read by the reading unit for second areas among areas of the second image for which the inverted information is set in the read buffer toggle retainer, and the write suspension requesting unit requests the writing unit to suspend start of writing of the second image so that reading by the reading unit takes place before writing of the second image by the writing unit takes place, for overlapping areas within a same buffer in which the second areas of the second image to be written by the writing unit overlaps areas to be read out by the reading unit during the same frame reading period in which the first image is written.

13. The apparatus according to claim 10, comprising:

a next read buffer retainer configured to retain, for each area of one frame, readout information indicating from which one of the first and second buffers an image in each area of the one frame is to be read out by the reading unit during the next reading period by the reading unit; and a next read buffer toggle retainer configured to retain inverted information and non-inverted information that orders inversion or non-inversion of each area of the next read buffer retainer, wherein the write buffer selecting unit, when an other buffer than the buffer being read by the reading unit is selected for each area of a first image which is to be written by the writing unit and when a completion of writing of the first image by the writing unit is not detected by the write completion detecting unit while one frame is read out by the reading unit, sets readout information that specifies an other buffer than a buffer specified by the read buffer retaining unit for each area of the first image which has written by the writing unit in the next read buffer retainer, when an other buffer than the buffer being read by the reading unit is selected for each area of a first image which is to be written by the writing unit, when a completion of writing of the first image by the writing unit is detected by the write completion detecting unit while one frame is read out by the reading unit, and when the write buffer selecting unit selects an other buffer than the buffer being read by the reading unit for each area of a second image which is to be written by the writing unit following the first image during same frame reading period in which the first image is written, sets inverted information for each area of the second image which has been written by the writing unit during the same frame reading period in the next read buffer toggle retainer, and the read buffer updating unit, when a completion of writing of the first image is detected by the write completion detecting unit, overwrites, as an update of the read buffer retaining unit, readout information for each area of one frame in the read buffer retaining unit based on readout information for each area of one frame in the next read buffer retainer even if the write-in-progress detecting unit detects that writing of the second image is in progress when the frame reading period in which the first image has been written ends and even if the next overtaking determining unit determines that an overtaking will occur in the next reading period following the frame reading period in which the first image has been written, thereafter updates each area of one frame in the next read buffer retainer based on inverted information and non-inverted information in each area of one frame in the next read buffer toggle retainer, and thereafter sets all areas of one frame in the next read buffer toggle retainer to non-inverted information.

14. The apparatus according to claim 13, further comprising a write suspension requesting unit configured to request the writing unit to suspend start of image writing, wherein the write buffer selecting unit, when selecting an other buffer than the buffer being read by the reading unit for each area of the second image which is to be written by the writing unit following the first image during the same frame reading period in which the first image is written, references the next read buffer retainer, selects the other buffer than the buffer being read by the reading unit for first areas among areas of the second image for which readout information specifying the same buffer as a buffer specified by the read buffer retaining unit is retained in the next read buffer retainer, and selects the same buffer as the buffer being read by the reading unit for second areas among areas of the second image for which readout information specifying an other buffer than the buffer specified by the read buffer retaining unit is retained in the next read buffer retainer, and the write suspension requesting unit requests the writing unit to suspend start of writing of the second image so that reading by the reading unit takes place before writing of the second image by the writing unit takes place, for overlapping areas within a same buffer in which the second areas of the second image to be written by the writing unit overlaps areas to be read out by the reading unit during the same frame reading period which the first image is written.

15. The apparatus according to claim 7, further comprising a write-in-progress detecting unit configured to detect that writing by the writing unit is in progress, wherein the read buffer updating unit does not update the read buffer retaining unit when the write-in-progress detecting unit detects that the writing by the writing unit is in progress even if reading of one frame by the reading unit has completed.

16. An image generating method, comprising:

selecting, individually for each area forming a part of one frame to be written, a buffer to which an image of each area is to be written from among first and second buffers, respectively, wherein the first and second buffers each are capable of storing an image of one frame;

writing an image of each area of each part of the one frame to a selected buffer selected individually for each area, respectively;

selecting, individually for each area of each part forming an entirety of one frame to be read out, a buffer from which an image of each area is to be read out from among the first and second buffers, respectively;

reading out at regular intervals an image in each area of each part of the entirety of the one frame from the buffer selected individually for each area to generate an image frame;

retaining readout information indicating from which one of the first and second buffers the reading out is to read out an image for each area of one frame; and updating the retaining to retain readout information indicating an other buffer than a buffer which was read in the certain reading period for each area which has been written by the writing in the certain reading period, after reading of one frame in the certain reading period by the reading ends and before reading of a next frame reading period starts, wherein a first of the selecting selects, individually for each area of each part of the one frame to be written in a certain frame reading period, an other buffer than a buffer from which each area is to be read out in the certain frame reading period, respectively, and obtains information indicating which one of the first and second buffers is to be read by the reading for each area to be written by the writing, and a second of selecting selects, among each area of the one frame to be read out in the certain frame reading period:

for an area in which the writing was performed in an immediately preceding frame reading period, a buffer to which the writing was performed in the immediately preceding reading period, and for an area in which the writing was not performed in the immediately preceding frame reading period, a same buffer as a buffer which was read in the immediately preceding reading period, the second of selecting obtains information indicating which one of the first and second buffers is to be read by the reading for each area to be written by the writing; and each part of the one frame comprises less area than the entire frame area.

17. A non-transitory computer readable medium storing a computer program for causing a computer to execute instructions to perform the steps of:

selecting, individually for each area forming a part of one frame to be written, a buffer to which an image of each area is to be written from among first and second buffers, respectively, wherein the first and second buffers each are capable of storing an image of one frame;

writing an image of each area of each part of the one frame to a selected buffer selected individually for each area, respectively;

selecting, individually for each area of each part forming an entirety of one frame to be read out, a buffer from which an image of each area is to be read out from among the first and second buffers, respectively;

reading out at regular intervals an image in each area of each part of the entirety of the one frame from the buffer selected individually for each area to generate an image frame;

retaining readout information indicating from which one of the first and second buffers the reading out is to read out an image for each area of one frame; and updating the retaining to retain readout information indicating an other buffer than a buffer which was read in the certain reading period for each area which has been written by the writing in the certain reading period, after reading of one frame in the certain reading period by the reading ends and before reading of a next frame reading period starts, wherein a first of the selecting selects, individually for each area of each part of the one frame to be written in a certain frame reading period, an other buffer than a buffer from which each area is to be read out in the certain frame reading period, respectively, and obtains information indicating which one of the first and second buffers is to be read by the reading for each area to be written by the writing, and a second of selecting selects, among each area of the one frame to be read out in the certain frame reading period:

for an area in which the writing was performed in an immediately preceding frame reading period, a buffer to which the writing was performed in the immediately preceding reading period, and for an area in which the writing was not performed in the immediately preceding frame reading period, a same buffer as a buffer which was read in the immediately preceding reading period, the second of selecting obtains information indicating which one of the first and second buffers is to be read by the reading for each area to be written by the writing; and each part of the one frame comprises less area than the entire frame area.

18. An image generating method, comprising:

selecting, individually for each area forming a part of one frame to be written, a buffer to which an image of each area is to be written from among the first and second buffers, respectively, wherein the first and second buffers each are capable of storing an image of one frame;

writing an image of each area of each part of the one frame to a buffer selected individually for each area, respectively;

selecting, individually for each area of each part forming an entirety of one frame to be read, a buffer from which an image of each area is to be read out from among the first and second buffers, respectively;

reading out at regular intervals an image in each area of each part of the entirety of the one frame from a buffer selected individually for each area to generate an image frame;

retaining readout information indicating from which one of the first and second buffers the reading out is to read out an image for each area of one frame;

updating, when the write buffer selecting selects an other buffer than the buffer to be read out for each area to be written by the writing, the readout information indicating an other buffer than the buffer which was read in the certain reading period for each area to be written, after reading of one frame by the reading out in the certain reading period ends and before reading of the next frame reading period starts; and determining whether an overtaking of reading scan by writing scan or an overtaking of writing scan by reading scan will occur during image writing by the writing unit in the certain reading period, wherein a first of the selecting selects, individually for each area of each part of the one frame to be written in a certain frame reading period, an other buffer than a buffer from which each area is to be read out in the certain frame reading period, respectively, obtains, from the read buffer retaining unit, information indicating which one of the first and second buffers is to be read out for each area to be written, determines before selecting a buffer whether the overtaking will occur during image writing, selects an other buffer than a buffer which is being read for each area to be written when it is determined that the overtaking will occur, and selects a same buffer as the buffer which is being read when it is not determined that the overtaking will occur, and a second selecting selects, among each area of the one frame to be read out in the certain reading period:

for an area in which the writing was performed in an immediately preceding frame reading period, a buffer to which the writing was performed in the immediately preceding reading period, and for an area in which the writing was not performed in the immediately preceding frame reading period, a same buffer as a buffer which was read in the immediately preceding reading period, obtains information indicating which one of the first and second buffers is to be read for each area of the one frame, when it has been determined that the overtaking will occur at a time of buffer selection in the immediately preceding reading period, selects an other buffer than a buffer which was read during reading in the immediately preceding period for areas that has been written in the immediately preceding reading period, and selects the same buffer as the buffer which was read during reading in the immediately preceding reading period for areas which was not written in the immediately preceding reading period, and when it has not been determined that the overtaking will occur at a time of buffer selection in the immediately preceding reading period, selects the same buffer as the buffer which was read during reading in the immediately preceding reading period for each area of the one frame to be read out.

19. A non-transitory computer readable medium storing a computer program for causing a computer to execute instructions to perform the steps of:

selecting, individually for each area forming a part of one frame to be written, a buffer to which an image of each area is to be written from among the first and second buffers, respectively, wherein the first and second buffers each are capable of storing an image of one frame;

writing an image of each area of each part of the one frame to a buffer selected individually for each area, respectively;

selecting, individually for each area of each part forming an entirety of one frame to be read, a buffer from which an image of each area is to be read out from among the first and second buffers, respectively;

reading out at regular intervals an image in each area of each part of the entirety of the one frame from a buffer selected individually for each area to generate an image frame;

retaining readout information indicating from which one of the first and second buffers the reading out is to read out an image for each area of one frame;

updating, when the write buffer selecting selects an other buffer than the buffer to be read out for each area to be written by the writing, the readout information indicating an other buffer than the buffer which was read in the certain reading period for each area to be written, after reading of one frame by the reading out in the certain reading period ends and before reading of the next frame reading period starts; and determining whether an overtaking of reading scan by writing scan or an overtaking of writing scan by reading scan will occur during image writing by the writing unit in the certain reading period, wherein a first of the selecting selects, individually for each area of each part of the one frame to be written in a certain frame reading period, an other buffer than a buffer from which each area is to be read out in the certain frame reading period, respectively, obtains, from the read buffer retaining unit, information indicating which one of the first and second buffers is to be read out for each area to be written, determines before selecting a buffer whether the overtaking will occur during image writing, selects an other buffer than a buffer which is being read for each area to be written when it is determined that the overtaking will occur, and selects a same buffer as the buffer which is being read when it is not determined that the overtaking will occur, and a second selecting selects, among each area of the one frame to be read out in the certain reading period:

for an area in which the writing was performed in an immediately preceding frame reading period, a buffer to which the writing was performed in the immediately preceding reading period, and for an area in which the writing was not performed in the immediately preceding frame reading period, a same buffer as a buffer which was read in the immediately preceding reading period, obtains information indicating which one of the first and second buffers is to be read for each area of the one frame, when it has been determined that the overtaking will occur at a time of buffer selection in the immediately preceding reading period, selects an other buffer than a buffer which was read during reading in the immediately preceding period for areas that has been written in the immediately preceding reading period, and selects the same buffer as the buffer which was read during reading in the immediately preceding reading period for areas which was not written in the immediately preceding reading period, and when it has not been determined that the overtaking will occur at a time of buffer selection in the immediately preceding reading period, selects the same buffer as the buffer which was read during reading in the immediately preceding reading period for each area of the one frame to be read out.

* * * * *